Feb. 6, 1962 E. E. REYNOLDS ET AL 3,019,971
CALCULATING MACHINES
Filed Oct. 22, 1956 31 Sheets-Sheet 4
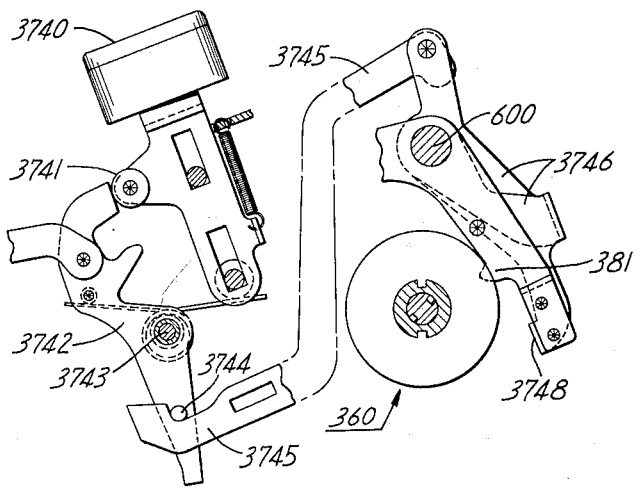
FIG_4_
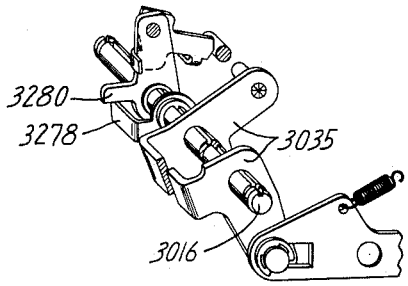
FIG_5_
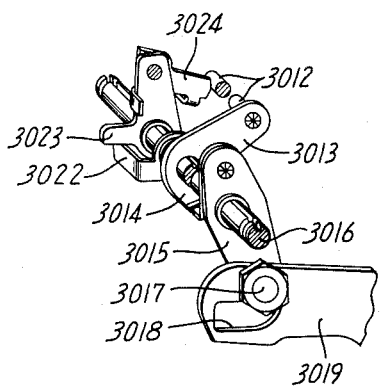
FIG_6_
INVENTORS.
Eugene E. Reynolds.
Charles A. Lindberg.
Harold T. Avery.
George E. Munzing.
William E. Thomas.
BY Clarence W. Martin

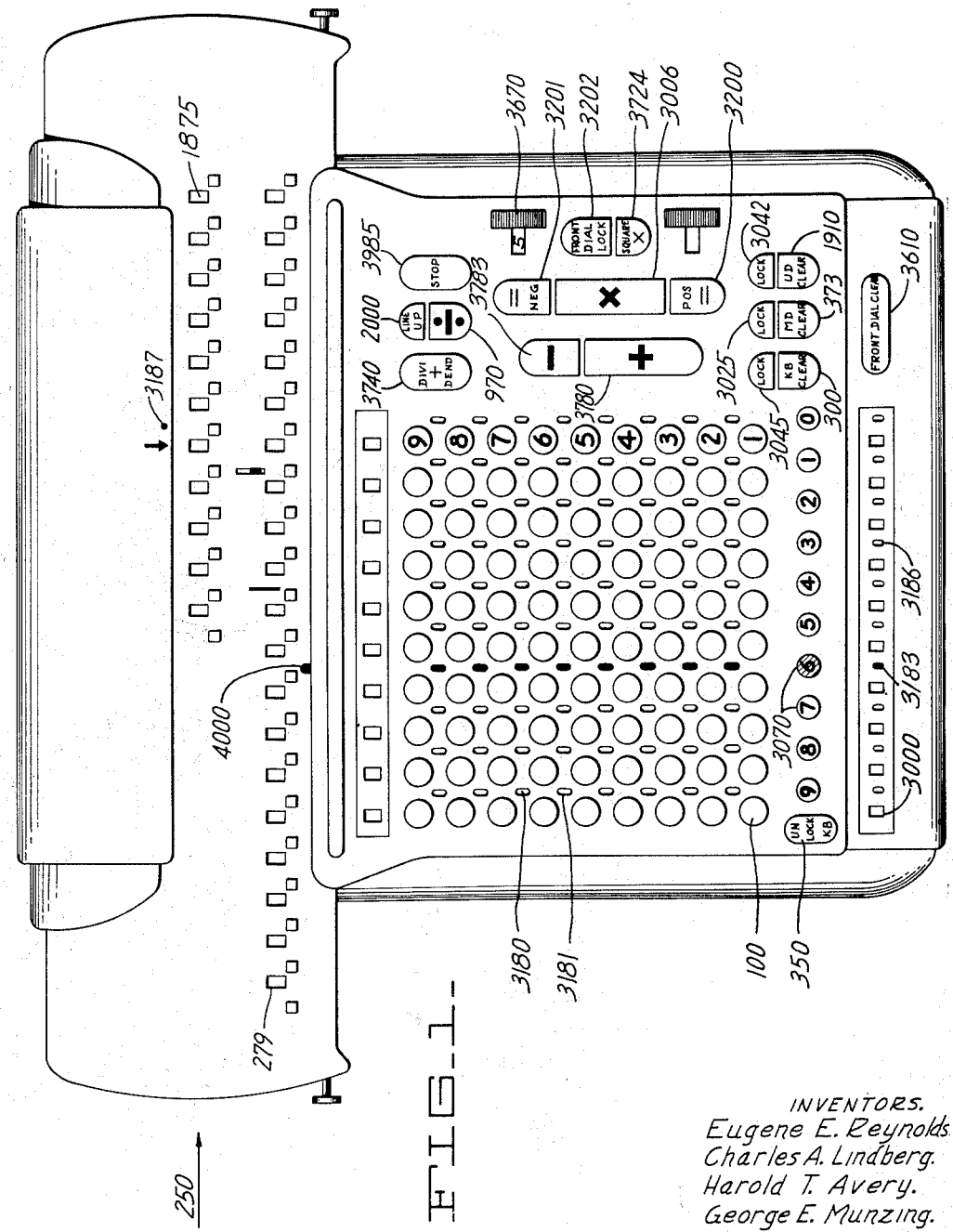

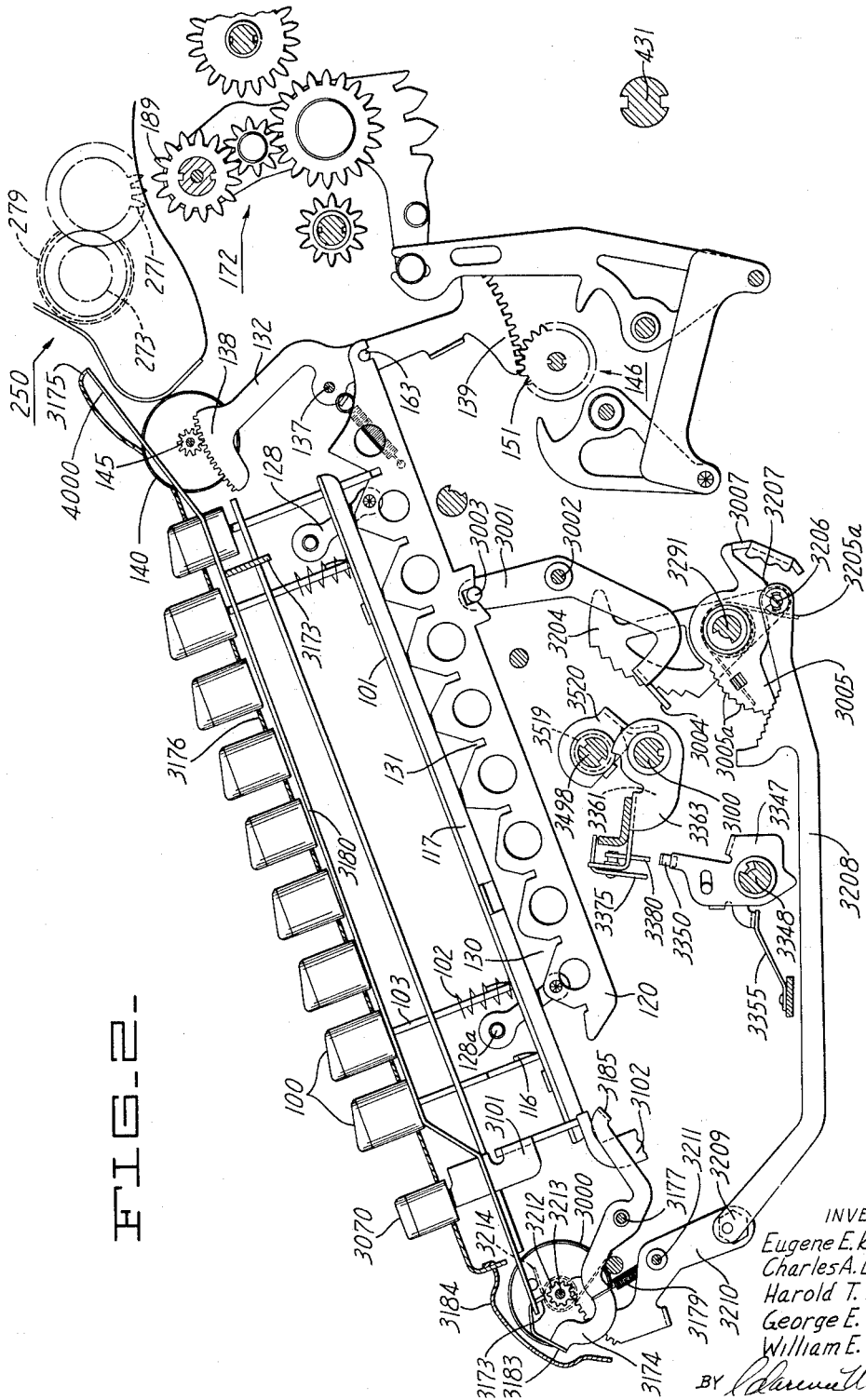

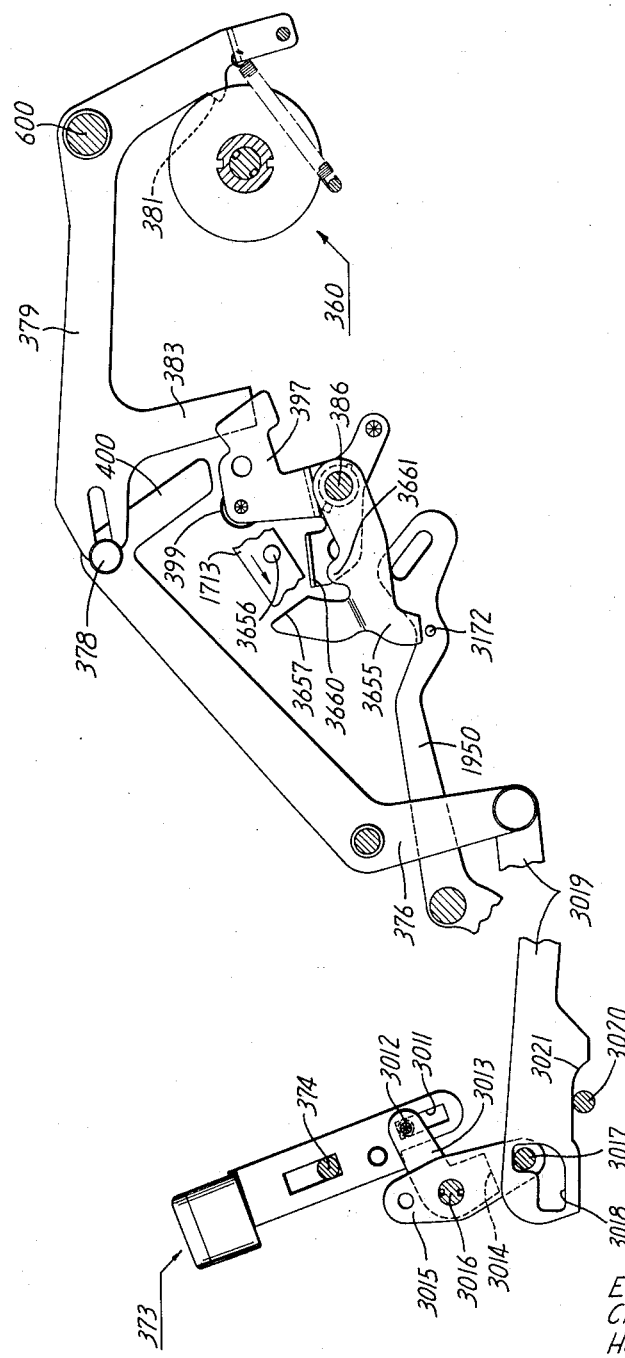

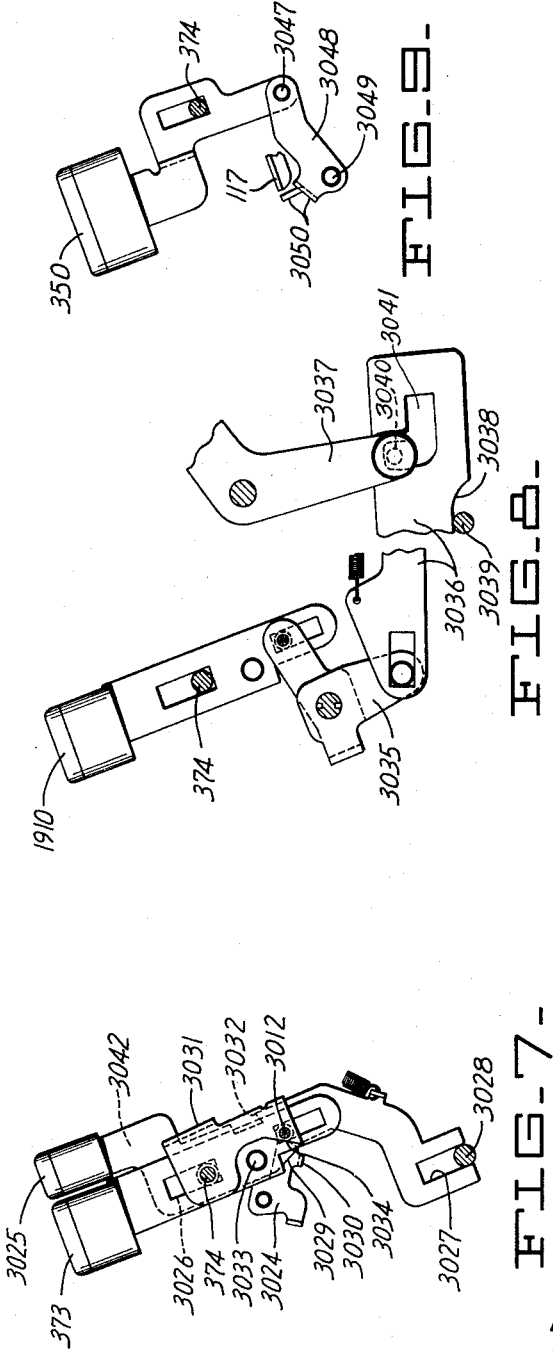

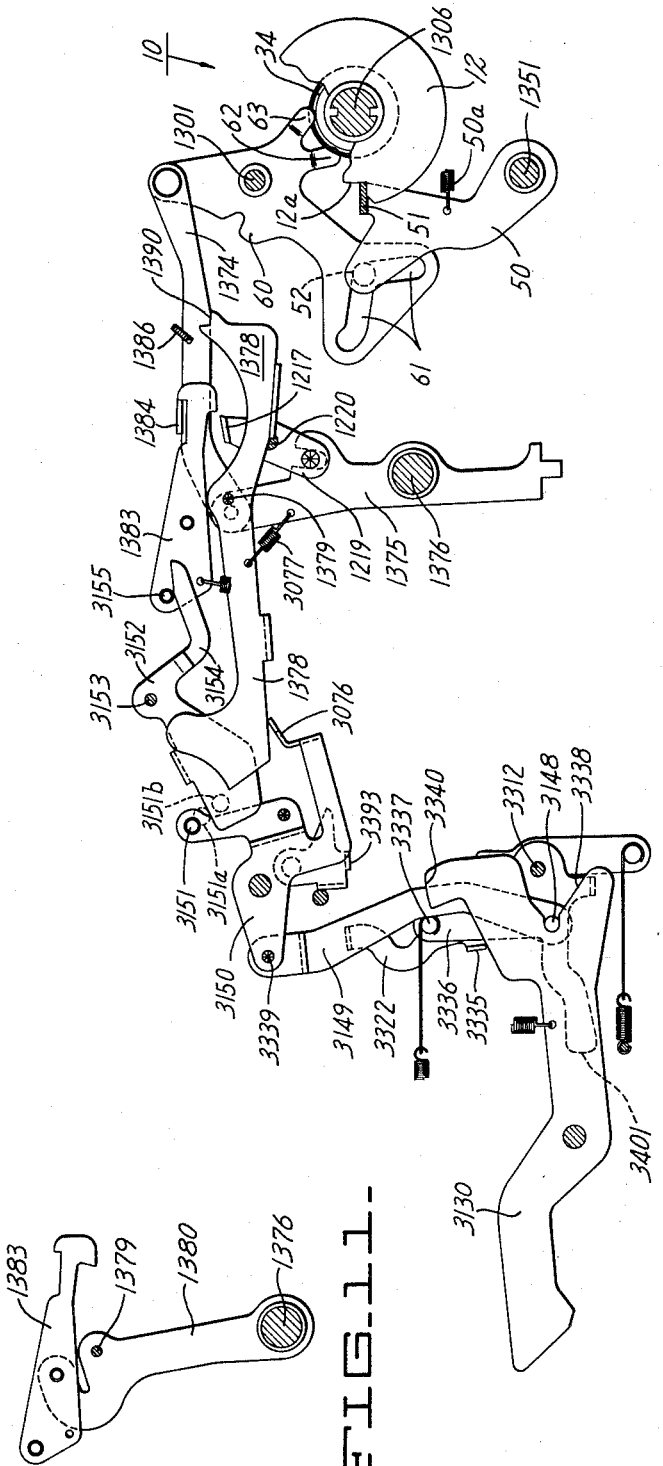

Feb. 6, 1962 E. E. REYNOLDS ET AL 3,019,971
CALCULATING MACHINES
Filed Oct. 22, 1956 31 Sheets-Sheet 7

INVENTORS.
Eugene E. Reynolds.
Charles A. Lindberg.
Harold T. Avery.
George E. Munzing.
William E. Thomas.
BY Clarence W. Martin Feb. 6, 1962   E. E. REYNOLDS ET AL   3,019,971
CALCULATING MACHINES
Filed Oct. 22, 1956   31 Sheets-Sheet 8
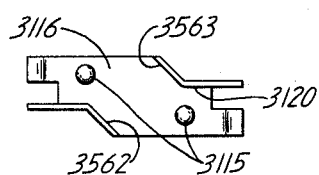
FIG_15_
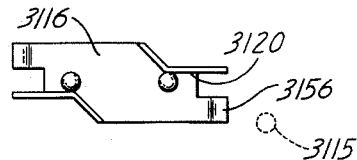
FIG_15A_
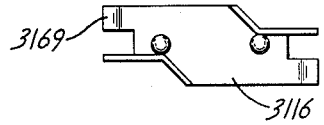
FIG_16A_
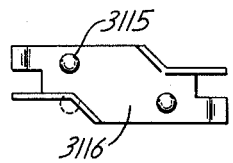
FIG_16_
INVENTORS.
Eugene E. Reynolds.
Charles A. Lindberg.
Harold T. Avery.
George E. Munzing.
William E. Thomas.
BY Feb. 6, 1962 E. E. REYNOLDS ET AL 3,019,971
CALCULATING MACHINES
Filed Oct. 22, 1956 31 Sheets-Sheet 9
FIG_17_
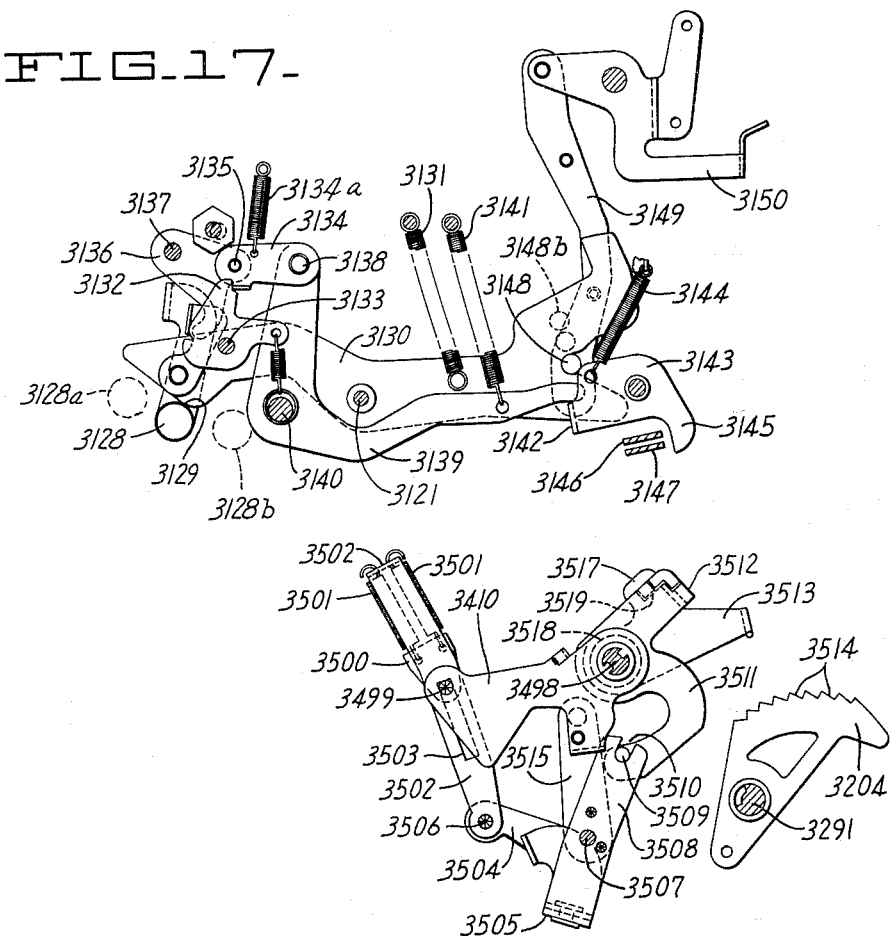
FIG_18_
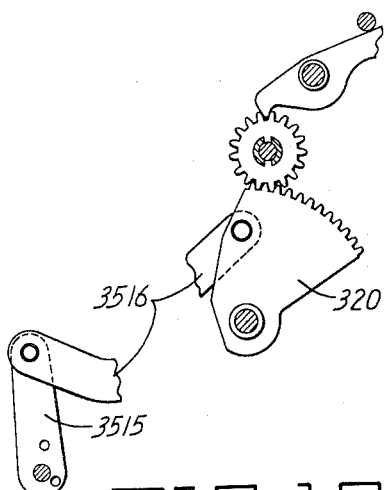
FIG_19_
INVENTORS.
Eugene E. Reynolds.
Charles A. Lindberg.
Harold T. Avery.
George E. Munzing.
William E. Thomas.
BY Clarence W. Martin

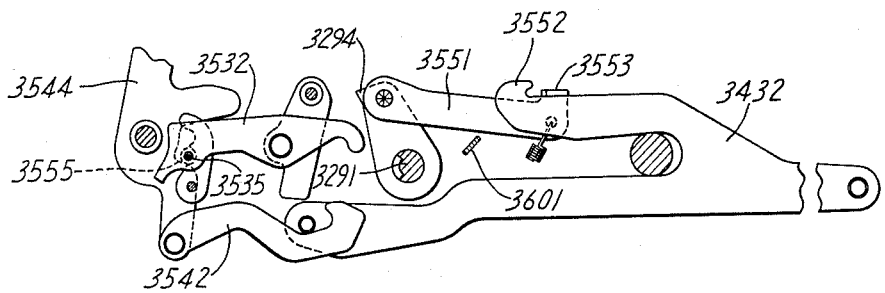
FIG_55_
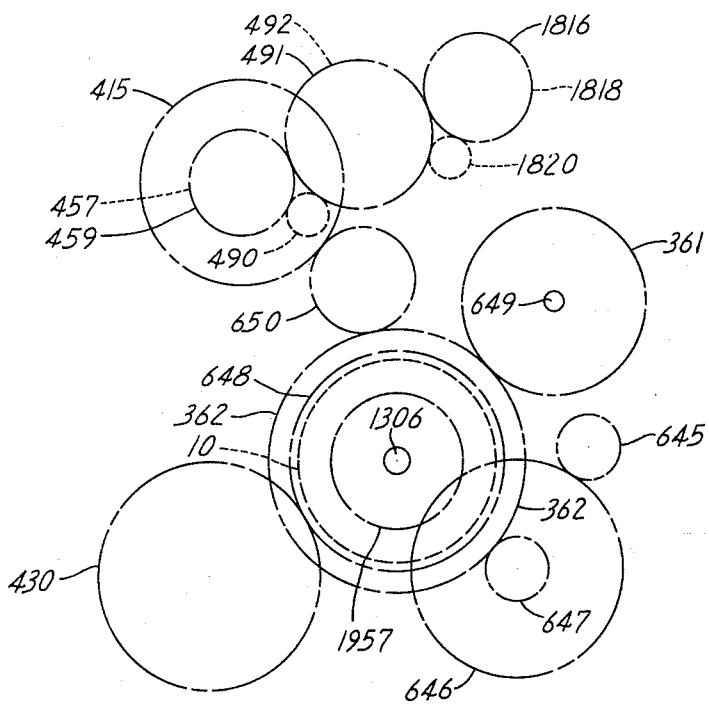
FIG_20_
INVENTORS.
Eugene E. Reynolds.
Charles A. Lindberg.
Harold T. Avery.
George E. Munzing.
William E. Thomas.
BY Clarence W. Martin

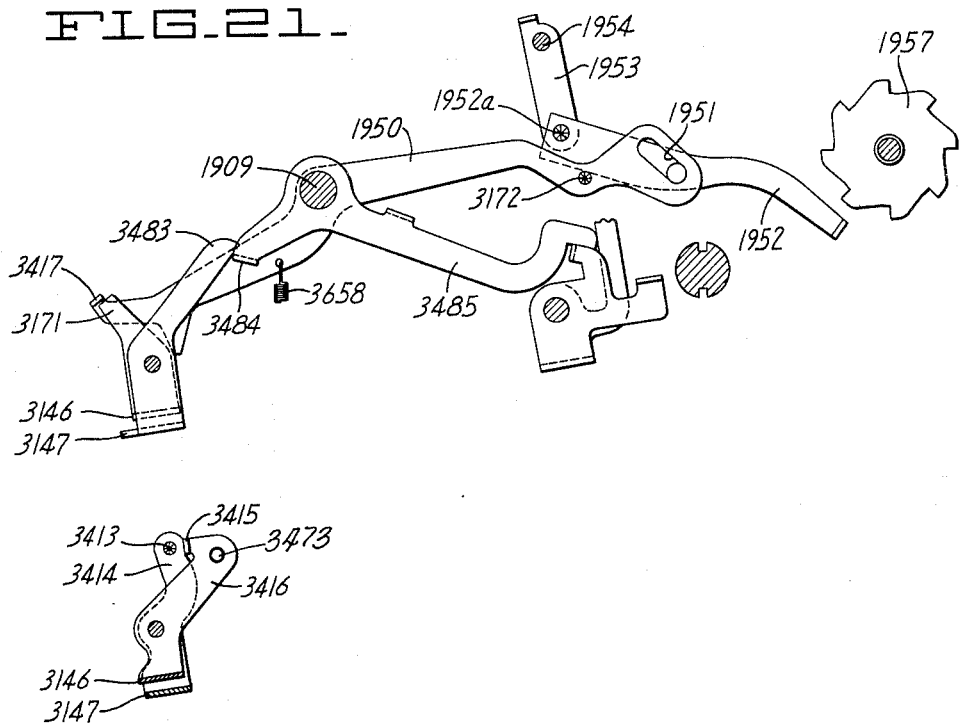
FIG_21_
FIG_21A_
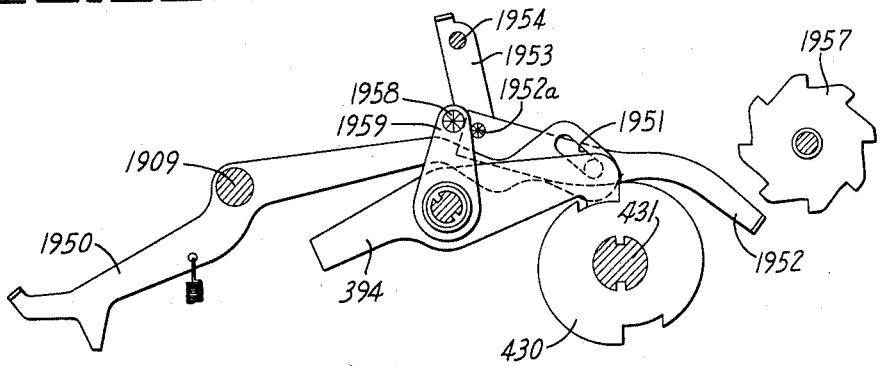
FIG_22_

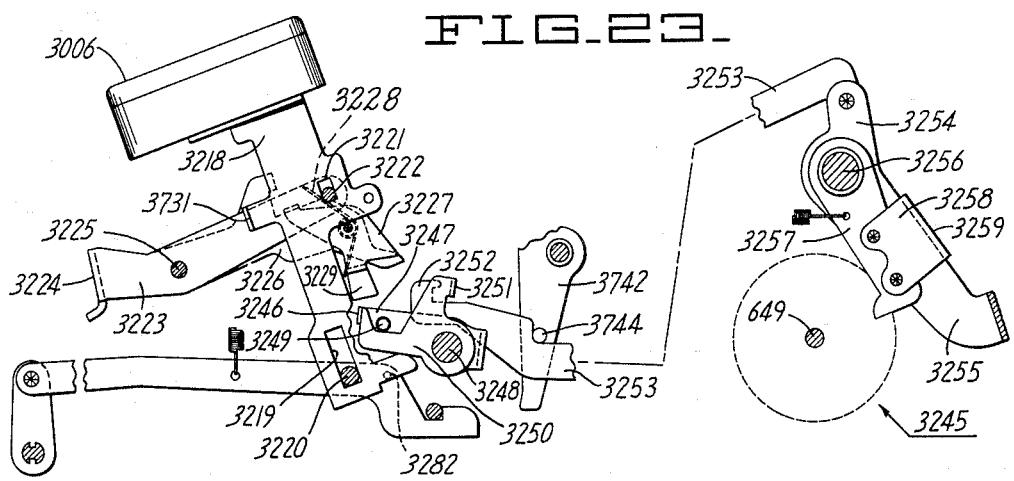
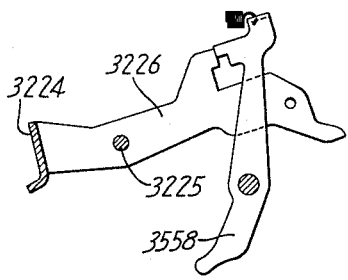
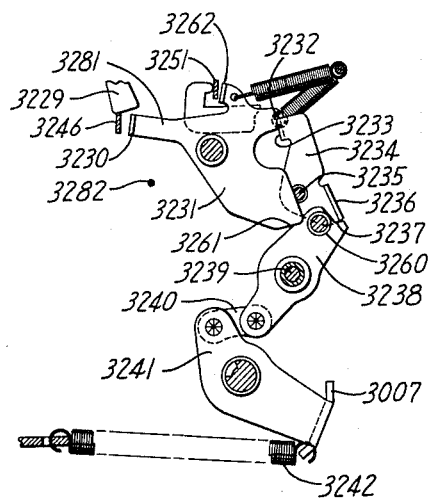
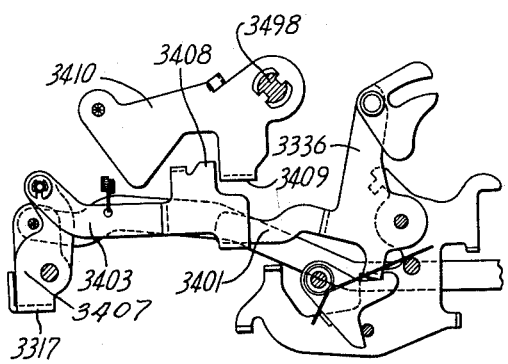

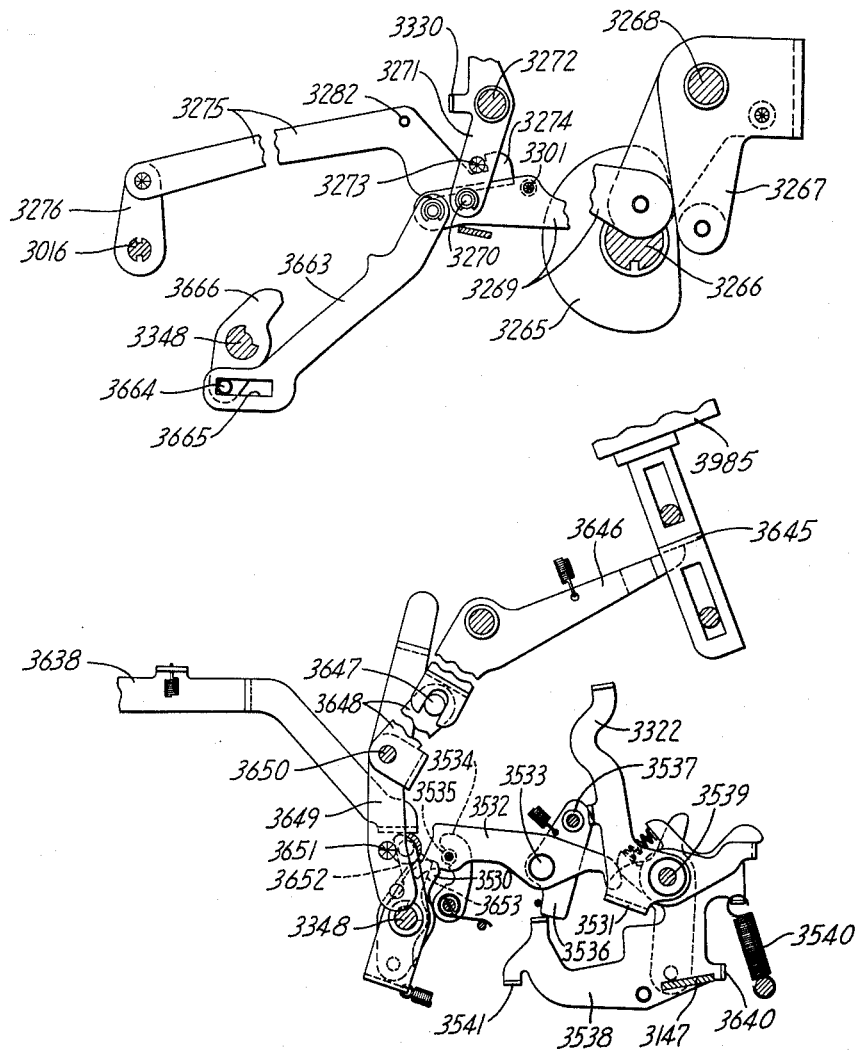

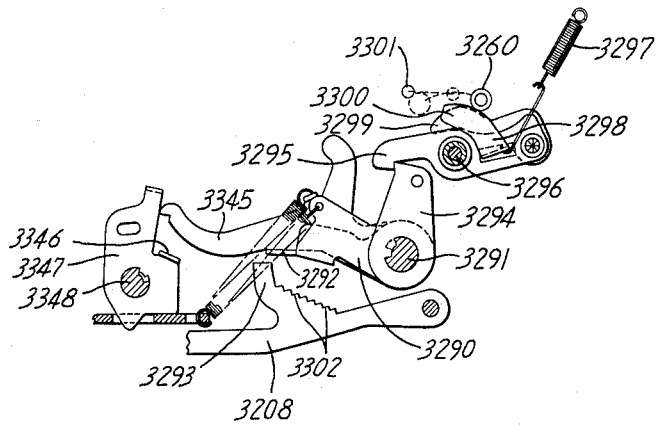
FIG_28_
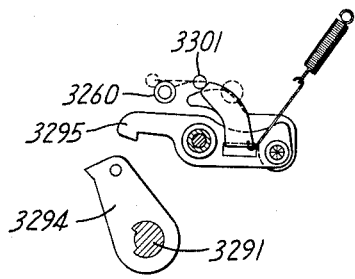
FIG_29_

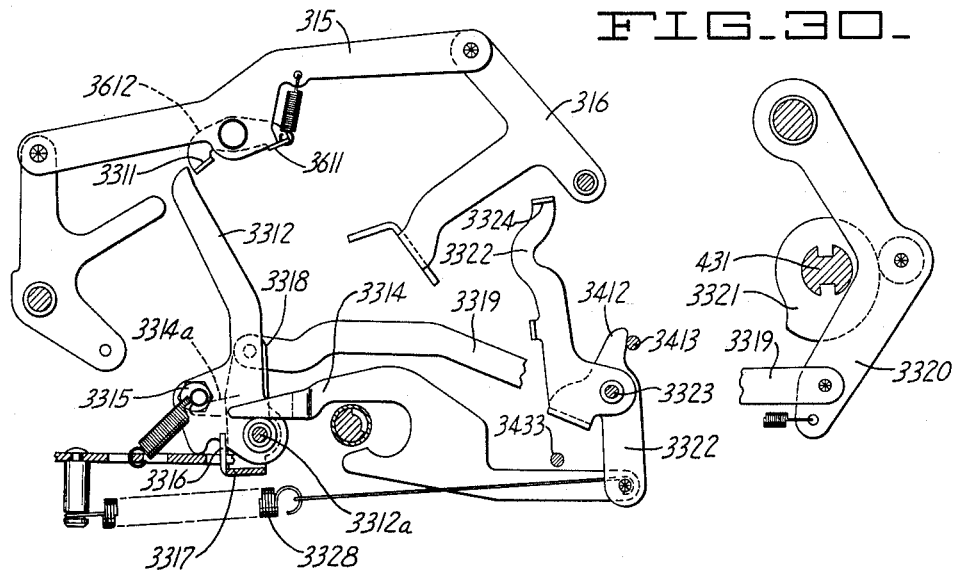
FIG_30_
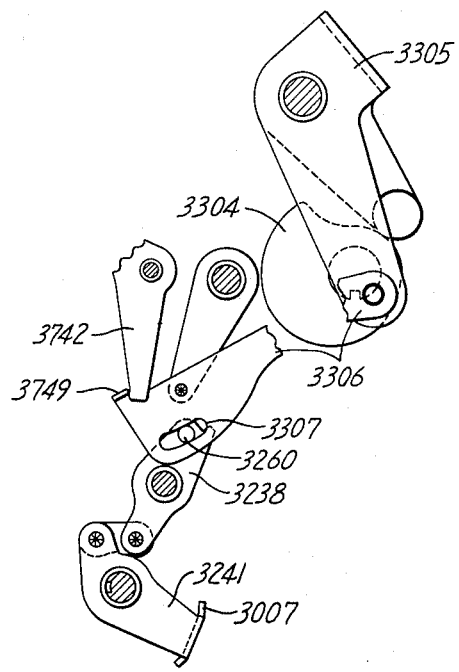
FIG_31_
INVENTORS.
Eugene E. Reynolds.
Charles A. Lindberg.
Harold T. Avery.
George E. Munzing.
William E. Thomas INVENTORS.
Eugene E. Reynolds.
Charles A. Lindberg.
Harold T. Avery.
George E. Munzing.
William E. Thomas.
BY Feb. 6, 1962     E. E. REYNOLDS ET AL     3,019,971
CALCULATING MACHINES
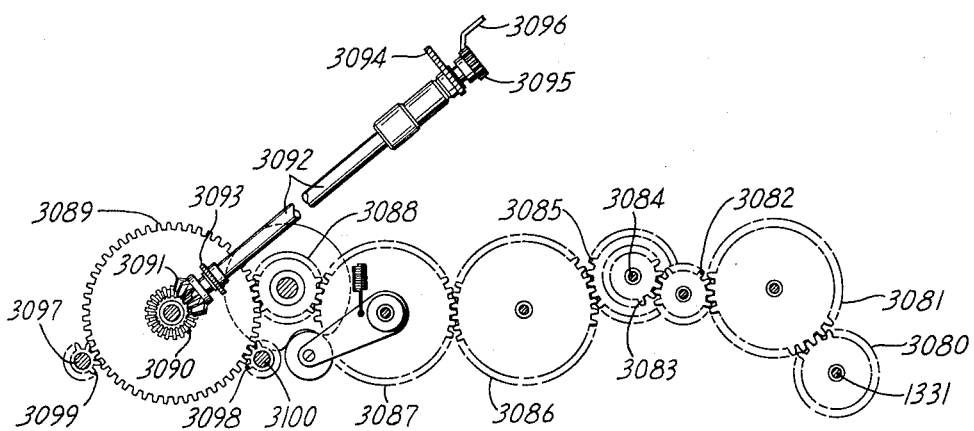
FIG_35_
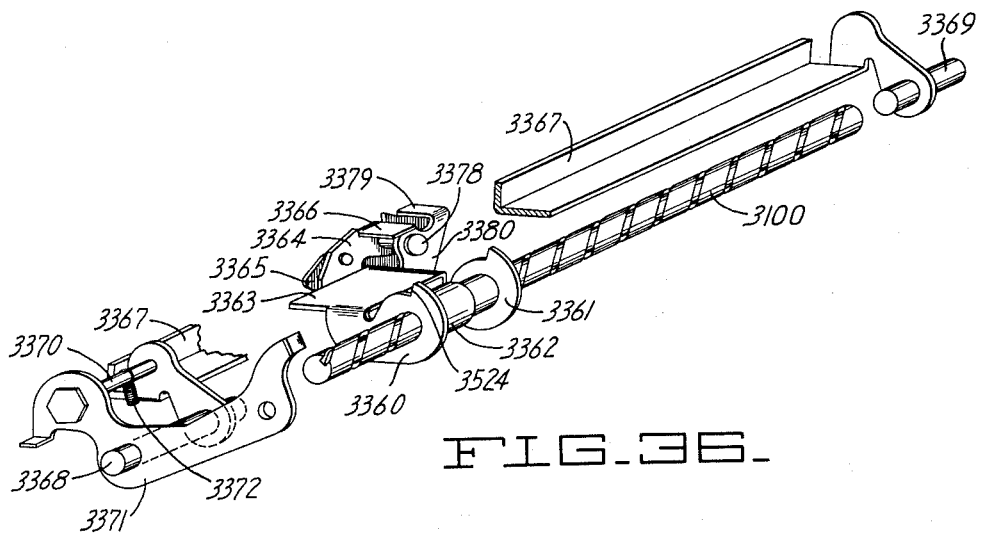
FIG_36_
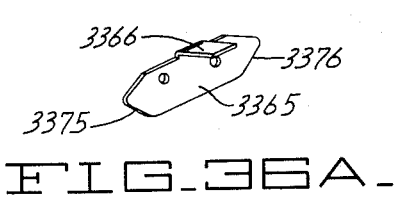
FIG_36A_
INVENTORS.
Eugene E. Reynolds.
Charles A. Lindberg.
Harold T. Avery.
George E. Munzing.
William E. Thomas.
BY Feb. 6, 1962 E. E. REYNOLDS ET AL 3,019,971
CALCULATING MACHINES
Filed Oct. 22, 1956
31 Sheets-Sheet 18

INVENTORS.
Eugene E. Reynolds.
Charles A. Lindberg.
Harold T. Avery.
George E. Munzing.
William E. Thomas.

Feb. 6, 1962 E. E. REYNOLDS ET AL 3,019,971
CALCULATING MACHINES
Filed Oct. 22, 1956 31 Sheets-Sheet 19
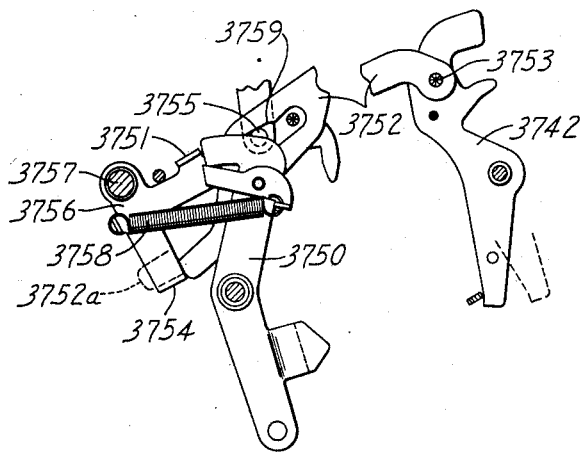
FIG_68_
FIG_39_
INVENTORS.
Eugene E. Reynolds.
Charles A. Lindberg.
Harold T. Avery.
George E. Munzing.
William E. Thomas.
BY

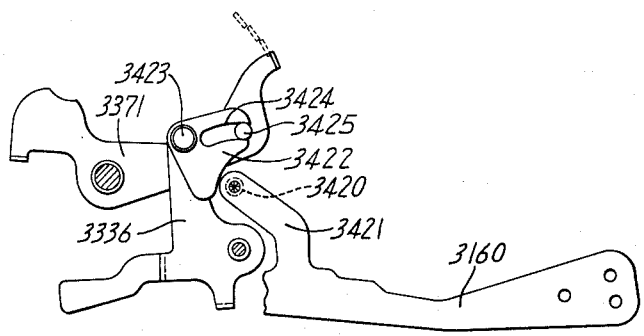
FIG_40_
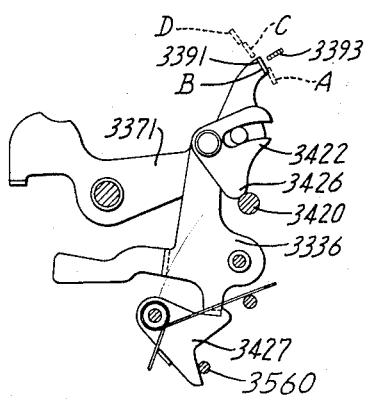
FIG_41_
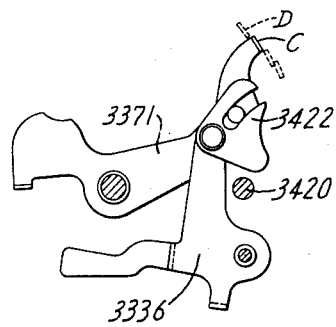
FIG_42_
INVENTORS.
Eugene E. Reynolds.
Charles A. Lindberg.
Harold T. Avery.
George E. Munzing.
William E. Thomas.
BY INVENTORS.
Eugene E. Reynolds.
Charles A. Lindberg.
Harold T. Avery.
George E. Munzing.
William E. Thomas.

Feb. 6, 1962   E. E. REYNOLDS ET AL   3,019,971
CALCULATING MACHINES

Filed Oct. 22, 1956   31 Sheets-Sheet 23

INVENTORS.
Eugene E. Reynolds.
Charles A. Lindberg.
Harold T. Avery.
George E. Munzing.
William E. Thomas.
BY Clarence W. Martin

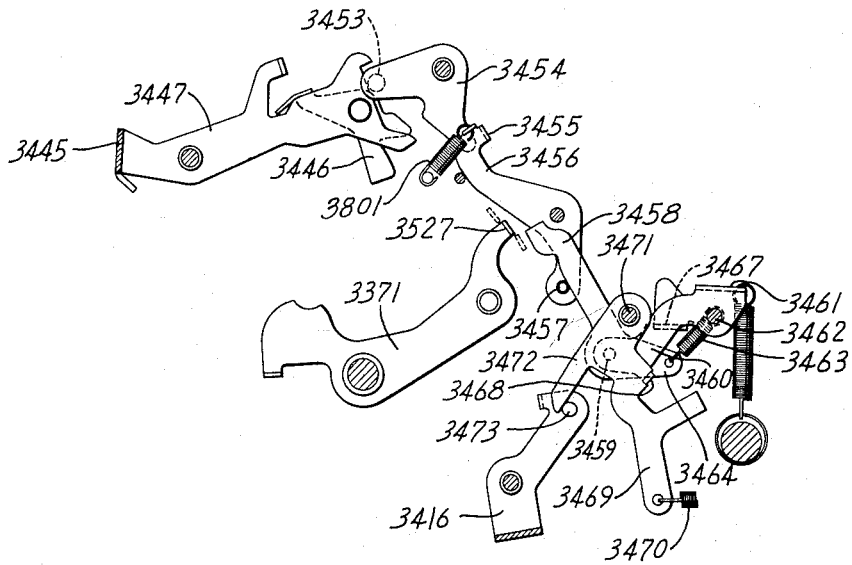
FIG_48_
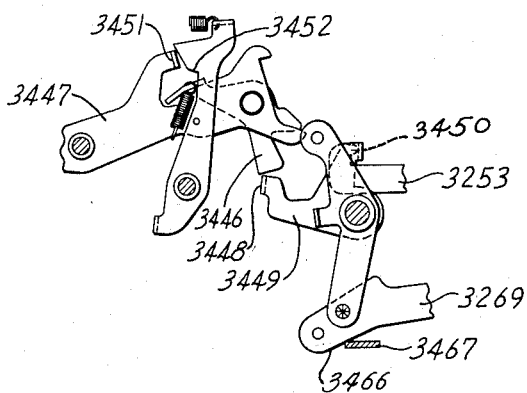
FIG_49_

Feb. 6, 1962    E. E. REYNOLDS ET AL    3,019,971
CALCULATING MACHINES
Filed Oct. 22, 1956    31 Sheets-Sheet 25

INVENTORS.
Eugene E. Reynolds.
Charles A. Lindberg.
Harold T. Avery.
George E. Munzing.
William E. Thomas.

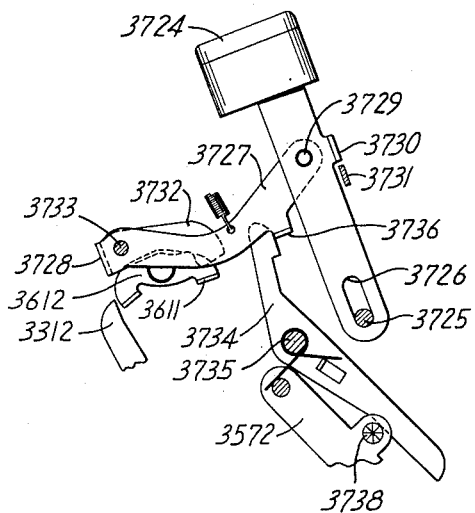
FIG_52_
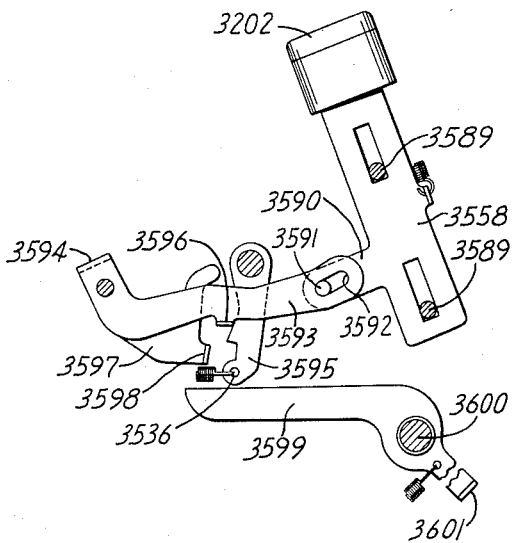
FIG_53_
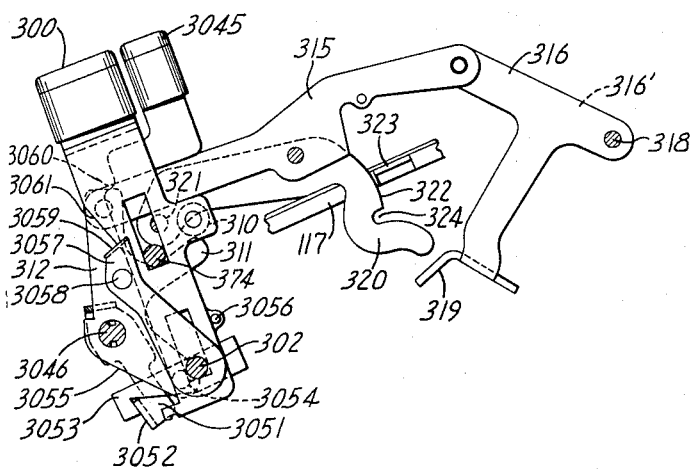
FIG_54_
INVENTORS.
Eugene E. Reynolds.
Charles A. Lindberg.
Harold T. Avery.
George E. Munzing.
William E. Thomas.

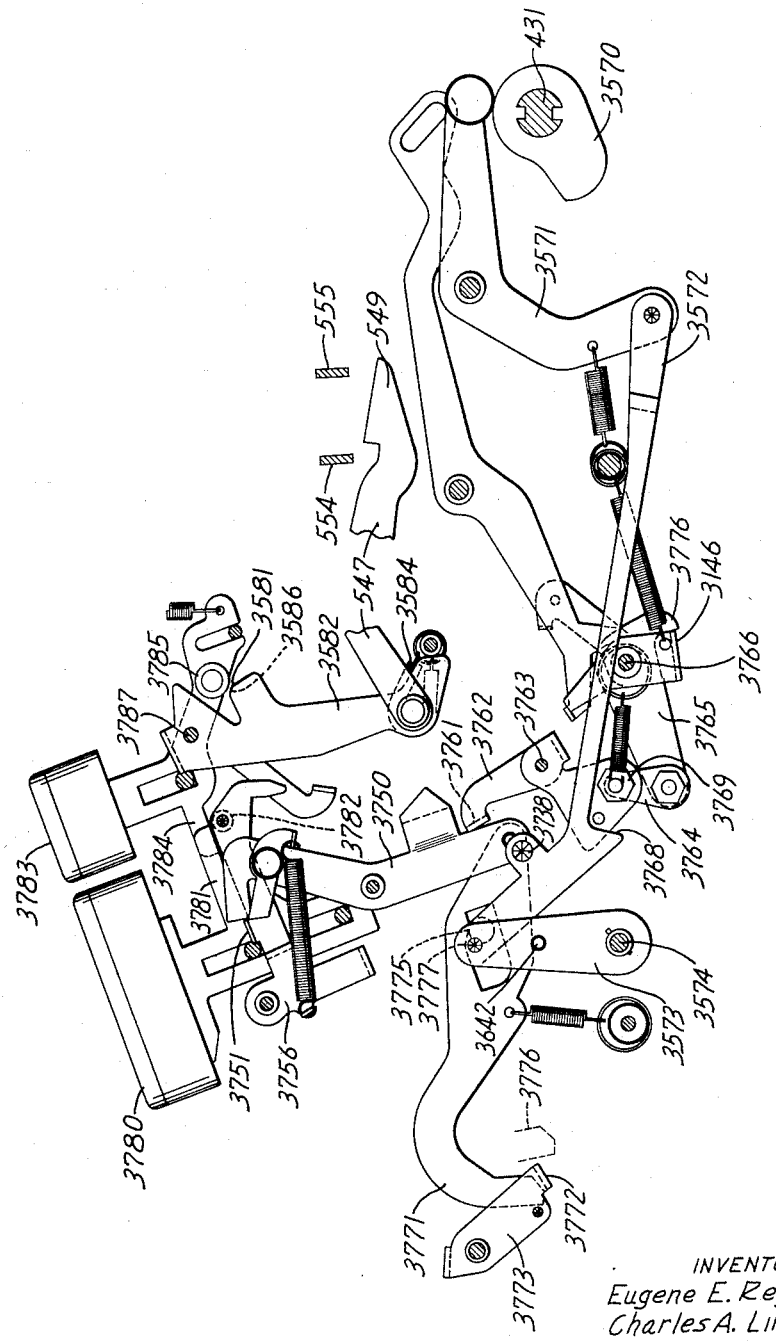

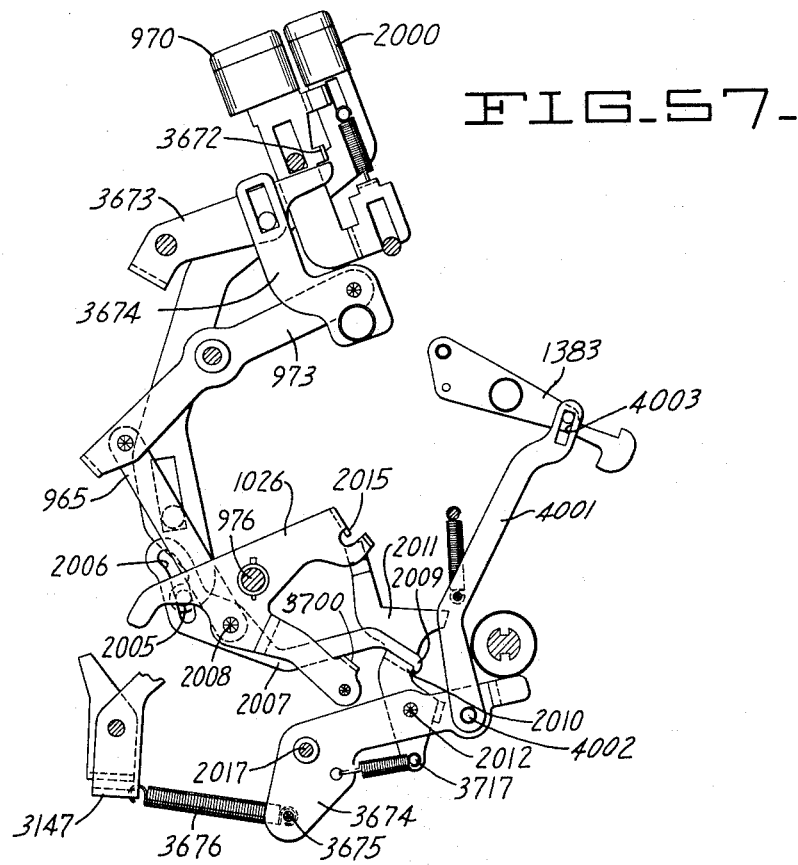
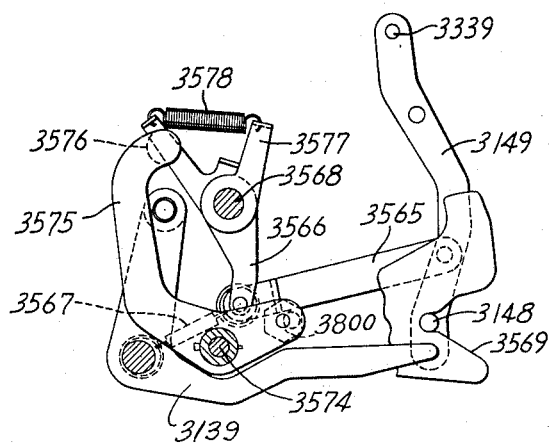

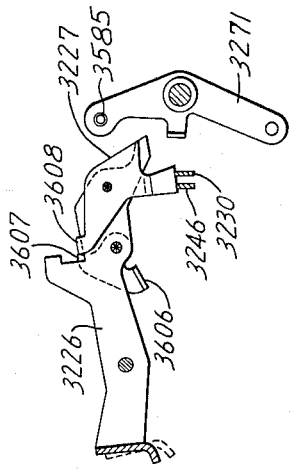
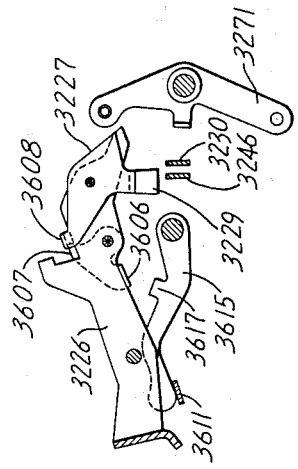
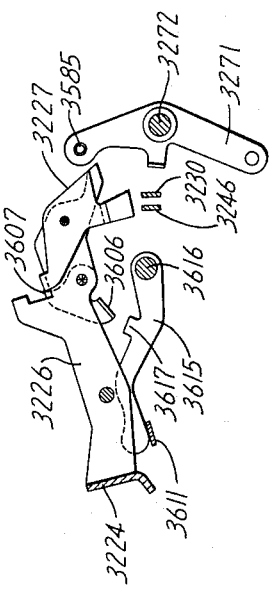
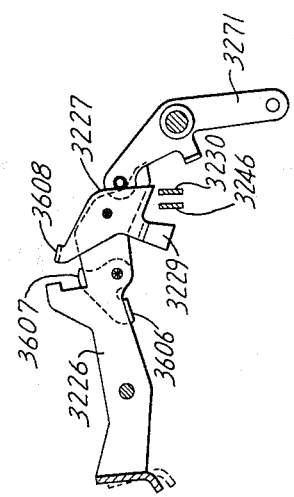
INVENTORS.
Eugene E. Reynolds.
Charles A. Lindberg.
Harold T. Avery.
George E. Munzing.
William E. Thomas.
BY Clarence W. Martin Feb. 6, 1962 E. E. REYNOLDS ET AL 3,019,971
CALCULATING MACHINES
Filed Oct. 22, 1956 31 Sheets-Sheet 30
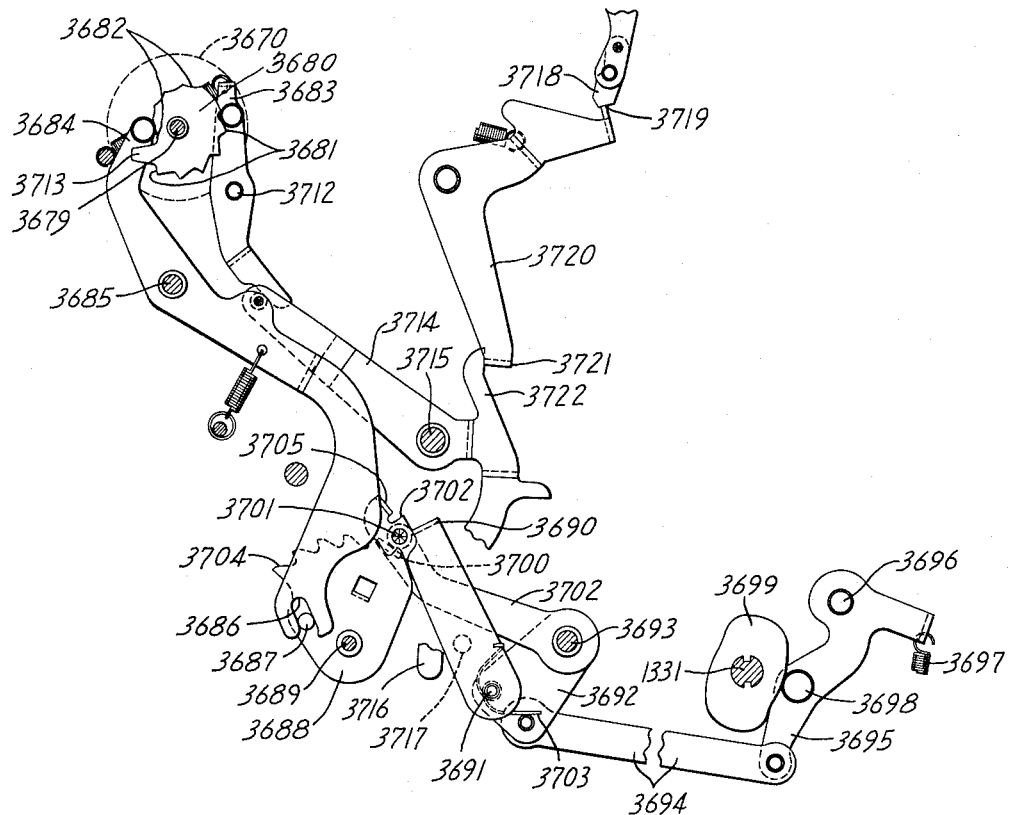
FIG_63_
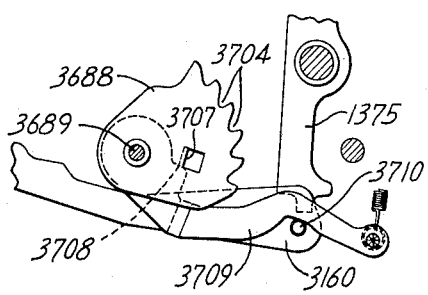
FIG_64_
INVENTORS.
Eugene E. Reynolds.
Charles A. Lindberg.
Harold T. Avery.
George E. Munzing.
William E. Thomas.
BY Clarence W. Martin INVENTORS.
Eugene E. Reynolds.
Charles A. Lindberg.
Harold T. Avery.
George E. Munzing.
William E. Thomas.
BY Clarence W. Martin 3,019,971
Patented Feb. 6, 1962

3,019,971
CALCULATING MACHINES
Eugene E. Reynolds, Richmond, Charles A. Lindberg, Lafayette, Harold T. Avery, Oakland, George E. Munzing, Pleasant Hill, and William E. Thomas, San Francisco, Calif., assignors to Smith-Corona Marchant Inc., a corporation of New York
Filed Oct. 22, 1956, Ser. No. 617,454
31 Claims. (Cl. 235—63)

The present invention relates to a calculating machine having a register which is shiftable relative to a plural order keyboard and more particularly concerns improved calculation control mechanisms in combination with an integrated decimal and shift control mechanism by means of which the depression of any one of a plurality of ordinally arranged decimal keys serve to: (1) establish the location of three respective decimal indicators for each of two factor indicators and a result register; (2) shift the carriage to a selected decimal position; and (3) establish a mechanical representation of the decimal position, whereby at the conclusion of a plural order calculation the carriage is returned to a location in which the register decimal indicator correctly points off the decimal in the result register.

In calculating machines having a plural order keyboard, all factors are usually entered in the keyboard in correct relationship to a selectively set keyboard decimal indicator. In problems of addition and subtraction the keyboard decimal may also serve as an indication of the decimal in the accumulator register for in these cases the problems do not entail shifting of the register carriage and therefore the decimal position in the register is always in alignment with the keyboard decimal indicator. In problems of multiplication and division, however, the register carriage is invariably shifted during the calculating operation and therefore the relationship between the keyboard decimal and the register decimal position is lost. Furthermore, since in multiplication operations the product decimal position is determined by the sum of the number of fractional digits in the multiplier and multiplicand, the problems of locating the product decimal indicator has had to be met by performing any one of several preliminary operations. For example, in known calculators having two keyboards such as disclosed in the Patent No. 2,371,752, issued March 20, 1945, in which the operator enters the multiplier and multiplicand factors prior to starting the calculating operation, the multiplying operation is invariably initiated with the register carriage standing in an extreme end position. Since the entry of the product is always initiated with the carriage standing in the same position, and the carriage is shifted a variable number of orders depending upon the total number of whole and fractional digits in the multiplier factor, the keyboard decimal indicator cannot serve as a decimal indicator for the product register. The operator therefore must manually set the product decimal indicator for each problem, and relies upon the aforementioned rule of the sum of fractional digits to determine the location of the register decimal point. Furthermore, if a series of products are to be accumulated around an established product decimal point, and the multiplier factors contain a variable number of digits, then the operator must resort to "pumping in" additional zero digits during entry of the multiplier factors.

In another type of calculator such as disclosed in the Patent No. 2,271,240, issued January 27, 1942, the multiplicand is entered in the keyboard and a separate multiplier entry mechanism, comprising a row of "live" multiplier keys, is provided to initiate the multiplying operation which is then carried out as fast as the multiplier entry keys are depressed. Since the register carriage may be standing in any selected ordinal position at the beginning of the operation, the usual practice is to pre-set the product register decimal point in alignment with the keyboard decimal before any values are entered into the machine and then, before initiating the multiplication operation, to manually shift the register in the appropriate direction a variable number of orders depending upon the ordinal location of the first signficant multiplier digit.

The present invention eliminates the necessity of mentally determining and pre-setting the product decimal point, and also eliminates manual pre-shifting of the carriage. A single keyboard is used for entry of all factors in multiplying operations, and the depression of a selected one of a plurality of ordinally arranged decimal storage keys establishes the respective decimal points for a multiplicand factor indicator, a multiplier factor indicator and the product register. All that is required of the operator is to enter the multiplier factor in correct relationship to a selectively set keyboard decimal indicator and depress a key which transfers this value into a multiplier factor indicator. The operator then enters the multiplicand in the keyboard in correct relationship to the decimal indicator and depresses an operation initiating key. The multiplication operation automatically determines the correct point of ordinal entry in the product register, regardless of the value and number of multiplier digits, and at the conclusion of the multiplication operation the product is displayed in correct relationship to the product decimal indicator.

Products may be accumulated merely be repeating the above process of factor entry and initiation of multiplication operations. The products are invariably entered in correct relationship to the product decimal regardless of the respective values of the multiplicand and multiplier factors.

The automatic display of any result in correct decimal relationship to the decimal indicator for the accumulator, or result, register is made possible by integrating the decimal keys with the shift control mechanism. Each time a different decimal key is depressed to indicate new locations for the two factor indicators, the carriage is automatically shifted to properly locate the register with respect to the new register decimal indicator. Furthermore, a shift control mechanism is conditioned for returning the register to this same position upon the termination of the multiplication operation so that the correct decimal relationship is re-established between the register and its decimal indicator. In the present disclosure, the location of the carriage determined by depression of a decimal key is referred to hereinafter as the "home" position. It will be apparent that the invention is not limited to decimal point indication and is equally applicable to determining and indicating points in any radix system. An example of an actual multiplying operation will clarify the relationship between the decimal keys and the shift mechanism. The operator first enters the multipler value in the keyboard around a selected decimal point which is established by depressing a selected one of the interordinal decimal keys either prior to or during the value entry operation. At such time the carriage is shifted to its "home," or initial decimal, position. Then an "X" key (multiplier value entry key) is depressed to transfer the multiplier value to a multiplier factor indicator, where the multiplier value is correctly shown in relationship to the factor decimal indicator. The depression of the "X" key also clears the keyboard and initiates an automatic shift of the carriage to a position corresponding to the highest significant multiplier digit entered in the factor indicator. The "home" position of the carriage corresponds to the units order of the multiplier value and therefore, if the multiplier is a value of 246.21, for example, a two order rightward shift of the carriage is required to shift the carriage from the "units" order to the "hundreds" order of the multiplier. On the other hand, if the multiplier is a value of 0.625 then the carriage is shifted one order to the left to bring the carriage to the "tenths" order of the multiplier. If the multiplier is a value of 7.85, then since the highest significant multiplier digit, the "7," stands in the units order, no shift is required from the "home" position.

The multiplicand value is then entered in the keyboard in correct relation to the keyboard decimal indicator and upon depression of an "equals" key, the product and counter registers are reset to zero followed by an automatic plural order multiplication. Multiplication operations start with the highest significant multiplier digit and proceed through successively lower order multiplier digits until the multiplier value is exhausted at which time the product register is automatically shifted back to its home position. In this position the correct relationship is reestablished between the product register and the product decimal pointer so that the result may be read without any decimal manipulation on the part of the operator. Alternatively, negative multiplication is initiated by depression of a negative equals key. Depression of a stop key during the multiplying operation, terminates multiplication in the current order and shifts the carriage back to the "home" position.

Since the carriage is returned to its "home" position at the conclusion of the multiplying operation, the product register is shifted to a position of decimal alignment with the keyboard decimal, therefore, values may be entered into the keyboard and then either added to or subtracted from the product without any attention on the part of the operator as to the decimal relationship between the selected amounts and the product. Also, since all calculations are initiated with the carriage standing in "home" position, a series of products may be accumulated around a fixed decimal without any attention on the part of the operator other than to enter the various factors and depress the proper initiating keys.

Other novel features disclosed in connection with the decimal indicating mechanism are: (1) a multiplier constant key which may be depressed at any time prior to the conclusion of a multiplying operation to thereby lock the multiplier value in the storage mechanism; (2) a stop key for terminating multiplication in the current order of operation; (3) a key for clearing the multiplier factor indicator and returning the carriage to its home position; (4) means for locking various registers and the keyboard against automatic clearing operations with means for superseding the locking means upon depression of certain operation initiating keys; and (5) a new dividend-divisor line-up control mechanism.

A main object of the present invention is to simplify the setting of decimals in the factor indicators and result registers of calculating machines.

Another object is to move a plurality of decimal indicators to respective positions of display under the control of a single key.

Another object is to change the location of a register decimal indicator, and/or a factor indicator every time the keyboard decimal indicator is changed.

Another object is to correlate the decimal entry mechanism with a calculating control mechanism so that at the end of a calculation, a decimal indicator will properly point off the decimal position in the result register.

Another object is to provide an improved multiplication mechanism.

Still another object is to enter a multiplier factor in the machine and initiate a multiplying sequence in which the machine does not idly operate through "blank" or zero cycles either to the right or to the left of the significant multiplier orders.

A further object is to automatically shift the register carriage to a position corresponding to a predetermined significant multiplier order prior to the initiation of the multiplication operation.

Another object is to sense the location of significant multiplier values relative to a decimal indicator and to shift the product register relative to the keyboard under the control of the sensing mechanism.

Another object is to unify the carriage shift mechanism and the decimal selection mechanism so that the carriage is shifted to respective positions in accordance with the selected decimal positions.

Another object is to shift the carriage every time the decimal indicator for the keyboard is changed from one position to another.

Still another object is to adjust the shift mechanism for a right shift, a left shift or a non-shift condition in accordance with the value of the multiplier.

A further object is to transfer a value standing in the keyboard to a multiplier factor indicator and then to shift the product register a respective number of orders in accordance with the value of the multiplier factor.

A further object is to enter, by a single manipulation, respective decimal indicators in the keyboard and the multiplier factor indicator, and then to transfer the keyboard value in correct decimal relationship to the factor indicator.

Still another object is to shift the register at the end of a calculating operation, to a decimal indicating position which is representative of the sum of the number of decimal orders in the two factors of the calculation.

Another object is to stop a multiplying operation in any selected order of multiplication and then to shift the product register relative to a decimal indicator to a position of correct decimal display.

Another object is to reset the multiplier factor indicator to zero and shift the product register to a predetermined starting position.

Another object is to provide a key which may be depressed at any time during a multiplying operation to retain the entire multiplier factor as a constant.

A further object is to provide an improved dividend line-up mechanism whereby a single member controls the shifting mechanism for a constant predetermined number of ordinal shifting operations from any one of a plurality of selected starting positions.

Another object is to lock the respective registers against automatic clearance operations and to supersede the locking mechanism upon the initiation of a respective calculation.

Still another object is to disable an automatic clearance mechanism with respect to the keyboard and then to manually release all of the keys while maintaining the automatic keyboard clearance mechanism in a disabled condition whereby a subsequent factor, entered in the keyboard, is locked against automatic clearance.

Other objects and advantages will appear from the following description in which:

FIG. 1 is a top plan view of a calculating machine embodying the present invention.

FIG. 2 is a right side view in section showing a portion of the keyboard, the value entry mechanism, the multiplier storing mechanism, the decimal storage mechanism, the numeral wheel actuators, and the accumulator register.

FIG. 3 is a right side sectional view of the middle dial clear key and clear clutch.

FIG. 4 is a right side sectional view of the dividend entry key.

FIGS. 5 and 6 are right side sectional views of respective mechanisms for disabling automatic operations of the upper and middle dial clear clutches.

FIG. 7 is a right side view of the middle dial clear key and the middle dial lock key.

FIG. 8 is a right side view of the upper dial clear key.

FIG. 9 is a side side view of the keyboard unlock key.

FIG. 10 is a right side sectional view of the shift clutch and associated control mechanisms.

FIG. 11 is a right side view of a portion of the shift control mechanism.

FIGS. 15, 15A, 16 and 16A are front views of a portion of a shift control member.

FIG. 17 is a right side view of part of the shift control mechanism.

FIG. 18 is a right side view of the multiplier value sensing mechanism.

FIG. 19 is a right side view of a portion of the multiplication control mechanism.

FIG. 20 is a schematic illustration of the motor drive train to various clutches, as seen from the right side of the machine.

FIGS. 21, 21A and 22 are right side views of the setting clutch engaging mechanism.

FIGS. 23, 23A and 24 are right side views of the multiplier value entry key and associated mechanisms.

FIG. 25 is a right side view of a portion of the multiplication control mechanism.

FIG. 26 is a right side view of a master clutch cam and associated mechanisms.

FIG. 27 is a right side view of the stop key and the mechanism for terminating multiplication operations.

FIGS. 28 and 29 are right side views of the multiplier value entry mechanism.

FIG. 30 is a right side view of the mechanism for automatically clearing a multiplier value out of the keyboard.

FIG. 31 is a right side view of the restore mechanism for a portion of the multiplier value entry mechanism.

FIG. 35 is a right side view of the gear train from the shift clutch to the carriage, the decimal-shift control mechanism, and the multiplier shift control mechanism.

FIGS. 36 and 36A are projections as seen from the right rear of a portion of the multiplication shift control mechanism.

FIGS. 37 to 44 inclusive are right side views of a portion of the shift direction control mechanism.

Figure 45:
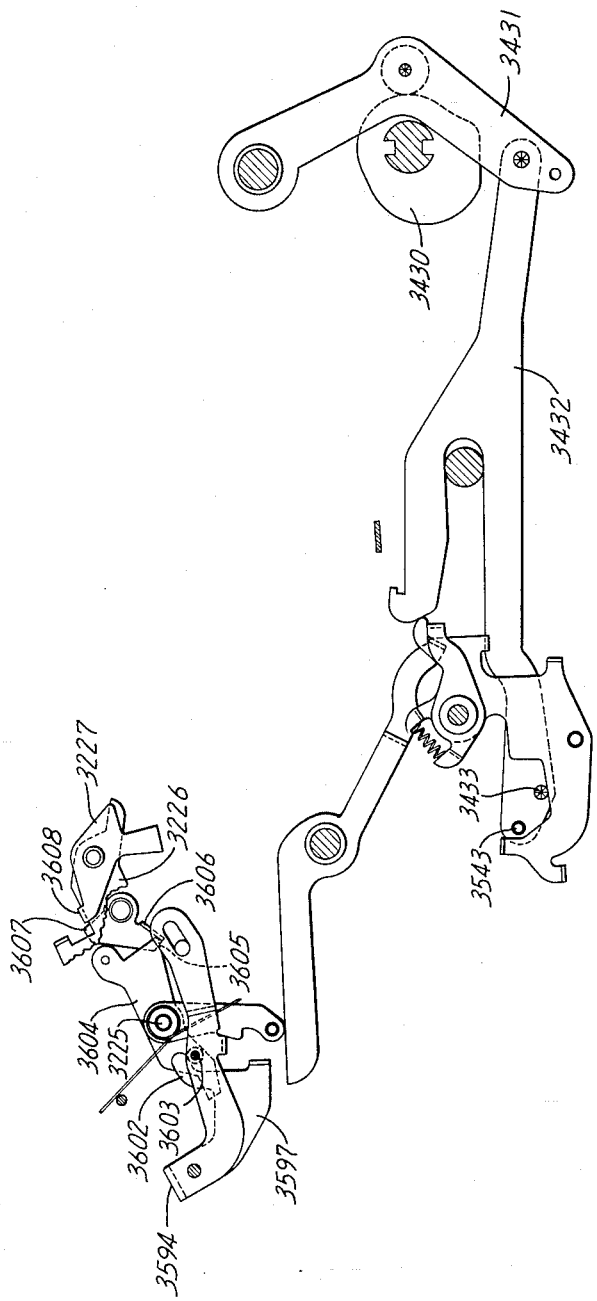

FIG. 45 is a right side view of a portion of the mechanism operable by the X-key and a master clutch cam.

Figure 46:
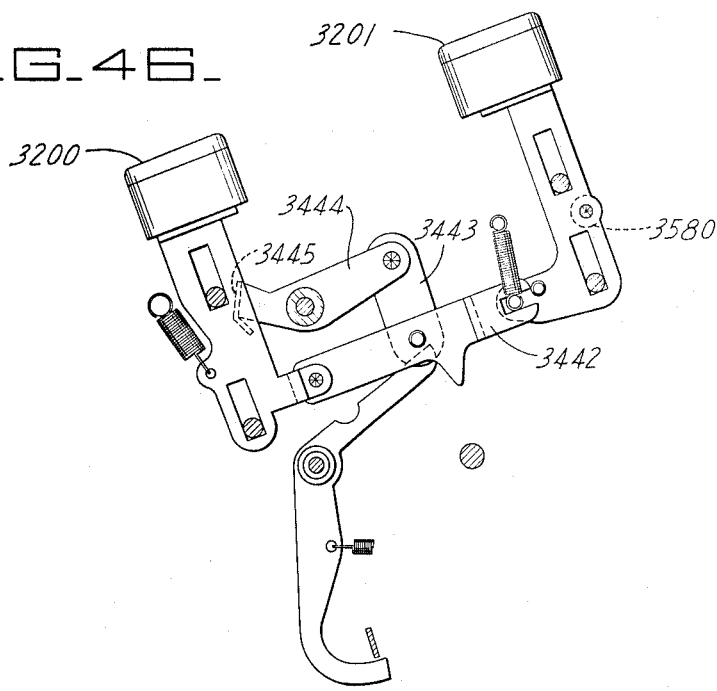

FIG. 46 is a right side view of the equals (=) and negative equals (Neg. =) keys.

Figure 47:
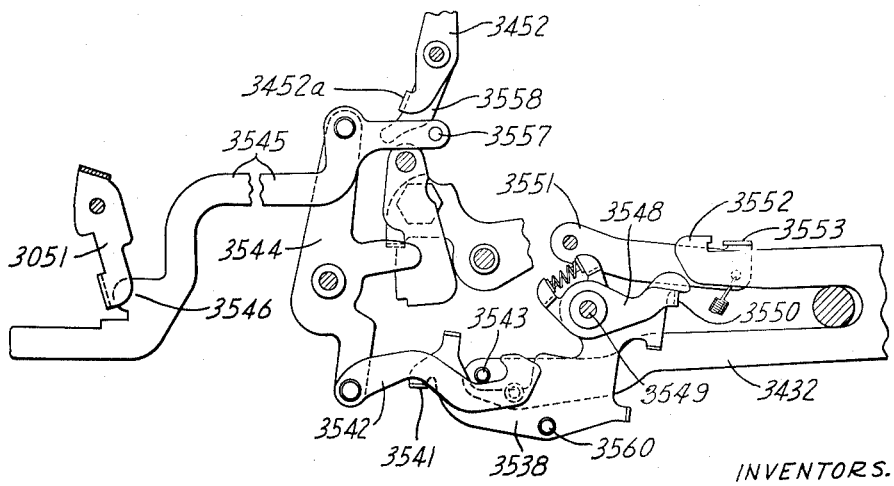

FIG. 47 is a right side view of a portion of the multiplication terminating mechanism.

FIGS. 48 and 49 are right side views of a portion of the multiplication initiating mechanism.

Figure 50:
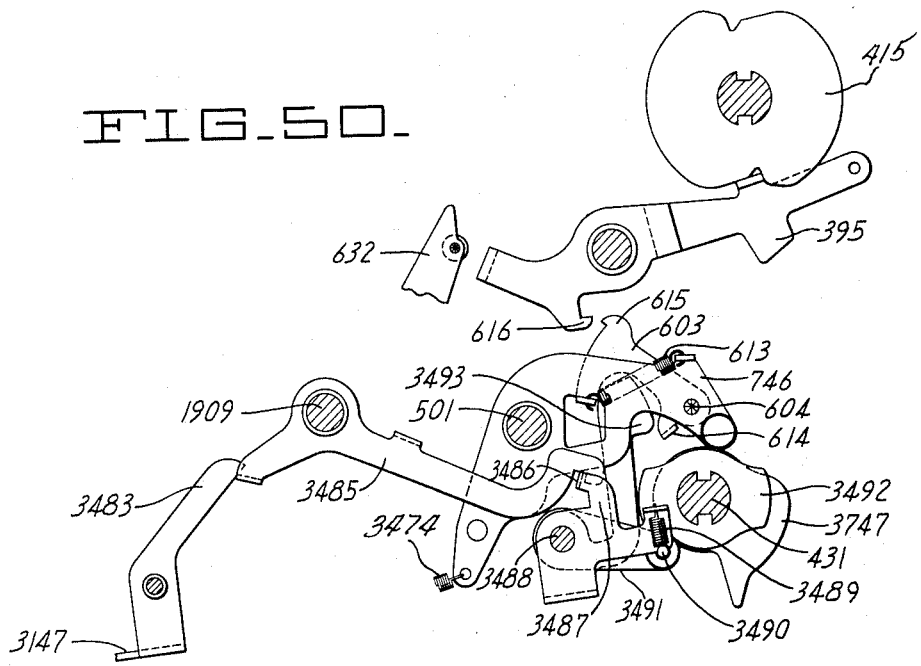
Figure 51:
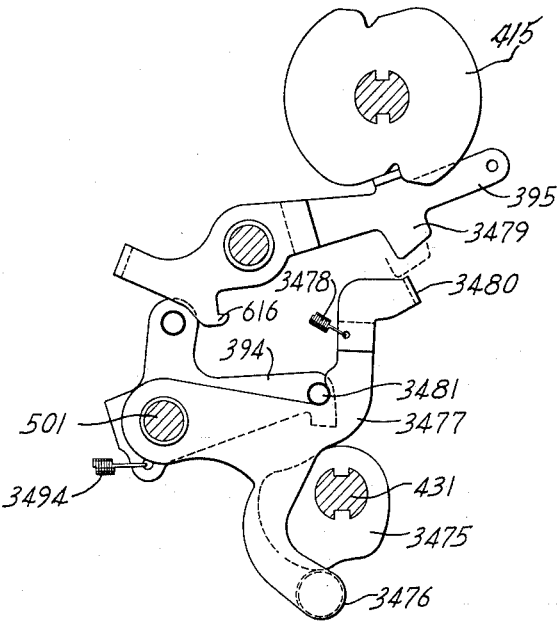

FIGS. 50 and 51 are right side views of the main clutch and associate mechanisms.

FIG. 52 is a right side view of the square X-key.

FIG. 53 is a right side view of the front dial lock key.

FIG. 54 is a right side view of the keyboard clear and lock keys.

FIG. 55 is a right side view of a portion of the multiplication terminating mechanism.

FIG. 56 is a right side view of the plus and minus keys and associated mechanisms.

FIG. 57 is a right side view of the divide and line-up keys and control mechanisms associated therewith.

FIG. 58 is a right side view of a booster mechanism for initiating a return shift upon completion of multiplication operations.

FIGS. 59 to 62 are right side views of a portion of the multiplier storage control mechanism.

FIGS. 63 and 64 are right side views of the control mechanism for determining the number of ordinal shifting operations during line-up operations in division.

Figure 65:
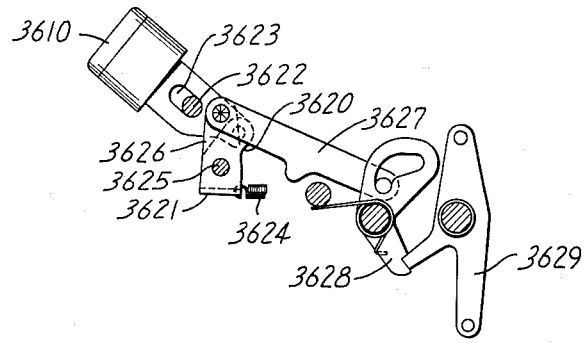
Figure 66:
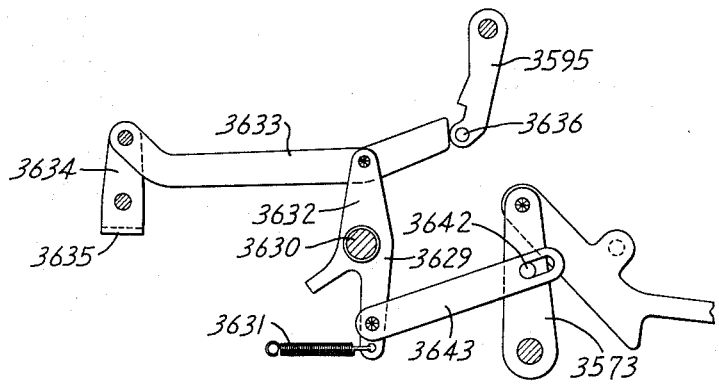
Figure 67:
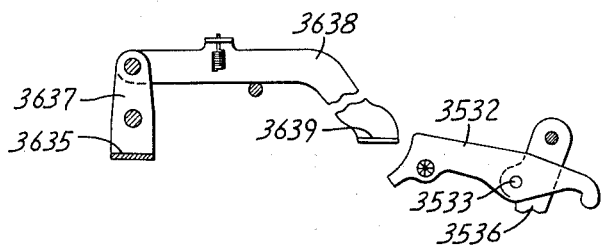

FIGS. 65 to 67 are right side views of the front dial clear key and related mechanisms.

FIG. 68 is a schematic illustration of the operation of the multiplier-shift control mechanism.

General description

The present invention is disclosed as embodied in a calculating machine, the basic elements of which are shown in U.S. Patent No. 2,271,240, issued January 27, 1942. This machine includes a register carriage shiftable relative to the main body of the machine in which are included the value entry keyboard, the numeral wheel actuators, the shifting and clearance mechanisms, and various controls for initiating the calculating operations. In the machine of the present invention, the major deviations from the above-mentioned machine are specifically described, whereas standard components found in the patent are described only to the extent necessary to clearly associate the old devices with the new. Briefly, the major changes found in the present machine relate to the multiplication mechanism and the shift control mechanism. A new decimal mechanism is also disclosed, and new controls are added for permitting selective clearance of the keyboard, the product and counter registers, and the multiplier storage mechanism.

One other change currently employed in the commercially known Marchant calculator as well as the machine of the present invention, but not disclosed in said patent, relates to the clutching mechanisms for causing engagement and disengagement of the register numeral wheels and the actuator gears. According to the patent a "setting," or program, clutch causes such engagement and performs other operations preliminary to the actuating drive, and after such drive is completed, a "restore," or second program clutch, causes disengagement and performs other normalizing functions. In the machine of the present invention the functions of the setting and restore clutches have been combined in a single clutch, the first 180 degrees of operation of which performs the "setting" functions, and the second 180 degrees of which performs the "restore" functions. This clutch is referred to hereinafter as the "setting" clutch and its two respective cycles of operation are referred to as setting and restore cycles. The function of the setting clutch during its two cycles are substantially the same as for the setting and restore clutches described in said patent.

Value entry mechanism

The value entry mechanism comprises a plurality of rows of keys, each row, in turn controlling a selection mechanism which is set, upon depression of a key, to a mechanical representation of the value selected. During a calculating operation initiated by the plus, minus, dividend, divide, and equals (multiply) keys, the ordinal numeral wheel actuators are adjusted by power means in accordance with the setting of the selection mechanism. At the conclusion of the calculating operation the depressed keys are released and the ordinal selection mechanisms are returned to their normal zero conditions.

Referring to FIGS. 1 and 2, nine keys 100 are provided in each of ten rows, which keys are mounted in the usual manner for up and down sliding movement within ordinally arranged key section frames 101 described in said patent. In FIG. 2 the "9" key is shown in depressed position. Springs 102 surround the keystems 103 and, during depression of a key, are compressed between a shoulder on the keystem and the key frame 101. A camming lug 116 on the keystem passes through respective apertures on the key frame 101 and a lock bar 117. Upon depression of a key, the lug first cams the locking bar to the right, and when the key reaches fully depressed position the lock bar snaps over the top of the lug (in response to a spring not shown) and locks the key in depressed position. Depression of any other key 100 in the same row releases the previously depressed key and locks down the second key.

A selection bar 120 underlies the bottoms of the keystem 103 and is mounted for substantially horizontal swinging movement relative to the keys by means of a pair of supporting pendants 128 which are pivotally mounted at 128a within the framework of the machine. Nine notches 131 are cut in the selection bar, these notches corresponding to the values "1" to "9." Opposed cam surfaces diverge from each notch to form V-shaped apertures 130, one of which underlies each key. The spacing between the notches is slightly smaller than the spacing between the keystems, and the arrangement is such that depression of the keys "1" to "9" moves the selection bar 120 one to nine increments, respectively, to the right, depending on which key is depressed.

The rightmost end of the selection bar 120 has an inverted U-shaped notch cut therein which embraces a pin 163 fixed on a lever 132, freely mounted on a fixed pivot 137. The opposite ends of lever 132 each carry respective gear segments 138 and 139. Segment 138 meshes with a gear 145 fixed to an indicator dial 140 and gear segment 139 meshes with a gear 151 forming a portion of a selection mechanism generally indicated at 146.

It will therefore be evident that upon depression of any key 100, its corresponding selection bar 120 will be moved a discrete amount, and through the lever 132 will adjust the indicator dial 140 and the selection mechanism 146 in accordance with the value selected. The selection mechanism 146 comprises a plurality of cam units, not shown herein but disclosed in said patent, which cam units are subsequently sensed during a setting cycle to adjust the actuating mechanism in accordance with the value selected.

Alternatively, values entered into the keyboard 100 may be transferred to a multiplier storage mechanism comprising the multiplier factor dials 3000 and associated mechanical devices representing the selected values. For this purpose a lever 3001 is pivotally mounted at 3002 and the upper end of the lever carries a pin 3003 which is embraced by a slot in the selection bar 120. The lower end of lever 3001 has a transversely bent ear 3004 which lies in the plane of movement of a step cam 3005. It will be observed that upon depression of a key, the resultant movement of selection bar 120 rocks lever 3001 to one of nine discrete positions depending on the value selected. This movement of lever 3001 is an idle movement during all value entry operations; however, if such entry is followed by depression of the "X" key 3006 (FIG. 1), the step cam 3005 (FIG. 2) is released from a locking bail 3007, through mechanism described hereinafter, and adjusts a multiplier storage mechanism and the factor indicator numeral wheels 3000 in accordance with the keyboard value.

*Numeral wheel actuators*

The actuating mechanism for the numeral wheels 279 (FIG. 1) of the product register comprises in each order a gear 189 (FIG. 2) which is driven an amount proportional to the value selected for that order. Gear 189 underlies a gear 271 forming a portion of a gear train to a respective numeral wheel 279. Normally, gear 271 stands in the position shown in FIG. 2 where it is disengaged from the actuator gear 189; however, during all calculating operations the register carriage is "dipped" during the setting cycle as disclosed in said patent, into a position where gear 271 meshes with gear 189 and transmits a drive from its ordinal actuator to the numeral wheel. At the end of each ordinal calculation the carriage is returned to the position shown, the disengagement of gears 271 and 189 permitting the carriage to be shifted without interference between the gears, if such shift should occur.

Gear 189 is driven by means of a proportional gear drive generally indicated at 172 comprising a plurality of gear trains which are selectively engaged, under the control of the selection mechanism 146. The engaging operation is carried out under power during the setting clutch cycle, and upon engagement of a main (actuator drive) clutch the actuator gear train in each order is advanced by an amount which is proportional to the value entered in its associated order of the keyboard. The actuating mechanism is fully described in the previously mentioned patent and further description is believed unnecessary.

*Accumulator register*

The accumulator register comprises a plurality of ordinally arranged numeral wheels 279 (FIGS. 1 and 2) mounted in the carriage 250 for shifting movement relative to the actuating mechanism. A "crawl carry" transfer gearing operates simultaneously with the actuating operation to transmit partial increments of carry from each numeral wheel to its adjacent higher order numeral wheel as described in the previously mentioned patent. At the end of each ordinal actuating operation the numeral wheels are moved to position of full digital display. The accumulator registers products, sums, differences, and dividend values as the case may be. The accumulator register is referred to hereinafter as the middle dials.

*Middle dial clearing mechanism*

Conventional means are provided for resetting the middle dials to zero. Depression of a middle dial clear key 373 (FIG. 1) initiates a single cycle of operation of a clear clutch generally indicated at 360 (FIG. 3) which effects such clearance. Key 373 is mounted by conventional pin and slot connection 374 for up and down sliding movement within the framework of the machine. The lower end of the keystem has a slot 3011, the upper end of which overlies a pin 3012 (FIGS. 3 and 6) carried by one arm 3013 of a bail 3014. The opposite arm of the bail is fixed to a lever 3015, the lever and the bail being freely mounted on shaft 3016. The lower end of lever 3015 carries a pin 3017 which is normally located in the upper end of an L-shaped slot 3018 cut in link 3019. Depression of the key acts through the above-described train of levers to move link 3019 toward the left. At such time the link rocks lever 376 (FIG. 3) clockwise and through pin and slot connection 378, it rocks the middle dial clear clutch engaging bail 379 counterclockwise about its pivot 600. A clear clutch dog 381 is fixed to bail 379 and normally holds the clutch 360 in disengaged condition; however, counterclockwise movement of the dog permits the clutch to become engaged for a single cycle of operations.

It will be observed that link 3019 overlies a fixed pin 3020 and has a cam surface 3021 which, upon leftward movement of the link, is moved over the pin, thus causing the link to rise to the extent that the vertical portion of the L-shaped slot 3018 is raised above pin 3017, thus disconnecting the control of the key over the clear clutch so that the latter is disengaged by the dog 381 at the end of one cycle in the usual manner regardless of whether or not the key is held depressed. Clutch 360 acts through a drive train disclosed in the U.S. Patent No. 2,291,135 to reset the numeral wheels of the product register to zero, and further description is believed unnecessary.

It should be noted that means are also provided to cause initiation of the operation of the clutch 360 by means other than the key 373. In certain machine operations, including multiplication, disclosed hereinafter, an arm 3022 (FIG. 6) is rocked clockwise, and this arm, in turn rocks a lever 3023 clockwise. The latter carries a live-tip 3024 which is urged counterclockwise on lever 3023 to the position shown by a spring (not shown) so that the rightmost end of the live-tip normally stands adjacent the pin 3012. Thus, when the lever 3023 rocks clockwise, the live tip rocks pin 3012 clockwise to initiate a cycle of operation of the middle dial clear clutch in the same manner as if the key 373 had been depressed.

Middle dial lock key

A lock key 3025 (FIGS. 1 and 7) is provided for disabling the previously-mentioned automatic clearing of the middle dials. For this purpose, key 3025 has slots 3026 and 3027 and is mounted for up and down sliding movement on the fixed pins 374 and 3028. A cam surface 3029 on the keystem overlies an ear 3030 on the live tip 3024 (FIGS. 6 and 7), and upon depression of the lock key 3025, the cam surface rocks the live tip out of the path of pin 3012, thus disabling the automatic clearance initiating linkage.

The lock key 3025 is held in depressed position by a latching bail 3031, pivotally mounted at 374 and spring urged clockwise to the position shown. When the lock key is fully depressed a notch 3032 cut therein is engaged by bottom edge of the latching bail and is held in such depression.

Key 3025 is released from its depressed position by a subsequent depression of the middle dial clear key 373. For this purpose a pin 3033 is fixed to the key 373 for cooperation with a cam surface 3034 on the latching bail, and upon depression of the key, surface 3034 rocks the latching bail in a counterclockwise direction to release the lock key 3025.

Upper dial clearance

The upper dial clearance mechanism is similar in structure and mode of operation to the clearance mechanism described above for the middle dials and therefore a detailed description is believed unnecessary.

Briefly, the upper dial clear key 1910 (FIG. 8) is located adjacent the middle dial clear key 373 and acts through appropriate linkages to engage an upper dial clear clutch (not shown). The key 1910 is mounted for up and down sliding movement and depression of the key causes clockwise movement of a bail 3035 (FIGS. 5 and 8). This moves a link 3036 toward the left to rock a lever 3037 clockwise. Lever 3037 is similar to lever 376 (FIG. 3) and initiates the operation of an upper dial clear clutch (not shown). The rightward end of link 3036 has a cam surface 3038 which, upon movement of link 3036 to the left, contacts the fixed pin 3039 and lifts link 3036. At such time the pin 3040 on lever 3037 drops into the horizontal portion of the L-shaped slot 3041 in link 3036 and thus permits the clutch to become disengaged at the end of a single cycle of operation regardless of whether or not the key 1910 is held depressed.

Upper dial lock key

The upper dial lock key 3042 (FIG. 1) is identical to the lock key 3025 (FIG. 7) and, therefore, is not shown in a detailed drawing. The upper dial lock key disables automatic clearance operations with respect to the upper dial clear clutch, and this key is released by depression of the upper dial clear key 1910 in the same manner as described in connection with the middle dial clear and lock keys.

Keyboard clear keys

The keyboard clearing mechanism is substantially the same as that shown in U.S. Patent No. 2,650,027, issued August 25, 1953, and includes a key 300 (FIG. 1) which may be used to clear the entire keyboard. Provision is also made to permit the entry of a constant factor into the keyboard in which case the key 300 is disabled with respect to the ordinal rows of keys in which the constant factor has been entered. Key 350 is also a keyboard clear key which invariably clears the entire keyboard including the constant factor.

The machine of the present invention includes a third keyboard clearance control, or lock, key 3045 which is not shown in the last mentioned patent. During certain calculating operations the keyboard is automatically cleared in the same manner as if the key 300 had been depressed; however, depression of the lock key 3045 disables the automatic clearance mechanism.

A constant factor may be entered in one portion of the keyboard by holding the keyboard clearance key 300 depressed while entering the factor, and the factor is thus removed from the control of this key 300 after the key is allowed to rise. A second factor may now be entered in the other portion of the keyboard and retained by depressing the lock key 3045. When depressed, the lock key 3045 is locked in depressed position and may be released by depression of the clear key 300. This arrangement provides a method by means of which two separate factors may be locked in the keyboard, together with clearance of one locked factor without clearance of the other factor. Furthermore both locked factors may be cleared by depression of key 350 without releasing the lock key 3045, thus retaining a condition whereby a subsequent entry in the keyboard is locked against automatic clearance without requiring the operator to redepress the lock key 3045.

Referring now to the clear key 300 (FIG. 54), the fixed shafts 374 and 302 guide the key for up and down movement on the machine frame, and a spring (not shown) normally holds the key in the raised position shown. A roller 310 on the keystem overlies one arm 311 of a bellcrank 312 which is freely mounted on a keyed shaft 3046. Depression of key 300 thus rocks bellcrank 312 in a clockwise direction and through link 315, it rocks a bail support lever 316 clockwise about the fixed shaft 318. A transverse bail 319 extends underneath all orders of the keyboard 100 and at the opposite side is supported by a lever 316' similar to lever 316.

The bail lies underneath a plurality of ordinal release levers 320 which are freely pivoted at 321 and urged in a clockwise direction by a torsion spring (not shown). A camming surface 322 on lever 320 lies adjacent an ear on the locking bar 117, previously described in connection with FIG. 2. Upon depression of the celar key 300, the bail 319 rocks the clear levers 320 counterclockwise thus moving the lock bars 117 toward the right to effect release of the respective keys 100. The levers 320 each have a notch 324 cut therein and when the release lever is rocked to its full counterclockwise position the ear 323 on the lock bar 117 engages notch 324 and holds the release lever in a disabled position. Subsequent depression of a key 100 reciprocates the lock bar 117 in known manner and releases the lever 320 which then returns to the inital position shown. Thus, it appears that the locking of the release lever 320 by the lock bar 117 is an idle movement; however, the provision of this locking movement is used to advantage in locking a factor in the keyboard, as follows. Depress key 300 and hold it in depressed position while the various keys 100 are depressed to enter a factor in the keyboard. Then release the clear key 300. Since the key 300, in depressed position, holds the release levers 320 in disabled position during the value entry operation, the release levers are maintained in this position by the lock bars 117 after the factor entering operation; therefore, subsequent depressions of the clear key 300 does not rock the release levers which are held in their disabled positions, and the keys 100 in such orders are not released.

The keyboard clear key 350 (FIG. 9) supersedes the previously mentioned factor locking mechanism and releases all depressed keys. Key 350 is pivotally connected at 3047 to a lever 3048 and is guided for up and down movement by means of the usual pin and slot arrangement. Two levers 3048 are mounted near opposite ends of a shaft 3049 and a transverse bail 3050, spanning the keyboard locking bars 117, is carried by levers 3048. Depression of key 350 rocks the bail clockwise, thus moving the locking bars 117 toward the right to effect release of all depressed keys 100.

Keyboard lock key

The keyboard lock key 3045 (FIG. 54) is provided to disable an automatic keyboard clearance mechanism, described hereinafter, which rocks a lever 3051 in a clockwise direction about its pivoted mounting on the keyed shaft 3046. Overlying an ear 3052 on lever 3051 is a live tip 3053 mounted at 3054 on an arm 3055 of bellcrank 312. Thus, when lever 3051 is rocked clockwise by the automatic clearing mechanism, it acts through the live tip 3053 to rock lever 312 clockwise and effect a keyboard clearing operation in the manner previously described. However, when the lock key 3045 is depressed, a stud 3056 on the lower part of the keystem rocks the live tip clockwise out of engagement with ear 3052 and breaks the connection between the automatic clearing mechanism and lever 312, thus preventing the automatic keyboard clearance operation.

Key 3045 is held in depressed position by a latch lever 3057, pivotally mounted at 3058 and having a transversely bent ear 3059 which engages a shoulder 3060 on the lock key keystem. Key 3045 is released from the latch lever 3057 by depression of the clear key 300 by means of a cam surface 3061 on the key 300 bearing against the latching ear 3059 and moving the latter counterclockwise to release the shoulder 3060 of the lock key.

Motor drive mechanism

The drive train from the motor to the various clutches is substantially identical as that disclosed in the previously mentioned Patent No. 2,271,240; however, in the present machine the functions of the setting and restore clutches are combined in the setting clutch, and the space formerly required for the restore clutch is utilized for a new clutch, referred to hereinafter as a master clutch. Whereas the setting clutch serves to perform various functions preliminary to, and also following, the operation of the main (numeral wheel actuator) clutch, the master clutch serves to perform preliminary functions prior to other operations. The specific operations of these clutches are described hereinafter in more detail.

Since the motor drive train is adequately disclosed in the last mentioned patent, the following description of the motor drive train is made with reference to the schematic illustration shown in FIG. 20.

A gear 645 is driven by the motor and transmits a drive through integral gears 646 and 647 to a gear 362 fixed on shaft 1306. The latter transmits a drive to a shift clutch 10, co-axial with shaft 1306, as is more fully described in the Patent No. 2,162,238. Gear 648 (FIG. 20) also transmits a drive to a gear 430 which forms an integral part of the setting clutch.

The previously mentioned gear 362 which is driven by the motor, is connected to the main actuator clutch 415 by means of idler gear 650. The main clutch drives through a conventional reverse unit comprising gears 459, 490, 491 and 492 to drive the main actuator drive gear 457 in a forward or reverse direction, as the case may be. Gears 491 and 492 cooperate with a reverse gearing 1820, 1816, and 1818 to drive the counter actuator mechanism in a similar or dissimilar direction to that of the main drive gear 457.

Gear 362 also meshes with a gear 361 fixed on a shaft 649. The drive for the middle dial clear clutch, the upper dial clear clutch and the master clutch is taken from shaft 649.

All of the clutches mentioned above are of the pawl and ratchet type such as the clutch 10 shown in the previously mentioned Patent No. 2,162,238, and with one exception all clutches operate through 360° to complete a cycle of operation. The setting clutch may be disengaged at 180° or at 360° of operation. During the first 180° of operation the setting clutch performs its setting, or programming, functions, and during the second 180° it performs various restore functions. When any machine function is initiated which includes actuation of the numeral wheels the setting clutch is engaged for 180° to "dip" the accumulator register into engagement with the actuators. During the latter part of this cycle the setting clutch causes engagement of the main clutch which causes actuation of the numeral wheels. Termination of operation of the main clutch initiates a second 180° of operation of the setting clutch during which it raises the carriage and performs other "restore" functions previously attributed to the restore clutch in the Patent No. 2,271,240.

The setting clutch is also used to initiate all operations of the shift clutch, such initiation occurring during the restore cycle. Shift operations occur both during automatic calculations involving the usual ordinal shifts, or in response to depressions of the decimal keys 3070. In the latter case the decimal keys initiate a continuous 360° operation of the setting clutch without an intervening main clutch operation, and during the last 180°, or restore cycle, the setting clutch engages the shift clutch which tabulates the carriage to a predetermined position as described hereinafter.

In prior machines the setting clutch has been engaged by manual operation of the plus, minus, and divide keys whereas the multiplying keys initiated a setting clutch operation through the intermediary of a power driven device such as the pawl and ratchet arrangement referred to at 1952 and 1957 in FIG. 62 of the Patent No. 2,271,240, and in FIGS. 21 and 22 of the present disclosure. In the machine of the present invention, however, the arrangement is such that this power driven device is employed upon depression of any key which initiates the operation of the setting clutch.

Referring to FIGS. 20 and 21, a ratchet 1957 is integral with the motor driven gear 362. Cooperating with the ratchet is a link 1952 which is pivotally mounted at 1952a to a link 1953 supported for rocking movement at 1954. Link 1952 has pin and slot connection 1951 with a lever 1950, and is normally held in the position shown due to this pin and slot connection 1951. The leftmost end of link 1952 (FIG. 22) lies adjacent a stud 1958 fixed to an arm 1959 which is integral with the setting clutch control dog 394. Lever 1950 is freely mounted within the machine framework at 1909 and is spring urged counterclockwise by spring 3658 (FIG. 21), but is held in the position shown by a latch lever 3171. Upon depression of various operating keys, described hereinafter, the latch lever 3171 and an attached bail 3146 are rocked clockwise, thus releasing lever 1950 for counterclockwise movement. The latter acts through pin and slot connection 1951 to lift the link 1952 into engagement with ratchet 1957 whereupon the link 1952 is moved toward the left. This rocks the arm 1959 (FIG. 22) and the clutch dog 394 counterclockwise to initiate the operation of the setting clutch 430. Repeated engagement of link 1952 with ratchet 1957 is prevented in a manner similar to that described in the Patent No. 2,271,240, namely, the setting clutch dips the carriage and a mechanism responsive to such dipping movement contacts a pin 3172 (FIG. 21) on lever 1950 and returns the latter to the initial disabled position shown where it is locked by the latch lever 3171.

A mechanism is provided which is normally operable during the setting cycle of the setting clutch to cause engagement of the main clutch, but which mechanism is disabled when it is desired to eliminate the operation of the main clutch and, instead, to cause two successive setting clutch cycles of operation (setting and restore cycles). In the latter case the two successive cycles of operation are referred to hereinafter as a "blank cycle" and is used to cause engagement of the shift clutch.

As above described, each time the bail 3146 (FIG. 21) is rocked clockwise, the lever 1950 rocks counterclockwise to lift lever 1952 into engagement with ratchet 1957

(FIG. 22) and thus cause engagement of the setting clutch by rocking the clutch dog 394 in a counterclockwise direction. The clutch dog 394 is then released to permit the dog to re-engage the periphery of the clutch and disengage the same after 180° of operation. The setting clutch drives the shaft 431 and a line of cams including the cam 3747 (FIG. 50) in a counterclockwise direction. During the first 180° (setting cycle) the cam reciprocates a follower 746, first rocking it in a counterclockwise direction about shaft 501 and then releasing it to the urgency of a spring 3474 which rocks the follower clockwise to its initial position.

A live tip 603 is pivotally mounted at 604 on the follower and has a hook 615 which, during counterclockwise movement of the follower 746, engages a hook 616 on the main clutch dog 395 and rocks the latter clockwise to cause engagement of the main clutch 415. At the end of the current setting cycle, the setting clutch is disengaged. Meanwhile, the setting cam 3475 (FIG. 51) is also rotated during the setting cycle and after 180° of rotation thereof the low periphery of the cam underlies the roller 3476 on a follower 3477. At such time the follower tends to rock counterclockwise about its pivot in response to spring 3478; however, since the main clutch is engaged at this time, the extension 3479 on the clutch dog stands in the dotted line position where it overlies ear 3480 on follower 3477 and prevents the latter from rocking counterclockwise. When the main clutch dog 395 returns to the full line position shown to disengage the main clutch 415, the follower 3477 is permitted to rock counterclockwise. A pin 3481 on the setting clutch dog 394 overlies a portion of follower 3477 and is therefore rocked counterclockwise with the follower to initiate the second, or restore cycle of the setting clutch. During this restore cycle, the cam 3475 (FIG. 51) is returned to the initial position shown and rocks the follower clockwise, thus releasing the setting clutch dog 394 for re-engagement with the setting clutch. In this manner the setting clutch is disengaged at the end of the restore cycle.

In certain operations described hereinafter, it is desirable to operate the setting clutch through 360° of blank operation, i.e., consecutive cycles of setting and restore functions without an intervening main clutch operation. For this purpose there is provided a bail 3147 (FIGS. 21 and 21A) which underlies the bail 3146. One arm 3414 of bail 3147 carries a pin 3413 which lies adjacent an ear 3415 on the arm 3416 of bail 3146. Thus, if bail 3147 is rocked clockwise, as described hereinafter, pin 3413 contacts ear 3415 and also rocks bail 3146 in a clockwise direction to initiate a setting cycle as described above; however, at the same time, another arm 3483 of bail 3147 rocks clockwise and through contact with ear 3484, rocks a lever 3485 counterclockwise about pivot 1909. The rightmost end of lever 3485 (FIG. 50) is formed as a hook and normally overlies an ear 3486 on a lever 3487 pivoted at 3488. Lever 3487 has spring connection 3489 with a pin 3490 carried by a cam follower 3491 which has a roller pivoted on pin 3490 adapted to cooperate with a cam 3492. The cam 3492 rocks the follower clockwise thus stressing the spring 3489 and tending to cause lever 3487 to follow the cam follower. In the position of the parts shown, the hook on the end of lever 3485 normally prevents lever 3487 from partaking of such movement and spring 3489 is therefore idly stressed; however, when bail 3147 is rocked counterclockwise and the hook on the end of lever 3485 is rocked away from the ear 3486, lever 3487 is free to follow the cam follower 3491 and is rocked in a clockwise direction. At such time a hook 3493, integral with lever 3487, rocks clockwise into the path of ear 614 on the live-tip 603. Thus when follower 746 rocks counterclockwise, the live-tip is restrained from engaging the hook 616 on the main clutch dog 395 and a main clutch operation is not initiated. Since the main clutch is not engaged the extension 3479 (FIG. 51) remains in its full line position and the follower 3477 is free to rock counterclockwise during the setting cycle and hold the setting clutch dog 394 in clutch engaging position for a second, or restore cycle. During the latter cycle, the cam 3475 returns the follower 3477 to its initial position thus permitting the spring 3494 to rock the clutch dog 394 to clutch disengaging position. In this manner a continuous 360° operation of the setting clutch is obtained.

From the foregoing description it will be seen that when bail 3146 is rocked clockwise, the setting clutch rotates 180° and then initiates the operation of the main clutch which is followed by 180° of operation of the setting clutch; whereas, if bail 3147 is rocked clockwise, it initiates a continuous 360° blank cycle operation of the setting clutch without an intervening operation of the main clutch.

For purposes of the present disclosure the previous discussion of the various clutches is sufficient, reference being had to the Patent No. 2,271,240, for a more detailed description of all clutches. The shift clutch and associated mechanisms are described in more detail hereinafter.

*Decimal storage mechanism*

The decimal storage mechanism comprises means for simultaneously establishing the locations of the decimal indicators for the keyboard, the product register and the multiplier storage mechanism by depressing a respective one of the decimal storage keys 3070. Since the product register is shiftable relative to the product decimal indicators which are mounted on the main framework of the machine, the decimal storage mechanism must be integrated with the shifting mechanism; therefore, the carriage 250 is shifted each time a new decimal key is depressed, as will presently be made clear.

The keyboard decimal indicators comprise a plurality of ordinally arranged slides 3180 (FIGS. 1 and 2) each mounted for endwise movement underneath a plurality of slots 3181 cut in the keyboard cover between adjacent rows of keys 100. Marks of color contrasting with that of the cover are fixed on the slides 3180 so that by endwise displacement of the slide, a keyboard decimal indication is exposed through the slots. Each slide is supported near the #9 key 100 by a cross bar 3173, and the leftward end of each decimal slide as seen in FIG. 2, is pivotally mounted to an extension 3173 of a lever 3174. The rightmost end of the slide 3180 is guided in slots 3175 cut in the keyboard cover 3176.

The lever 3174 is freely mounted on a transverse shaft 3177 and is urged counterclockwise by a spring 3179. A decimal indicator 3183 is delineated on the upper surface of extension 3173 and normally lies hidden beneath the front dial cover 3184. Upon depression of a decimal key 3070 and its sub-keystem 3102, the latter contacts ear 3185 of lever 3174 and rocks the same clockwise. At such time the decimal indicator 3183 appears through a hole 3186 (FIG. 1) in the front dial cover. Simultaneous with the rocking movement of lever 3174 the keyboard decimal slide 3180 (FIG. 2) is moved toward the right thus exposing the keyboard decimal indicator for that order. This also extends the right end of the slide 3180 beyond the keyboard cover 3176 and above the carriage 250. The right end 4000 of the slide carries a mark of distinguishing color, and when exposed to view lies between two adjacent numeral wheels of the product register thereby indicating the product decimal point. Meanwhile, the depression of the decimal key 3070 causes the carriage to be shifted to a corresponding carriage position as described hereinafter.

The depression of any decimal key 3070 locks that key down and releases any previously depressed decimal key as described hereinafter. Therefore, a new group of integrated decimals may be stored simply by depressing a selected decimal key either before or during the entry of the first factor of a calculation. During problems of addition and subtraction the relationship between the product register and the product decimal indicator is not disturbed since the carriage is not shifted; however, in problems of multiplication and division the carriage is shifted and therefore mechanisms are provided which are enabled upon termination of such operations to return the carriage to its initial tabulated position. In such position the stored decimals correctly indicate the results in the product and counter registers.

It will be noted that in some calculating machines the keyboard is not aligned with the register numeral wheels and/or the factor indicator dials. In such a case the keyboard decimal indicators, the register decimal indicators, and the factor indicators could be operated by independent mechanisms in response to depression of the decimal keys. It will therefore be obvious that the various decimal indicators for the keyboard, the factor indicator and the register can be separated entities irrespective of the fact that the present machine is designed to make it convenient to form the keyboard decimal indicators and the register decimal indicators as integral ordinal units.

*Carriage shifting mechanism*

The carriage 250 (FIG. 1) contains the product and counter registers, also referred to herein as the middle and upper dials, respectively, and which carriage is shifted to the left and right either manually, under the control of the decimal keys 3070, or automatically, under the control of various calculating mechanisms. The shift mechanism includes a cyclically operable clutch driven by the motor, and a drive transmission train from the clutch to a rack and pinion drive on the carriage.

The shift clutch is generally indicated at 10 in FIG. 10 and is identical to a similarly numbered clutch shown in U.S. Patent No. 2,162,238, issued June 13, 1939. A clutch control dog 50 is pivoted at 1351 and is urged by spring 50a into a notch 12a in disc 12 where an ear 51 on dog 50 acts through a familiar pawl and ratchet arrangement to hold the clutch in disengaged position.

The following described control mechanism for moving the clutch control dog 50 to clutch engaging position is the same as that shown in the previously mentioned Patent Nos. 2,162,238 and 2,271,240. Corresponding parts carry corresponding numbers of a value less than 3000. All reference numbers over 3000 are new in the present disclosure.

The clutch control dog 50 carries a pin 52 which, due to the urgency of spring 50a on the dog 50, normally lies in the bottom of an inverted V shaped slot 61 cut in a lever 60. This centralizes lever 60 in the position shown in which a pair of lugs 62, 63 on the lever, in turn, serves to centralize a shift drive reversing unit 34. According to the two last mentioned patents the lever 60 is rocked in a clockwise direction to cause a rightward shift of the carriage and is rocked counterclockwise to initiate a left shift. Upon either clockwise or counterclockwise movement of lever 60, a corresponding side of slot 61 exerts a camming action on pin 52 and rocks the control dog to clutch engaging position. Simultaneously the lugs 62, 63 shift the reverse unit control member 34 either in one direction or the other, axially of shaft 1306 to adjust for a right or left shift as the case may be. Conversely, when the above-mentioned lever 60 and dog 50 are released to the urgency of spring 50a, the clutch control dog is moved to clutch disengaging position and the reverse unit is returned to the central nonshift position shown.

Lever 60 is rocked clockwise or counterclockwise for right and left shift, respectively, as follows. During each setting cycle described in Patent No. 2,271,240, a shift initiating ear 1386 is moved toward the right over a notch 1390 in a lever 1378. Then, during the restore cycle, the ear 1386 is returned to the position shown. In the present instance, this would be an idle operation since lever 1378 is held in a clockwise position due to the influence of a shelf 3076 described hereinafter, which underlies the leftmost end of lever 1378. Thus, in the current position of lever 1378, a shifting operation is prevented; however, under circumstances later described, the shelf 3076 is moved downwardly which permits spring 3077 to rock lever 1378 counterclockwise so that during the reciprocation of ear 1386 the ear engages the notch 1390 and moves lever 1378 toward the left. Lever 1378 is pivotally mounted at 1379 to an arm 1380 (FIG. 11) which is freely mounted on a shaft 1376. A shift direction interponent 1383 is freely mounted near the upper end of arm 1380 and is spring urged in a counterclockwise direction so that a hook on the upper rightmost end of the interponent engages an ear 1384 on link 1374. The link is connected to the upper end of lever 60, and the arrangement is such that when lever 1378 is moved toward the left, it acts through pivot 1379, arm 1380 and the shift interponent 1383 to pull link 1374 toward the left. This rocks lever 60 in a counterclockwise direction and initiates a leftward shift.

Under certain conditions noted hereinafter, the shift interponent 1383 will be standing in a clockwise position with the lower hook in engagement with an ear 1217 on a lever 1219 pivoted at 1220. In this case, the leftward movement of interponent 1383 rocks lever 1219 counterclockwise and through pin and slot connection with lever 1375 rocks the latter clockwise about its pivot 1376. Lever 1375 has pivotal connection with the leftmost end of link 1374 and acts through the links to rock lever 60 in a clockwise, or right shift initiating direction.

From the foregoing description it will be observed that the setting clutch acts through ear 1386 to selectively initiate a shift clutch operation depending upon whether lever 1378 is standing in the nonshift position shown or in a counterclockwise shift initiative position, and that the direction of shift is determined by whether the shift interponent 1383 is engaged with ear 1384 or 1217. The duration of shift operations is determined in a manner described hereinafter.

The engagement of the shift clutch 10 and the setting of the member 34 in a left or right shift position drives a shaft 1331 (FIG. 35) in a counterclockwise or clockwise direction, respectively, as described in the previously mentioned Patent No. 2,162,238.

The drive from shaft 1331 to the carriage shift rack in the machine of the present invention has been altered from that shown in the patent and comprises a gear 3080 fixed to shaft 1331, which gear drives through an idler train of gears 3081, 3082 and 3083 on the right-hand side of the machine to rotate shaft 3084. Shaft 3084 extends through the machine to the left side where a gear 3085 is fixed on the shaft. Gear 3085 drives idlers 3086, 3087, 3088 and 3089. A bevel gear 3090 is integral with gear 3089 and meshes with a bevel gear 3091 fixed to a shaft 3092 which is supported at opposite ends by brackets 3093 and 3094 fixed to the machine framework. A pinion 3095 is fixed to the rightmost end of shaft 3092 and meshes with a gear rack 3096 which is fixed to the register carriage. It will, therefore, be evident that the carriage will be shifted to the left or right depending on the direction of rotation of gear 3095 which is driven by the shift clutch through the described gearing.

The present invention also includes a tabulation control mechanism and a multiplier control mechanism which are shifted in timed relationship with the register carriage. For this purpose a pair of worm shafts 3097 and 3100 are provided to which are fixed the respective gears 3099 and 3098. The latter gears are driven by gear 3089 to establish this relationship, the purpose of which will subsequently be made clear.

*Decimal shift control mechanism*

The decimal shift control mechanism includes ten decimal storage keys 3070 (FIG. 1) which are numbered from "0" to "9," located between the respective rows of keys 100. Depression of a key 3070 (FIG. 2) moves three respective decimal indicators 3180, 4000, and 3183 to positions of display relative to the keyboard 100, the middle dials 279 and the factor indicator 3000, and also shifts the carriage to a position in which the middle dial decimal indicator correctly points off the decimal location for these middle dials. The decimal indicating function of the decimal keys is later described, reference now being made to the carriage shift control mechanism which is operable by the decimal keys.

Figure 12:
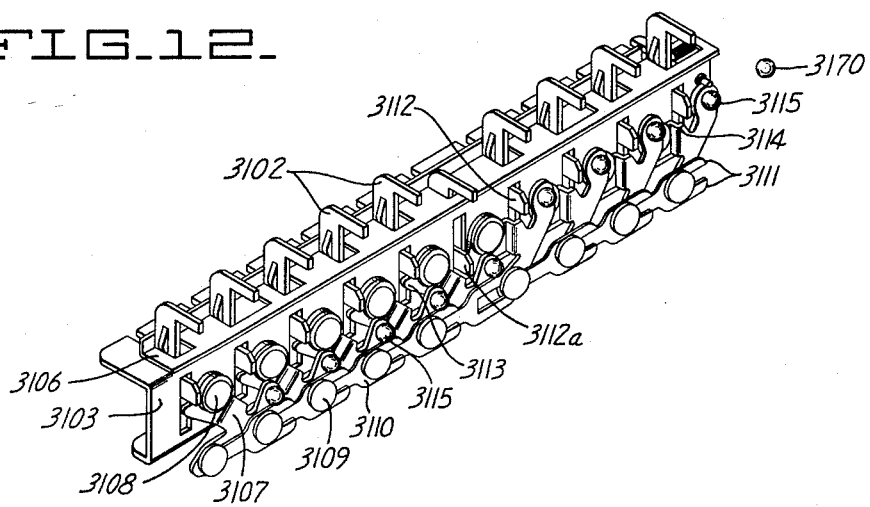
FIG. 12 is a projection of the decimal-shift initiating mechanism as seen from the right rear of the machine.
Figure 13:
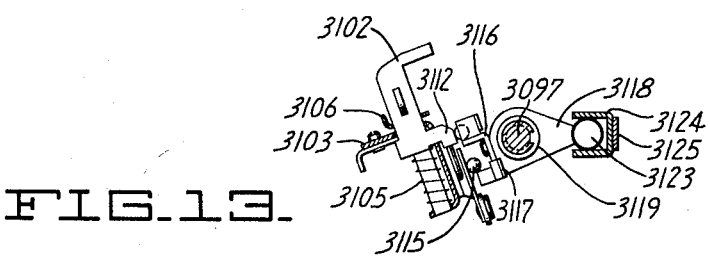
FIGS. 13 and 14 are right side sectional views of the decimal-shift control mechanism.
Figure 14:
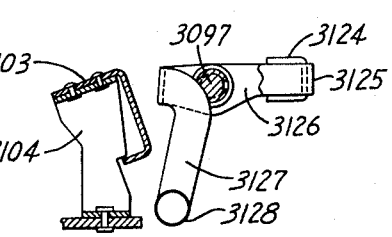

Each key 3070 (FIG. 2) has a keystem 3101 which is mounted in conventional manner for up and down sliding movement within the framework of the machine. The lower end of each keystem overlies a sub-keystem 3102 (FIGS. 12 and 13) which is mounted for up and down sliding movement within a sub-frame 3103. The latter is fixed at its opposite ends to similar brackets 3104 (FIG. 14) which are fixed to the main framework of the machine. Each sub-key 3102 is urged to its raised position by a spring 3105 (FIG. 13).

Upon depression of a decimal key 3070, its corresponding sub-key 3102 is depressed and locked in depressed position by a lock bar 3106 of conventional construction. The depression of the key operates a mechanism described below to:

(1) Establish a mechanical representation of the position to which the carriage is to be shifted;

(2) Determine the direction of shift in accordance with the current position of the carriage and the position to which it is to be shifted; and (3) Initiate the operation of the shift clutch.

Figure 13A:
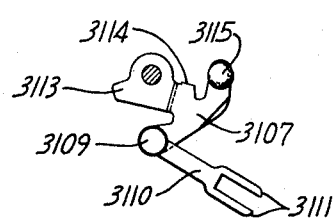
FIG. 13A is a detailed drawing of an ordinal shift control member.

Ten bellcranks 3107 (FIGS. 12 and 13A) are pivotally mounted as at 3108 to the sub-frame 3103, and pivotally mounted at 3109 on each bellcrank is a link 3110 having a forked end 3111 which embraces the pivot 3109 of its adjacent link 3110. It will therefore be apparent that if any bellcrank is rocked in a counterclockwise direction it will act through its link 3110 to push its adjacent bellcrank 3107 (to the right as seen in FIG. 12) in a counterclockwise direction. Conversely if any bellcrank is rocked in a clockwise direction it will push on the link of the adjacent leftward bellcrank and rock it in a clockwise direction.

It will also be apparent that the elongated slot in the fork 3111 of each link permits a respective link to rock clockwise without imparting motions to the bellcranks to the right thereof, and permits a bellcrank to rock in a counterclockwise direction without imparting motion to the links and bellcranks to the right thereof. Thus two adjacent bellcranks may be rocked in opposite directions and due to the above-described linkages the bellcrank that is rocked clockwise rocks all of the bellcranks to the left thereof in a clockwise direction while the bellcrank that is rocked in a counterclockwise direction will rock all of the bellcranks to the right thereof in a counterclockwise direction.

Advantage of this action is taken in the present machine by providing each sub-key 3102 with an extension 3112 which overlies a shoulder 3113 on the left side of one bellcrank 3107 and which also overlies a shoulder 3114 on the right side of an adjacent bellcrank 3107. Thus, if any sub-key is depressed, as is the case in FIG. 12 where the "5" key is depressed, then the bellcranks on opposite sides thereof will be rocked in opposite directions, and this establishes a two way mechanical representation of the location of the key depressed. Such manifestation is used to initiate a shift operation in the appropriate direction and to terminate shifting when the carriage reaches the selected position.

For this purpose each bellcrank 3107 carries a ball 3115 which rocks with the bellcrank and stands either in a raised or lowered position depending on whether its respective bellcrank stands rocked in a counterclockwise or clockwise position.

Cooperating with balls 3115 is a shift control member 3116 (FIG. 13) which is fixed to a transversely bent ear 3117 on a lever 3118. The latter is fixed to a worm nut 3119 which is mounted on the previously mentioned worm shaft 3097 (see also FIG. 35) which is rotated in timed relationship with the shifting of the register carriage. The arrangement is such that the control member 3116 is shifted one order relative to the balls 3115 for each ordinal shift of the carriage 250.

The shift control member 3116 normally stands in a position of alignment with the depressed decimal key. Also, as shown in FIG. 15, the member 3116 normally is centrally located with respect to the balls 3115, one of which is in raised position and the other of which is in its lower position. Thus, with the No. 5 decimal key in depressed position the control member is in the No. 5 position. Now assume that the No. 4 decimal key is depressed to initiate a shift of the carriage to its No. 4 position. In this case the carriage will be shifted one order to the left; however, the decimal-shift control mechanism is arranged in inverse order with respect to the carriage shift positions, and therefore, the control member will be shifted one order to the right to the No. 4 decimal position. Depression of the No. 4 decimal key moves the ball 3115 which is currently in its lower position (FIG. 15) to the raised position shown in FIG. 15A, thus contacting surface 3120 on the control member and moving it upwardly to the position shown in FIG. 15A. This corresponds to clockwise movement of member 3116 as seen in FIG. 13 which, in turn, moves lever 3118 clockwise to initiate a shift operation as follows.

Lever 3118 carries a knob 3123 which is embraced by a channel bar 3124 extending transversely of the machine and fixed at opposite ends to ears 3125 (FIG. 14) carried by levers such as 3126. Levers 3126 are freely mounted on shaft 3097 and the right side lever 3126 is formed as a bail with a depending arm 3127. A roller 3128 is carried on the bottom end of the arm, and the arrangement is such that when the shift control member 3118 (FIG. 13) is rocked in a clockwise or counterclockwise direction, the roller 3128 (FIG. 14) will partake of a similar movement.

Roller 3128 normally stands in the full line position shown in FIG. 17, where it underlies the leftmost end 3129 of a lever 3130. The latter is pivoted at 3121 and urged counterclockwise by a spring 3131 against roller 3128. When roller 3128 is moved clockwise, as described above, it is moved to the dotted line position 3128a and permits spring 3131 to rock lever 3130 counterclockwise to the extent permitted by contact of the lever with the roller in its new position. At such time a latch lever 3132, mounted at 3133 on lever 3130, is moved out of restraining engagement with an ear on toggle link 3134. The latter is pivotally mounted at 3135 to a link 3136 which is freely mounted on a fixed pivot 3137. The opposite end of toggle link 3134 is pivoted at 3138 to a bellcrank 3139. The latter is freely mounted at 3140 and urged counterclockwise by a spring 3141. The toggle link 3134 is urged to the position shown by a spring 3134a, but the latter spring is weaker than spring 3141 and therefore when the toggle is broken, bellcrank 3139 is rocked counterclockwise by spring 3141.

The rightmost end of bellcrank 3139 overlies an ear 3142 of a shift initiating lever 3143 which is urged clockwise by spring 3144 and an extension 3145 on lever 3143 lies adjacent the bails 3146 and 3147. Thus, when bellcrank 3139 rocks counterclockwise, spring 3144 rocks lever 3143 clockwise and extension 3145 moves bails 3146 and 3147 toward the left. Bail 3146 (see also FIG. 21) is part of a mechanism, described hereinbefore for initiating the operation of the setting clutch, and bail 3147 is a portion of the mechanism for preventing the initiation of the operation of the main (actuating) clutch. Thus, the setting clutch is engaged for a blank cycle, i.e., it does not initiate an actuating operation, and as previously described, the ear 1386 (FIG. 10) is reciprocated by the setting clutch. As will be seen immediately below, this initiates the operation of the shift clutch 10.

It will be recalled that lever 3130 (FIGS. 10 and 17) was rocked in a counterclockwise direction. At such time a stud 3148, fixed on the lower end of a link 3149 and spring urged into a V shaped slot in lever 3130, is moved upwardly, thus moving link 3149 upwardly. The upper end of the link is pivotally connected to a shift enabling and disabling lever 3150. The latter is therefore rocked clockwise, moving extension 3076 downwardly and permitting the lever 1378 to rock counterclockwise into position where the notch 1390 in the rightmost end thereof will be engaged by ear 1386 during the setting clutch operation. In this manner a shift clutch operation is initiated.

The direction of the shift is controlled by the shift interponent 1383 which normally stands in the position shown in engagement with the left carriage shift ear 1384. A stud 3151 on lever 3150 is rocked to the dotted line position 3151a during the previously described rocking of lever 3150, in which position the stud merely overlies the top edge of a lever 3152 and does not move the latter. Lever 3152 is pivotally mounted at 3153 to the framework of the machine and has an extension 3154 which underlies a stud 3155 on shift interponent 1383. It will be observed that if lever 3150 is rocked to the extent that stud 3151 moves to the dotted line position 3151b, which is the case when a right shift is to be initiated, as explained hereinafter, then the lever 3152 will be rocked counterclockwise. At such time the extension 3154 will rock the shift direction interponent 1383 in a clockwise direction where the hook on the right end thereof engages the right shift ear 1217 and conditions for a right shift as previously explained.

A single order left shift is all that is necessary to shift the carriage 250 (FIG. 1) from its #5 to its #4 position and the duration of the shift is determined as follows. A shift latch lever 3160 (FIG. 43) is pivoted at 3161 and urged counterclockwise by a spring 3162; however, the previously mentioned stud 3148 on link 3149 overlies lever 3160 and normally holds it in the position shown where a stud 3163 on the right end of the latch lever is held spaced apart from the lower end of lever 1375. When lever 3130 is rocked counterclockwise, as previously described, the stud 3148 is moved upwardly thus permitting the latch lever to rock upwardly to the extent that stud 3163 contacts surface 3164 on lever 1375. This relationship is maintained until lever 1375 is rocked either clockwise or counterclockwise during initiation of the shift. In the present example, the lever is rocked counterclockwise to initiate a left shift of the carriage and then stud 3163 drops into notch 3165 to maintain the shift clutch engaged for the requisite number of cycles; however, in the present instance a single order shift is all that is required and therefore the shift latch lever is almost immediately returned to its initial position so that the shift clutch becomes disengaged at the end of the current cycle, as follows. When the carriage 250 is shifted to the left, the control member 3116 (FIG. 15A) is shifted to the right and during such shift, a rightmost camming surface 3156 engages the ball of the next lower order shown in the dotted lines which ball is standing in its lowermost position. This rocks the member 3116 counterclockwise to the initial position shown in FIGS. 13 and 15 at which time the roller 3128 (FIG. 17) is rocked counterclockwise and returned to the full line position shown. This, in turn, rocks lever 3130 clockwise and stud 3148 downward, the latter moving the latch lever 3160 (FIG. 43) clockwise to its initial position. This releases the shift lever 1375, and therefore the shift clutch dog 50 is permitted to rock clockwise and disengage the clutch at the end of the current cycle. Meanwhile, the lowering of stud 3148 and link 3149 rocks lever 3150 back to its initial position where the extension 3076 (FIG. 10) rocks the lever 1378 to non-shift position. This completes the shift operation and the #4 decimal key remains depressed until another tab key is depressed.

It will be observed that if the #3 decimal key or the #2 decimal key, etc., had been depressed, the balls 3115 (FIG. 15A) are moved to such positions where the cam surface 3156 on the shift member 3116 does not contact a ball in its lowermost position until the requisite number of ordinal shifts have been completed.

It will be recalled that the toggle 3134—3136 is broken to initiate the "blank" setting clutch operation which, in turn, initiates the shift operation. The toggle is then restored in order to limit the setting clutch to a single blank operation. During the restore cycle of the setting clutch, a lever 3575 (FIG. 58) is rocked clockwise, as described under the heading "Return Shift to Home Position," at which time an eccentric stud 3800 contacts lever 3139 (FIG. 17) and rocks the latter clockwise to its initial position, thus restoring the toggle 3134—3136 and at the same time rocking the setting clutch blank initiating lever 3143 back to the initial position shown.

The above description has been concerned with the initiation of a leftward tabulation of the carriage 250 (FIG. 1). Referring now to a rightward tabulation such as that required to move the carriage from the #6 position to the #9 position, for example, the operator depresses the #9 decimal key 3070. This results in rocking all of the bellcranks 3107 (FIG. 12) in a clockwise or downward direction. As the balls 3115 of all higher orders move downward, the ball 3115 (FIG. 16) moves from the full line to the dotted line position and moves the shift control member 3116 downward to the position shown in FIG. 16A (or counterclockwise as viewed in FIG. 13). This movement acts through knob 3123 (FIG. 13) to rock the roller 3128 (FIG. 17) in a counterclockwise direction to the dotted line position 3128b, and thus permits lever 3130 to rock counterclockwise two increments. This moves the stud 3148 to the dotted line position 3148b, and through link 3149 rocks lever 3150 (FIG. 10) to the extent that stud 3151 thereon is moved to the dotted line position 3151b. The latter rocks lever 3152 counterclockwise and, through extension 3154, rocks the shift direction interponent 1383 to its right shift position where the hooked end overlies ear 1217.

Meanwhile the counterclockwise movement of lever 3139 (FIG. 17) initiates a blank setting clutch operation which, as previously described, initiates a shift operation. In the present case the carriage is shifted to the right until the control member 3116 approaches its leftmost position. At such time the upper camming surface 3169 (FIG. 16A) contacts a ball 3170 (FIG. 12) fixed in the machine framework in the upper position shown and the control member is rocked to its initial position to terminate the shift in the same manner as described in connection with a left shift operation.

*Multiplication mechanism*

Multiplication operations are performed by first entering the multiplier factor in the keyboard 100 (FIG. 1) in correct relationship to a selected keyboard decimal 3180. Depression of the "X" key 3006 transfers the multiplier value to the front dials 3000, clears the keyboard 100, and then shifts the carriage 250 toward the right or left a number of orders, depending upon the ordinal location of the highest significant multiplier digit standing in the front dials. This moves the counter, or upper dial, register 1875 from its original position of correct decimal indication to a position where the order of the counter in which the highest significant multiplier digit is to be entered stands underneath the arrow on the back cover.

The multiplicand is then entered into the keyboard and, upon depression of the positive equals key 3200, the middle and upper dials are automatically cleared followed by multiplying operations which are automatically carried out starting with the highest significant multiplier digit and progressing through successively lower orders until the multiplier factor has been exhausted. At such time, the front dials 3000 are cleared of the multiplier factor and the carriage is returned to its initial decimal position where the indicator 4000 correctly points off the decimal for the middle dials 279 and the fixed decimal 3187 correctly points off the decimal for the multiplier in the upper dials 1875. Negative multiplication is carried out under control of a negative equals key 3201.

The multiplier value set in the front dials 3000 may be retained as a constant by depressing the front dial lock key 3202 which prevents clearance of the front dials at the conclusion of the multiplying operation.

Depression of the square X key 3724 results in the same operation as depression of the X key 3006 except that after the multiplier factor is transferred from the keyboard to the front dials, the keyboard is not cleared. Thus, upon subsequent depression of the equals key, the value in the keyboard is multiplied by itself.

As a safeguard, the X key, when depressed, remains in such position until after a multiplying operation by either equals key has been completed. This serves to indicate to the operator that a multiplier factor has been entered into the front dials and also prevents entry of another multiplier factor.

Multiplication by a constant factor stored in the front dials 3000 is accomplished by entering the multiplicand in the keyboard and depressing the X key 3006 and the = key 3200 (or neg. = key 3201) in sequence.

*Transfer of keyboard value to front dials*

It will be recalled that the depression of the keys 100 (FIG. 2) moves respective selection bars 120 to value representative positions. Each such bar has pin and slot connection 3903 with a respective lever 3001 pivoted at 3002 in the framing of the machine. Each selection bar will stand at a value representative position of zero or one to nine, thus locating an ear 3004 in a position corresponding to the value entered in its respective order of the keyboard. In FIG. 2, the No. 9 key is shown in depressed position, and the selection bar and associate mechanisms are also shown in the No. 9 value position, thus locating the ear 3004 in a No. 9 position. Now, upon depression of the X-key a plurality of ordinally arranged cams 3005 are released as explained below, which cams rock clockwise until one of ten steps 3005a on each cam contacts a respective ear 3004. A second step cam 3204 is yieldably urged counterclockwise by a torsion spring 3205a which interconnects cams 3005 and 3204 to the extent that an enlarged portion of a stud 3206 carried by the step cam 3204 contacts a surface 3207 on an extension of step cam 3005. Thus, these two step cams normally move in unison with each about shaft 3291 during a multiplier value entry operation. A link 3208 is connected at 3206 to the step cam 3204 and the opposite end of the link has adjustable eccentric connection 3209 with a lower arm 3210 of a gear segment pivoted at 3211. The gear segment is enmeshed with a gear 3212 fixed to a multiplier check dial 3000 freely pivoted about a transverse shaft 3213. A torsion spring 3214 normally urges the check dial in a counterclockwise direction, and, through the geared connection and the articulated linkage shown, constantly exerts a force tending to move the step cam 3204 in a clockwise direction. Such movement is prevented by a transverse bail 3007 which normally stands in the position shown, but which is moved from this position to rock in a clockwise direction and permit the afore-described movement of the step cams 3005 and 3204 and their consequent rotation of the check dials 3000 upon depression of the X-key as follows.

The X-key 3006 (FIG. 23) has a key stem 3218 which is mounted for up and down sliding movement within the framework of the machine and is normally spring urged to its upwardly raised position by means not shown. The lower end of the key stem has a slot 3219 which embraces a fixed stud 3220 for guiding the key in its up and down movement. A second slot 3221 is provided in the upper part of the key stem for cooperation with a pin 3222 fixed to one arm 3223 of a bail 3224 pivoted at 3225 in the frame work of the machine. A slight amount of lost motion is provided between the top of the slot 3221 and the pin 3222 to permit certain preliminary functions by the X-key, described below, before rocking the bail. Upon full depression of the key, the bail 3224 is rocked in a clockwise direction, and the second arm 3226 of this bail carries a live tip 3227 pivoted thereon and spring urged in a counterclockwise direction by a torsion spring 3228 to the position shown. In this position, a lower extension 3229 of the live tip overlies an ear 3230 (FIG. 24) on a latch member 3231. The latter has a shoulder 3232 which overlies an ear 3233 on a lever 3234 and holds it in the position shown. Lever 3234 is freely mounted on a fixed shaft 3235 and has an ear 3236 which overlies a camming surface 3237 on a lever 3238. The latter is pivoted at 3239 and connected by link 3240 with an arm 3241 integral with the previously mentioned bail 3007 (see also FIG. 2). A spring 3242 urges the bail in a clockwise direction, and through the link 3240 it urges the lever 3238 in a counterclockwise direction. The cam surface 3237 underlying the ear on lever 3234 thus tends to move the latter in a counterclockwise direction, but such movement normally is prevented by the latch lever 3231. Upon rocking of the latch 3231 by the depression of the X-key, the lever 3238 is released and through the previously described mechanism permits the spring 3242 to rock the bail 3007 in a clockwise direction. At such time, the stepped cams 3005 and 3204 (FIG. 2) are released to rotate the multiplier check dials 3000 to a display position which corresponds with the value standing in the keyboard as previously described. Also the step cam 3204 is set in a corresponding position which is subsequently sensed during the multiplying operation.

*Engagement of the master clutch*

The depression of the X-key in addition to performing various conditioning operations also serves to engage the master clutch 3245 (FIG. 23). The previously described live-tip 3229 overlies an ear 3246 on a lever 3247 and upon depression of the X-key rocks the lever 3247 counterclockwise about shaft 3248. Lever 3247 carries a pin 3249 which overlies the leftmost arm of a bellcrank 3250. The latter has an ear 3251 which lies in the plane of a rearwardly projecting lug 3252 on a link 3253 so that when the key is depressed and the lever 3247 is rocked in counterclockwise direction the link 3253 is moved in a leftward direction. The rightmost end of link 3253 is pivotally connected to one arm 3254 of a double armed bail 3255 pivotally mounted on a fixed shaft 3256. Also pivotally mounted on this shaft is the master clutch dog 3257 to which is riveted a plate 3258 having a transverse ear 3259 overlying the bail 3255. It will therefore be evident that leftward movement of the link 3253 rocks the bail 3255 counterclockwise and thru the overlapping ear 3259 rocks the master clutch dog to clutch engaging position. At such time the clutch rotates 360° during which it performs several conditioning functions described below, and then is disengaged.

Since the operator may depress the X-key sufficiently to perform several conditioning functions but not far enough to engage the master clutch, the following means are provided to insure engagement of the master clutch upon such partial depression. Referring to FIG. 24 a roller 3260, carried by the lever 3238 lies to the right of a camming surface 3261 on the lever 3231. It will be recalled that the latter lever is rocked counterclockwise by depression of the X-key to release the lever 3234 at which time the lever 3238 rocks in a counterclockwise direction. At such time the roller 3260 rides under the camming surface 3261 of the lever 3231 and forces the latter to its full counterclockwise position even though the key may not have been depressed far enough to cause such rocking movement. The lever 3231 has an ear 3262 at its upper extremity which lies adjacent the ear 3251 on lever 3250 (FIG. 23) and through this ear it rocks the lever 3250 to its full counterclockwise position to insure that the master clutch is engaged as described above.

It will be recalled that the depression of the X-key moves bail 3224 (FIG. 23) clockwise, at which time it moves from the position shown in FIGS. 23 and 59 to that shown in FIG. 60. At such time, the live tip 3227 stands opposite a pin 3585 on a lever 3271. Therefore, the hereinafter described counterclockwise movement of lever 3271 causes the pin 3585 to move into engagement with the live-tip 3227, and rock it out of holding relationship with ears 3246 and 3230. This, in effect, breaks the connection between the X-key and the master clutch engaging means and limits the master clutch to a single cycle of operation irrespective of the fact that the X-key is held down.

The master clutch normally causes engagement of the middle and upper dial clear clutches. In the present embodiment, however, the middle dials and upper dials are not to be cleared upon depression of the X-key, and therefore means are provided to prevent initiation of operation of these clutches by the master clutch. Referring first to the mechanism whereby the master clutch causes engagement of the middle and upper dial clear clutches, a cam 3265 (FIG. 26) is keyed to a shaft 3266 which is driven by the master clutch. Cam 3265 rocks a double armed bell-crank follower 3267 counterclockwise about the pivot 3268 and pulls link 3269 toward the right. The left end of the link is pivotally connected at 3270 to a lever 3271, pivoted at 3272. A stud 3273 is fixed on lever 3271 and is normally engaged by a hook 3274 on the right end of a link 3275. The leftmost end of the link is pivotally connected to an arm 3276 fixed to the previously mentioned shaft 3016 (FIGS. 5 and 6). Thus, the master clutch cam 3265 acts through the linkage shown in FIG. 26 to rock the shaft 3016 in a clockwise direction. Arms 3278 and 3022 (FIGS. 5 and 6, respectively) are fixed on shaft 3016 and each has an ear underlying the arms 3280 and 3023, respectively. Thus, the arms 3280 and 3023 are rocked clockwise, and these arms, as previously described, initiate the operation of the middle and upper dial clear clutches.

Referring now to the means for preventing the operation of these clutches when the X-key is depressed, it will be observed that the leftmost arm 3281 (FIG. 24) of lever 3231 overlies a pin 3282 on the link 3275 (FIG. 26). Thus, when the X-key is depressed and lever 3231 (FIG. 24) is rocked counterclockwise, the link 3275 is moved downwardly to break the connection between the master clutch and the middle and upper dial clearance initiating mechanism.

*Multiplier value locking mechanism*

The following mechanism is provided for locking the links 3208 (FIG. 2) in their multiplier value adjusted positions after which the keyboard may be cleared. The locking mechanism includes a lever 3290 (FIG. 28) in each order, having lost motion keyed connection with a shaft 3291. Normally, all of the levers 3290 are held in the clockwise position shown where ears 3292 on levers 3290 stand above extensions 3293 on the links 3208. An arm 3294 is tightly keyed to the shaft 3291 and is normally held in the position shown by means of a latch 3295 pivoted at 3296. Latch 3295 is urged by spring 3297 to the position shown through the intermediary of a double-armed live-tip 3298 as follows. The two arms 3299 and 3300 of the live-tip are connected by a web which passes through a slot in the latch lever 3295, the spring 3297 being connected to the web portion of the live-tip. The previously mentioned roller 3260 (see also FIG. 24) which is carried by the lever 3238 normally overlies the arm 3299 of the live-tip holding the live-tip in a depressed position, where the arm 3300 is out of the path of movement of a stud 3301; however, when the X-key is depressed roller 3260 moves to the left and away from the live-tip 3299, thus permitting the live-tip 3300 to move into the path of movement of stud 3301. The stud 3301 is carried on the previously mentioned link 3269 (FIG. 26) which is operated by the master clutch. Normally, the stud 3301 is in the full line position shown in FIG. 28 but is moved toward the right and back during the master clutch cycle, during which rightward movement it contacts the arm 3300 (FIG. 29) of the live-tip thus, rocking the live-tip and the latch lever 3295 in a clockwise direction to release arm 3294. At such time, all of the lock levers 3290 (FIG. 28) drop down onto respective steps 3302 of the links 3208, depending upon the current position of such links. If a link is standing in a zero position, the lock lever falls on the extension 3293, whereas if the link is standing in a value from 1 to 9, the lock lever will drop on a corresponding step 3302. It will therefore be apparent that when the bail 3007 (FIG. 2) is returned to its initial counterclockwise position shown, the links 3208 will be held in their locked positions. It will further be noted that when the step cams 3005 are returned to their counterclockwise positions by the bail 3007, the step cams 3204, due to their pivotal connection with the links 3208, will be held in a position corresponding to the locked position of the links, the spring 3205a permitting the step cam 3005 to be returned counterclockwise to its initial position while the step cam 3204 is held locked in its multiplier value representative position. Each step cam 3204 is used during the multiplying operation to serve as a representation of the multiplier value in its respective order.

The mechanism for returning bail 3007 to its initial position comprises a cam 3304 (FIG. 31) driven by the caster clutch, which cooperates with a double armed follower lever 3305 to reciprocate a link 3306. The leftmost end of the link has a slot 3307 cut therein for cooperation with a reduced diameter of the pin 3260 on the lever 3238 (see also FIG. 24). The link 3306 is reciprocated by the master clutch cam 3304 at which time the slot picks up pin 3260 on lever 3238 and restores the latter to its initial position shown in FIG. 24. Thus, the lever 3241 and bail 3007 are returned to the initial positions shown.

After the multiplier value has been transferred from the keyboard and locked in the front dials, the keyboard is cleared. For this purpose a mechanism is provided which is conditioned by the depression of the X-key and subsequently operated by the setting clutch to cause such clearance. It will be recalled that depression of the keyboard clear key 300 (FIG. 54) rocks lever 316 clockwise about pivot 318 and through bail 319 rocks the ordinal clear levers 320 upwardly to effect clearance of the keyboard. During multiplication operations the lever 316 is rocked to effect such clearance as follows.

Link 315 (FIG. 30) is connected to lever 316 and carries a live-tip 3612 having an ear 3311 which stands adjacent a lever 3312. The latter is pivotally mounted at 3312a and is spring urged counterclockwise to the position shown. A link 3314 serves as an intermediate member for transmitting movement from the setting clutch to lever 3312 to thereby rock the lever clockwise and cause keyboard clearance.

Normally link 3314 stands in the full line position shown but upon depression of the X-key and the resultant operation of the master clutch, link 3314 is moved to the left whereupon the left end thereof moves to the dotted line position 3314a. In this position the link underlies a stud 3315 on lever 3312, and also overlies an extension 3316 of a bail 3317. The upper end 3318 of the bail is connected by link 3319 with a cam follower 3320. A cam 3321 is rotated by the setting clutch, as described hereinafter, and acts through the linkage described to rock the extension 3316 in a clockwise direction. Thus, with link 3314 standing in the dotted line position, the extension moves link 3314 upwardly and rocks lever 3312 clockwise to cause clearance of the keyboard.

Figure 32:
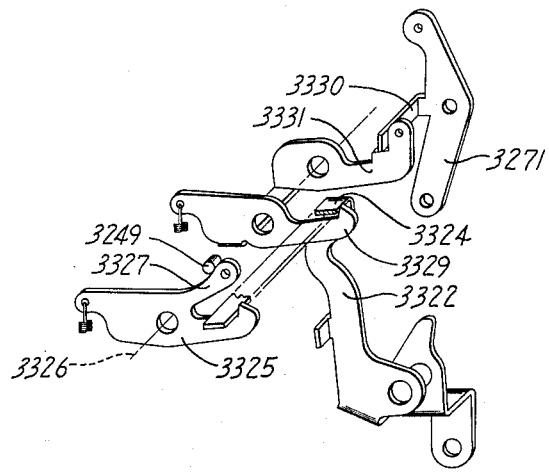
FIG. 32 is a spread out projection of a delay latch associated with the multiplier value entry mechanism.

The above-mentioned link 3314 is moved to the left by depression of the X-key as follows. The rightmost end of the link is connected to a lever 3322 which is pivotally mounted on a fixed shaft 3323. The upper end of lever 3322 is formed over as an ear 3324 which normally is held in the position shown in FIG. 30 by a latch lever 3325 (FIG. 32). The latter is mounted upon a fixed pivot, schematically illustrated at 3326, and is spring urged counterclockwise to the position shown. Upon depression of the X-key 3006 (FIG. 23) the lever 3247 is rocked counterclockwise as previously explained. The pin 3249 on the lever overlies the upper extending arm 3327 (FIG. 32) of latch lever 3325 and rocks the latter clockwise out of restraining engagement with ear 3324. At such time lever 3322 rocks clockwise in response to spring 3328 (FIG. 30), but rocks only to the extent that it engages a second latch lever 3329 (FIG. 32). This second latched position prevents the first latch from re-engaging ear 3324 and delays further clockwise movement of lever 3322 until after the master clutch has locked the multiplier values in the front dials. Shortly thereafter, the master clutch cam 3265 (FIG. 26) rocks lever 3271 counterclockwise, as previously explained, and an ear 3330 (FIG. 32) on the lever 3271 rocks an arm 3331 clockwise. Arm 3331 is integral with the second latch 3329 and therefore the latter is rocked clockwise to release lever 3322 and thus enable the setting clutch to clear the keyboard.

Another function performed by the lever 3322 is to disable the connection between the decimal keys and the shift control directional mechanism and instead, to place the shift direction control mechanism under the control of the multiplier value control mechanism. For this purpose, lever 3322 carries an ear 3335 (FIG. 10) which lies adjacent a lever 3336. The latter is pivoted on the same shaft 3312 as lever 3322. The upper end of the lever 3336 carries a stud 3337 which lies adjacent the previously described link 3149. The stud 3148 on the lower end of link 3149 normally lies in the terminal end of the Y shaped slot 3338 formed in the shift direction control lever 3130; however, upon movement of lever 3322 in a clockwise direction, the ear 3335 moves the lever 3336 and its stud 3337 in a clockwise direction. Impingement of the stud upon the link 3149 rocks the latter in a counterclockwise direction about pivot 3339 thus removing the stud 3148 from the slot in the shift direction control lever 3130. Meanwhile, the stud 3337 moves over the top surface 3340 of lever 3130 to hold the lever in its neutral non-shift position and in which position it is held throughout multiplying operations.

Another conditioning operation performed by depression of the X-key and the resultant release of lever 3322 (FIG. 10) is to condition a multiplier sensing mechanism for subsequent operation by the setting clutch. The sensing mechanism determines the location of the highest significant multiplier digit and controls the shifting of the carriage to such position.

When lever 3322 rocks clockwise and rocks lever 3336 the leftmost arm 3401 (FIG. 37), in rocking clockwise permits a lever 3403 to rock counterclockwise about its pivot 3404 to a position in which an ear 3405 engages with a notch 3406 on a latch 3373.

Upon subsequent operation of the setting clutch and its cam 3321 (FIG. 30) the follower 3320 acts through link 3319 to rock lever 3318 clockwise, as previously described. Lever 3318 is integral with an arm 3407 (FIG. 37) to which lever 3403 is pivotally connected. Thus, the clockwise movement of lever 3407 moves lever 3403 toward the right and, in turn, moves latch 3373 counterclockwise. This releases the latch 3373 from an ear 3374 of a multiplier sensing mechanism described hereinafter.

It should be kept in mind that when the lever 3403 is released and engages the notch in latch 3373, the lever 3403 is at such time held in a position which is slightly below that shown in FIG. 25, and in which position, the upper extension 3408 of the lever 3403 lies below and to the left of an ear 3409 on lever 3410. After lever 3407 (FIG. 37) moves latch lever 3373 toward the right to release lever 3371 the latter rocks counterclockwise. This counterclockwise movement of lever 3371 blocks the return movement of the latch lever 3373 which permits lever 3403 to rise to the position shown in FIG. 25, where it remains until the equals key is depressed as explained hereinafter.

*Shift to highest significant multiplier digit*

Referring to FIG. 28, it will be recalled that in each order where a value other than zero has been set, the extension 3292 of lever 3290 drops onto a respective step 3302 of the link 3208. At such time, a respective latch-lever 3345 which is freely mounted on the keyed shaft 3291 and spring urged in a counterclockwise direction, is permitted to rock in a counterclockwise direction and to contact the ear 3346 of a shift control lever 3347. It will thus be observed that in each order where a value other than a zero has been set, the latch lever 3345 will lie on top of the ear 3346; however, if any ordinal link 3208 stands at a value of zero, then the extension 3292 is blocked by extension 3293 of the link and thus latch lever 3345 is prevented from falling on ear 3346. It will further be observed that if the keyed shaft 3348 is first rocked in a counterclockwise direction and then returned to its initial clockwise position, all levers 3347 will be rocked in a counterclockwise direction and then tend to return to their initial positions by springs described hereinafter; however, in all orders where a latch lever 3345 has been released to lie on top of the ear 3346, the latch lever 3345 will fall into restraining engagement with the ear and hold the lever 3347 in its counterclockwise position. Thus, with any lever 3347 being held in its counterclockwise position, the shaft 3348 will also be held rocked in a counterclockwise position. Since the levers 3347 are loosely keyed to the shaft 3348 a pre-determined amount of return clockwise movement of the shaft is permitted.

Shaft 3348 (FIGS. 26 and 28) is rocked counterclockwise by the previously mentioned master clutch cam 3265 (FIG. 26) which moves link 3269 toward the right. A link 3663 is connected to link 3269 and the opposite end has pin and slot connection 3664, 3665 with an arm 3666 which is fixed to shaft 3348. The master clutch cam 3265 therefore rocks shaft 3348 and levers 3347 (FIG. 28) counterclockwise, and in all orders where there is a multiplier value other than zero, the lock levers 3345 engage the ears 3346.

Figure 33:
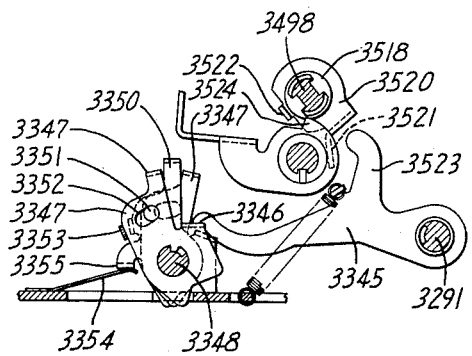
FIG. 33 is a right side view of the mechanism which controls shifting operations during multiplication.
Figure 34:
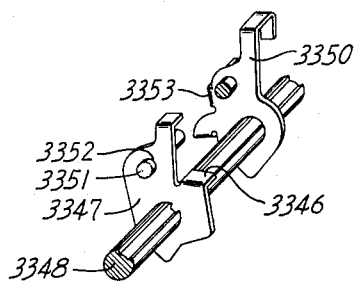
FIG. 34 is a spread-out projection of a portion of the mechanism shown in FIG. 33.

For each one of the levers 3347 there is a corresponding lever 3350 (FIGS. 33 and 34). The latter lever lies adjacent lever 3347 and carries a pin 3351 which projects into an elongated slot 3352 of the lever 3347. The levers 3350 are freely mounted on the shaft 3348 and each lever 3350 carries an ear 3353, which in the normal position of the parts, lies adjacent the left side of the next higher order lever 3347. Respective leaf springs 3354 underlie a second ear 3355 on levers 3350 urging the levers in a clockwise direction toward the initial position shown. It will be observed that in all orders where a lever 3347 is held locked in a counterclockwise position as shown in FIG. 33, the rightmost end of the slot therein limits the movement of the pin 3351 on its adjacent lever 3350 to a position which is clockwise relative to the locked position of lever 3347, and approximately mid-way between a lever 3347 which is held in its counterclockwise position and a lever 3347 which is permitted to return to its initial clockwise position. It will be noted that where any lever 3347 is held in its counterclockwise position, the leftward surface thereof impinges on the ear 3353 of the adjacent lower order lever 3350 and holds that lever in a full counterclockwise position. The lever 3350 being thus held in counterclockwise position in turn acts through its pin and slot connection to hold the adjacent lower order lever 3347 in counterclockwise position. Thus all orders to the right of the highest order multiplier digit are held in a full counterclockwise position regardless of whether or not a value has been set in the lower orders of the multiplier factor mechanism.

In all orders which are to the left (higher value orders) than the highest significant multiplier digit, i.e., stand at zero, the levers 3347 and their cooperating levers 3350 will return to their full clockwise zero positions since in those orders the latches 3345 will have been held above the ears 3346 on the levers 3347. The arrangement is such therefore, that in the order of the highest significant multiplier digit, the lever 3347 will be held in its full counterclockwise position, the lever 3350 to the left thereof will be held in a mid-position, and all other higher order levers 3347 and 3350 will return to their initial clockwise positions. Thus, regardless of the ordinal location of the highest significant multiplier digit, one and only one lever 3350 will be standing in the mid-position shown in FIG. 33, and which position is invariably indicative of the location of the highest significant multiplier digit. Therefore, a first rule is established: sense for the lever 3350 in mid-position and shift the carriage according to this position; however, even assuming that the lever 3350 in mid-position is indicative of the order in which shift is to be terminated, there remains the problem of determining the direction in which the carriage is to be shifted in order to reach the lever 3350. A sensing mechanism, described below, is provided for determining the direction of shift and the basis of its operation is as follows.

The sensing mechanism comprises a carrier 3363 (FIG. 2) from which depends two sensing members 3375 and 3380. The carrier is mounted on the worm shaft 3100 for shifting movement relative to the levers 3347 and 3350, and is shifted in timed relationship with the register carriage 250, as previously described. Briefly, the carriage 250 and the carrier 3363 normally stand in a home position corresponding to the ordinal number of the decimal key 3070 which is depressed.

When the X-key is depressed the sensing carrier 3363 is rocked counterclockwise to one of three discrete positions as determined by the levers 3347 and 3350. The rocking of the carrier to a respective one of these three positions is used to determine a left shift, a right shift, or a non-shift condition. Assume, for example, that a multiplier value of 6.02 has been entered into the keyboard. Since the highest significant digit, the "6," is in the units, or "home" order, no shift will be required. Now, when the X-key is depressed the sensing carrier 3363 is yieldably rocked in a counterclockwise direction as described hereinafter and since the carrier 3363 stands aligned with the highest significant digit of the multiplier, then the sensing member 3375 contacts lever 3350 which stands in mid-position and blocks further counterclockwise movement of the carrier 3363. This condition is schematically illustrated in the chart comprising FIG. 68.

The leftmost column of the chart shows the respective multiplier values 6.02, 0.216, and 27.1. The remainder of the chart shows the three respective positions assumed by the levers 3347 and 3350.

The levers 3350 are indicated by shaded areas and levers 3347 are numbered to correspond to the value of the multiplier digits standing in respective orders relative to the decimal 3183. The circles 3375 and 3380 are numbered to correspond with the sensing members of the same reference numerals shown in FIG. 2 and indicate in FIG. 68 the orders which are sensed. As previously explained, the sensing carrier stands at home position in the units order relative to the decimal 3183 when the X-key is depressed. Therefore, in the example using a multiplier value of 6.02, where the highest significant digit, the "6," stands in units order, the lever 3350 standing in mid-position underlies the sensing member 3375 and blocks the same to adjust for a non-shift condition.

If a value of .216 is to be sensed then since the highest significant digit, the "2" is in the "tenths" order, the lever 3350 in mid-position is one order to the right of the sensing member 3375 and therefore does not block the same; however, since all higher order levers 3347 and 3350 are standing in the rearward initial position shown, the sensing member 3380 is blocked by lever 3347. Since the terminal ear on top of lever 3347 (FIG. 2) is lower than the terminal ear of lever 3350, the carrier 3363 is rocked father counterclockwise in contacting lever 3347 and this second discrete position is used to initiate a left shift of the carriage and a right shift of the carrier 3363. Such shifting is continuous until the sensing member 3375 reaches the mid-lever 3350, and as explained hereinafter, this terminates the shift. In the present example a one order rightward shift occurs to transport the carrier 3363 to the highest significant multiplier digit.

Now, assume that a multiplier value of 27.1 is entered into the front dials and the X-key is depressed. At such time the levers 3347 and 3350 assume the positions shown in FIG. 68, and in this case none of the levers 3347 and 3350 underlie the sensing members 3375 and 3380. This permits the carrier 3363 (FIG. 2) to rock counterclockwise to a third discrete position and condition for a continuous right shift of the register carriage. This results in a left shift of the carrier and the members 3375, 3380 to permit member 3375 to seek the lever 3350 standing in mid-position and terminate the shift. In the present example, the shift is terminated after completing one ordinal shift.

The specific operation of the sensing carrier and its control over the shifting mechanism is as follows. The sensing carrier 3363 includes a pair of carrier arms 3360 and 3361 (FIG. 36) which are fixed to a worm nut 3362 for sliding movement upon the worm shaft 3100, and which arms are connected by a web 3363. An extension 3364 of the web is bent upwardly and a plate 3365 is fixed to this upwardly bent portion. The upper end 3366 of the plate 3365 is bent rearwardly and projects through a notch cut in the extension 3364. The notch and a pair of rivets hold the plate in the fixed relation to the web 3363. It will be observed that the web 3363 together with the rearward projecting portion 3366 of the plate form a pair of horizontal arms which slidably embrace a transverse bail 3367 extending across all orders of the keyboard. The bail 3367 is pivotally mounted at 3368 and 3369 to the framework of the machine and is connected by a stud 3370 to a lever 3371 which is also pivoted at 3368. A spring 3372 connected to stud 3370 urges lever 3371 and the bail 3367 in a counterclockwise direction but such movement normally is blocked by the latch lever 3373 (FIG. 37) which restrains ear 3374 on lever 3371. From the foregoing description it will be seen that when the worm shaft 3100 (FIG. 36) is rotated in either direction, the carrier 3363 will be moved transversely of the bail 3367 in one or the other direction.

The plate 3365 (FIG. 36A) is formed with a pair of opposed cam surfaces 3375 and 3376 for cooperation with the shift control levers 3350 (FIG. 33), as explained hereinafter. Also a live-tip 3380 (FIGS. 2 and 36) is pivotally mounted at 3378 to plate 3365 and is spring urged in a clockwise direction (as seen in FIG. 36) to the extent that an ear 3379 on the live-tip lies against a top surface of the extension 3364. A depending portion of the live-tip, forms the sensing member 3380, referred to hereinbefore.

From the foregoing it is seen that when the carrier 3363 is rocked to one of three discrete positions in determining a non-shift, left shift, or right shift condition, the lever 3371 (FIG. 36) is rocked to a similar discrete position. Since the three problems illustrated in the schematic drawing (FIG. 68) indicate that a shift to the right, to the left, or no shift may be required depending upon the value of the multiplier entered into the keyboard at the time the X-key is depressed, the following means are provided to control the movement of the shift interponent 1383 (FIG. 10) for right and left shift, and to control the position of the enabling lever 1378 for either a shift or a non-shift. Briefly, each time the X-key is depressed, the machine is temporarily set for a non-shift condition, and then if a right shift or a left shift is indicated by the multipler value sensing mechanism, the shift interponent 1383 is appropriately adjusted to right or left shift position and the lever 1378 is moved to shift enabling position. If a non-shift condition is indicated by the sensing mechanism, then the mechanism merely remains in non-shift condition. It will be recalled that the lever 3322 (FIG. 32) is released from the two latches 3325 and 3329 by the depression of the X-key and the ensuing master clutch cycle of operation, and rocks clockwise to the position shown in FIG. 38. At such time, the ear 3324 on the upper end of lever 3322 contacts a shift disabling interponent 3385 and rocks the latter counterclockwise about a fixed pivot in the machine. An extension 3386 on the interponent moves a stud 3387 on lever 3388 in a counterclockwise direction about the pivot 3389 whereupon the rightmost end 3390 of the lever 3388 contacts the leftmost end of the enabling interponent 1378 and rocks the same to disabled clockwise position until the previously described carrier 3363 (FIG. 2) determines whether a non-shift, left shift, or right shift is required. The carrier 3363 (FIGS. 2 and 36) is also enabled by the depression of the X-key, as described hereinbefore, whereupon the lever 3371 (FIG. 37) rocks counterclockwise to one of three positions, depending upon the value of the multiplier, as previously described.

In FIG. 41, the lever 3371 is shown in its non-shift position. The dotted line A indicates the initial position of ear 3391 on the lever 3371, B indicates the non-shift position of the lever, C indicates the left shift position of lever, and D represents the right shift position of the lever. Referring now to the multipler value of 6.02 with which a shift was not required, lever 3371 (FIG. 41) moved only one increment from position A to position B where the ear 3391 lies to the left of the ear 3393 (see also FIG. 38) of the shift interponent 3385 which has previously been moved to non-shift position. Thus, shift interponent 3385 (FIG. 38) is blocked in non-shift position even though lever 3322 is subsequently returned to its initial position.

Referring now to the problem in which the multiplier is a value of .216, it will be recalled that a left shift of the carriage is required. It will further be recalled that under these conditions, the multiplier sensing mechanism is so controlled as to rock the lever 3371 (FIGS. 41 and 42) to the position C. In this position, the ear 3391 lies above the ear 3393 on shift interponent 3385 (FIG. 38), and therefore, does not block the return movement thereof. Thus, when lever 3322 is returned to its initial counterclockwise position, the shift interponent 3388 will return to its initial clockwise position, releasing the shift enabling lever 1378 to the urgency of its spring 3077 for movement to its shift enabling position. Since the shift interponent 1383 (FIGS. 10 and 37) is normally set for a left shift, and the shift enabling lever 1378 is adjusted to initiate a shift, a left shift will subsequently be initiated, as explained hereinafter.

Figure 37:
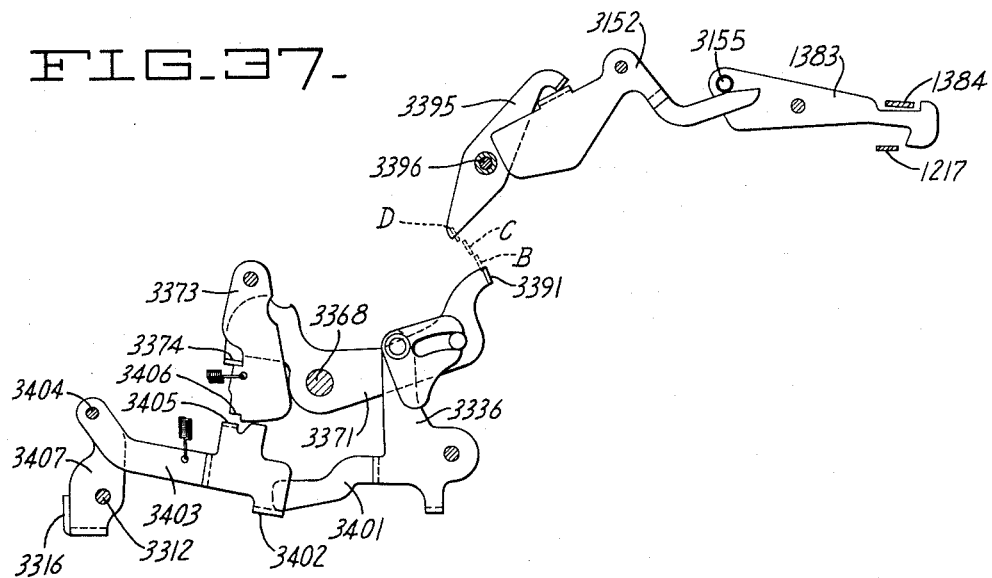
Figure 38:
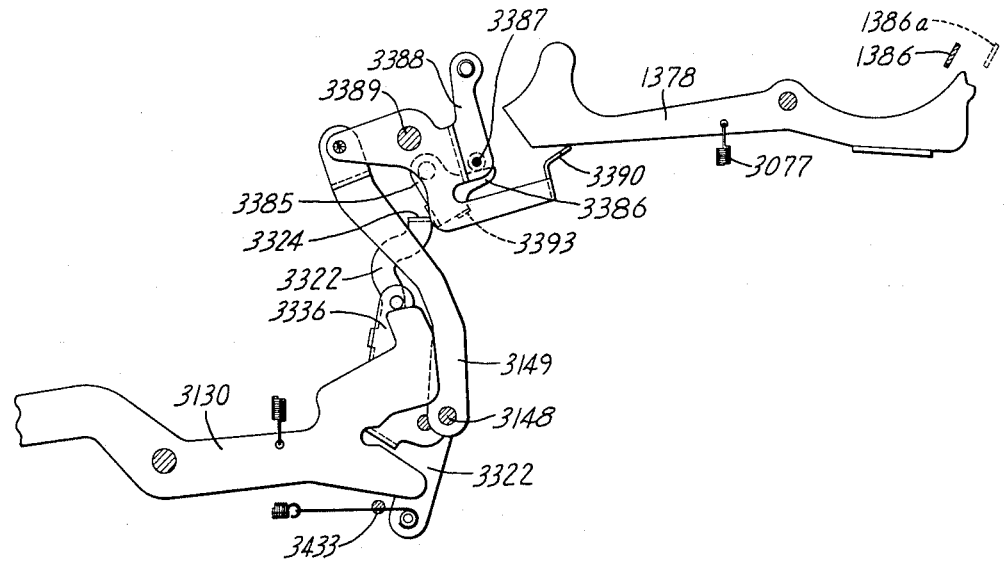
Figure 43:
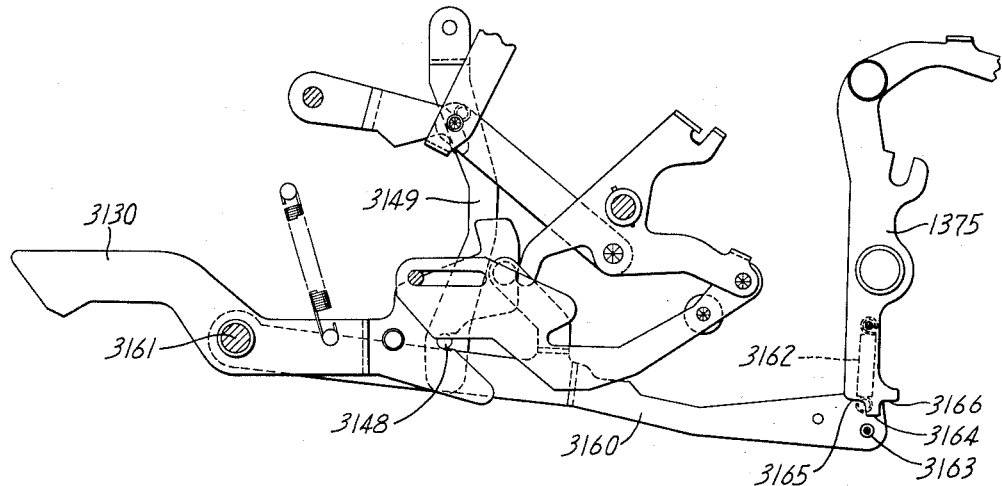
Figure 44:
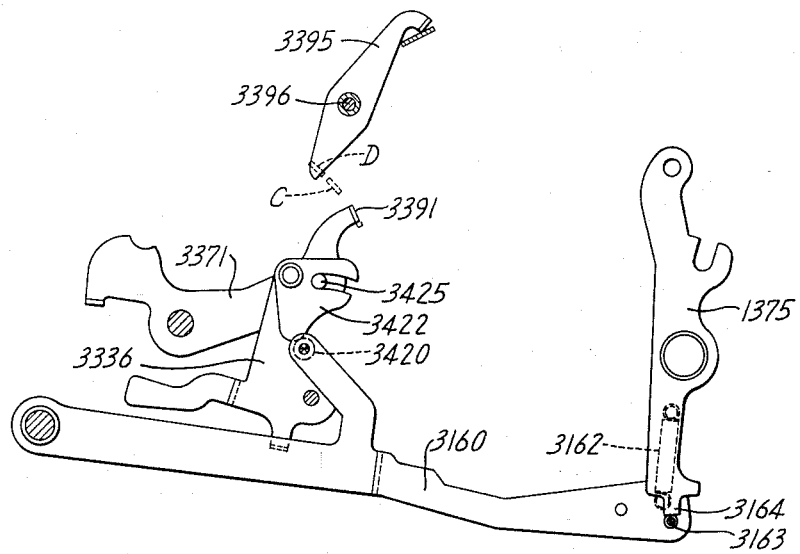

Assuming now that a multipler value of 27.1 stood in the keyboard at the time the X-key was depressed, then upon operation of the sensing carrier 3363 (FIG. 2), neither one of the sensing levers 3375 nor 3380 will contact a respective one of the shift control levers 3347 or 3350 and the sensing carrier and lever 3371 (FIG. 37) will therefore rock to full counterclockwise position as indicated by the dotted lines D in FIG. 37. At such time, the ear 3391 contacts a lever 3395 and rocks the same in a clockwise direction about its pivot 3396. Such movement of the latter lever rocks the lever 3152 counterclockwise, and since the rightmost arm of the latter lever underlies a pin 3155 on the shift interponent 1383 the latter will be rocked clockwise where it overlies ear 1217 which is its right shift conditioning position.

From the foregoing description, it is therefore evident that the depression of the X-key will release certain mechanisms to sense the value standing in the multiplier register and through such sensing will adjust the shift conditioning mechanism for a non-shift, a right shift, or left shift as the case may be. The actual shifting operation is subsequently initiated by setting clutch, as will be described hereinafter.

In the present machine, the depression of the X-key shifts the carriage to a position corresponding to the highest significant digit; however, it will be obvious that the controls could as well be arranged to shift to the least significant digit and that as long as the register is returned to its initial decimal position at the end of multiplication operations, the same product would be correctly displayed.

*Engagement of the setting clutch*

The previously-mentioned clockwise movement of lever 3322 also acts to cause engagement of the setting clutch in the following manner. An extension 3412 (FIG. 30) of the lever 3322 rocks a stud 3413 on the upper arm 3414 (FIG. 21A) of the bail 3147 and rocks the bail clockwise. The stud 3413, in turn, contacts the ear 3415 on the arm 3416 of bail 3146 thus rocking the bail 3146 clockwise to remove the arm 3171 (FIG. 21) of the bail from underneath the ear 3417 on lever 1950. At such time the lever 1950, through the urgency of its spring, rocks counterclockwise and initiates the operation of the setting clutch as previously described. The operation of the setting clutch in the present instance is a "blank" operation and serves to engage the shift clutch; however, prior to such engagement of the shift clutch, the setting clutch cam 3430 (FIG. 45) rocks a follower 3431 counterclockwise, thus moving a link 3432 toward the right. At such time a stud 3433 on the link contacts the lower end of lever 3322 (FIG. 30) and returns it to its initial counterclockwise position where it is locked by latch 3325 (FIG. 32). When ear 3324 (FIG. 38) of lever 3322 is rocked counterclockwise, it moves away from the shift disabling interponent 3385, thus permitting the interponent and lever 3388 to rock clockwise due to influence of spring 3077 on the shift lever 1378 which overlies the extension 3390 of lever 3388. This is the operation of the parts if a shift is to be initiated; however, if the multiplier value sensing mechanism indicates that a shift is not required, then ear 3391 (FIG. 41) on lever 3371 stands in position B adjacent ear 3393 on interponent 3385 (FIG. 38) and prevents the interponent from moving from non-shift position. Meanwhile, the setting clutch continues operating through a setting cycle and a restore cycle, and near the end of the restore cycle the ear 1386 (FIG. 38) is moved from the dotted line to full line position and will, or will not, initiate the operation of the shift clutch depending on the position of lever 1378. It will be recalled that lever 1378 stands in a counterclockwise position in the path of movement of ear 1386 if a shift is required to move the carriage to a position corresponding to the highest significant multiplier digit position, whereas, if the carriage is currently standing in such position lever 1378 will be held clear of ear 1386.

Assuming for purposes of illustration that a right (or left) shift is required and is initiated. At such time the shift lever 1375 (FIGS. 10 and 43) is rocked either clockwise (for right shift) or counterclockwise (for left shift) and is locked in such position by the shift latch 3160.

It will be recalled that pin 3148 overlies the shift latch 3160 (FIG. 43) and holds the pin 3163 on the right end of the shift lever 1375. When the X-key was depressed, link 3149 was rocked counterclockwise to the position shown in FIG. 38. This releases the shift latch to the urging of the spring 3162 (FIG. 43) and permits the shift latch to rock counterclockwise to the extent that the pin 3163 contacts the extension 3164 on the bottom of the shift lever 1375. Thus, when the shift lever is rocked in either direction to initiate a shift, the latch lever rocks further counterclockwise and pin 3163 engages a respective notch 3165 or 3166 to lock the lever 1375 in left or right shift position.

Prior to the initiation of the shift, however, a mechanism is enabled for terminating the shift when the carriage reaches the position corresponding to the highest significant multiplier digit. In the initial position of the parts shown in FIG. 40, a stud 3420 on an extension 3421 of the shift latch 3160 underlies an interponent 3422. The latter is pivotally mounted at 3423 on the upper end of lever 3336 and has pin and slot connection 3424, 3425 with lever 3371. It will be recalled that the depression of the X-key and subsequent operation of the master clutch rocks the lever 3336 in a clockwise direction, thus assuming the position shown in FIG. 41, where it is locked by a latch lever 3427. Also the multiplier value sensing mechanism rocks lever 3371 from its initial position A to one of the positions B, C, or D depending on whether a non-shift, left shift or right shift condition is sensed. The combined movements of levers 3336 and 3371 result in rocking the interponent 3422 to assume three different positions. If a non-shift is indicated as shown in FIG. 41 with lever 3371 in non-shift position "B," then the interponent 3422 is rocked counterclockwise to the extent that the depending lobe 3426 contacts the stud 3420 on the shift latch 3160 (see also FIG. 40) and rocks the shift latch to disabled condition. In this case this is an idle operation since no shift will be initiated anyway; however, if the lever 3371 is rocked to positions C or D (FIG. 42) the interponent 3422 is rocked further counterclockwise and above the stud 3420, thus re-enabling the shift latch. This is the condition of these parts at the time a right or left shift is initiated, and the shift latch 3160 then locks the shift lever 1375 in right or left shift position.

During the shifting operation the carrier 3363 (FIG. 36) is shifted in timed relationship with the register carriage until one or the other of the camming surfaces 3375 or 3376, FIG. 36A, contacts the lever 3350 (FIG. 33) which stands in mid-position, as previously explained. At such time the carrier 3362 (FIG. 36) is rocked upwardly (clockwise) and the lever 3371 is similarly rocked clockwise from the position shown in FIG. 42 to that shown in FIG. 41. At such time the interponent 3422 depresses the stud 3420, thus disabling the shift latch and permitting the shift clutch to become disengaged at the end of the current cycle.

This terminates the sequence of operations which are caused by depression of the X-key, the result of which has been to enter the value previously standing in the keyboard into the front dials, to clear the keyboard, and to shift the register carriage toward the right or left to a position corresponding to the highest significant multiplier digit.

It will be apparent to those skilled in the art that values may be entered in the front dials by manually controlled knobs of well-known construction, and that in this case the X-key would not be required to enter such a value but would merely shift the carriage under the control of the multiplier value as previously described.

*Square X-key*

The depression of the square X-key 3724 (FIGS. 1 and 52) initiates the same operations as the X-key but also disables the keyboard clear mechanism so that the same keyboard value may be used as a multiplicand. Thus, a value entered in the keyboard is squared merely by depressing the square X-key and the Pos.=key in sequence.

The square X-key 3724 (FIG. 52) is guided for up and down movement by a fixed pin 3725 in a slot 3726 in the keystem. Also an arm 3727 of a bail 3728 is pivotally connected to the keystem at 3729. A transversely bent ear 3730 on the keystem overlies an ear 3731 (FIGS. 23 and 52) on the X-key 3006, so that depression of the square X-key causes depression of the X-key and initiates the same operations as described in connection with that key. Meanwhile, an arm 3732 (FIG. 52) of the bail 3728 is rocked clockwise about the pivot 3733 and through contact with ear 3611 rocks the live-tip 3612 clockwise out of the path of lever 3312 (FIG. 30) to disable the automatic keyboard clearance mechanism.

A lock lever 3734 (FIG. 52), pivoted at 3735 and spring urged clockwise, engages ear 3736 on arm 3727 and holds the square X-key in depressed position. It will be recalled that the X-key initiates a blank setting cycle and 360° rotation of a shaft 431 (FIG. 30). During the first half of the blank setting cycle the cam 3321 rocks lever 3312 clockwise but since the live-tip has been rocked clear of the lever, the keyboard clearance operation is eliminated; then during the second half of the blank setting cycle, the cam 3570 (FIG. 56) acts through follower 3571 to move link 3572 toward the right at which time a stud 3738 (FIG. 52) rocks the lock lever 3734 counterclockwise and releases the square X-key.

*Equals key*

Assuming that the multiplier factor has been entered into the front dials as previously described, then the multiplicand is entered into the keyboard in correct decimal relationship to the keyboard decimal, and upon depression of the positive equals key 3200 (FIG. 46) or the negative equals key 3201 the upper and middle dials are automatically cleared followed by an automatic multiplying operation, starting with the highest significant multiplier digit and progressing through all lower order multiplier digits until the multiplier factor is exhausted. At such time, multiplying operations are terminated and the carriage is automatically shifted back to its initial decimal position so that the product decimal point is correctly indicated.

The positive and negative equals keys are mounted for up and down sliding movement by appropriate pin and slot connections as shown. A floating link 3442 is connected between respective extensions on the lower ends of the two equals keys. A link 3443 is pivotally connected to the center portion of link 3442 and the upper end of the link 3443 is pivotally connected to an arm 3444 of a bail 3445. Thus, upon depression of either of the equals keys, the bail 3445 is rocked in a clockwise direction. At such time, a live-tip 3446 (FIG. 48) on a second arm 3447 of the bail contacts an ear 3448 (FIG. 49) on a lever 3449 and through an upper ear 3450 on the latter pulls the link 3253 (FIG. 23) toward the left to engage the master clutch in the manner previously described. An extension 3451 (FIG. 49) of arm 3447 is engaged by a latch 3452 to lock the arm 3447, the bail 3445 (FIG. 46) and the equals key in a depressed position.

The engagement of the master clutch and the rotation of cam 3265 (FIG. 26) act through follower 3267, link 3269, lever 3271 and link 3275 to cause an automatic operation of the upper and middle dial clear clutches, as previously described.

Meanwhile, the depression of the equals key, and the rocking of bail 3445 (FIG. 48) acts through the rightmost end of arm 3447 to contact a pin 3453 and rock a member 3454 in a counterclockwise direction. A lower arm on the latter lies forwardly of an ear 3455 on lever 3456 which is freely mounted within the framework of the machine and spring urged in a counterclockwise direction. Upon counterclockwise movement of member 3454, the lever 3456 is rocked in a clockwise direction, thus moving a pin 3457 on the lower end thereof, away from a restart lever 3458. The latter is pivotally mounted at 3459 upon one arm 3460 of a bail 3461, which bail is pivotably mounted upon a shaft 3462 fixed in the framework of the machine. A spring 3463, connected between the fixed shaft 3462 and the right-most arm 3464 of the restart lever 3458, rocks the lever in a counterclockwise direction. This locates the upper end of the restart lever beneath the ear of the previously described lever 3371 which at this time is standing in the normal left shift position. According to the present invention, multiplication in the first order is initiated directly by the equals key whereas multiplication operations in successive orders will be initiated by the restart lever, described above, in a manner presently made clear.

The above-mentioned engagement of the master clutch acts through the linkage now described to initiate the first ordinal multiplying operation. When the master clutch is engaged, the link 3269 (see also FIG. 26) is moved toward the right as previously described, and acts through a camming surface 3466 (FIG. 49) on the leftmost end thereof, to rock an ear 3467 (FIG. 48) on bail 3461, in a counterclockwise direction. Bail 3461 has an ear 3468 which normally stands in restraining engagement with a lever 3469. Thus, upon rocking movement of the bail 3461, ear 3468 is rocked in a counterclockwise direction to release the lever 3469 which, in response to spring 3470, rocks in a counterclockwise direction about its pivot 3471. The leftmost end 3472 of the lever 3469 overlies the stud 3473 (FIG. 21A) and rocks the bail 3416 in a clockwise direction. It has previously been described how clockwise movement of the bail 3146 initiates a setting clutch cycle.

Setting clutch operation

The setting clutch rotates through 180° of operation, during which a mechanism senses the value of the highest significant multiplier digit and adjusts a multiplier control mechanism in accordance therewith, after which the setting clutch causes engagement of the main clutch which rotates the requisite number of cycles under the control of the multiplier sensing mechanism. After the main clutch has operated the required number of cycles, the main clutch operation is terminated and the setting clutch is re-engaged for its second 180° of operation, the restore cycle, to return the carriage to its initial raised position. The rise of the carriage, in turn, initiates a shifting operation, and the termination of shift restarts multiplying operations in the next lower order.

Referring now to the first 180° of operation in the setting clutch, the setting cam 3321 (FIG. 30) acts through the cam follower 3320 and the link 3319 to rock the arm 3318 and bail 3317 in a clockwise direction. Since link 3314 was previously returned to the full line position shown, as described under X-key operations, the bail 3316 does not clear the multiplicand out of the keyboard; however, the lever 3403 (FIG. 25) is connected to one arm 3407 of the bail 3317 which at this time, stands in a position shown in FIG. 25, as previously described, and in which position the ear 3408 stands adjacent the ear 3409 on arm 3410 fixed to shaft 3498. The setting clutch cam and the articulated linkage described above, therefore rocks the arm 3410 and the shaft 3498 in a counterclockwise direction. As seen in FIG. 18, the arm 3410 has pivotally mounted thereon at 3499 a plate 3500 to which is connected a pair of springs 3501. The upper ends of the springs are connected to a link 3502 having a slot 3503 which embraces the pivotal connection 3499. The pin and slot connection 3499, 3503, together with the springs 3501 provides a yieldable connection between arm 3410 and the link 3502 whereby the previously described counterclockwise movement of the arm 3410 causes downward movement of the link. The leftmost arm 3504 of a bail 3505 is pivotally connected at 3506 to the lower end of the link 3502 and therefore the bail is rocked in a counterclockwise direction about its pivot 3507 which is fixed within the framework of the machine. An upper extending arm 3508 of bail 3505 has pin and slot connection 3509, 3510 with an arm 3511. A transverse bail 3512 is fixed to arm 3511 and to a second arm (not shown) but similar to arm 3511, thus supporting the bail in a plane parallel to shaft 3498. The bail 3512 extends across all orders of the multiplier storage segments 3204 and is rocked clockwise by the setting clutch through the above-described linkage.

A sensing lever 3513 is freely mounted on a sleeve 3518 which is keyed to shaft 3498. The sleeve 3518 is formed with an annular internal ring 3519 (FIG. 2) which is constantly engaged by the peripheral surface of arm 3361 (FIG. 36) on the sensing carrier and the arrangement is such that the sensing carrier and the sleeve are shifted together as a unit on their respective shafts 3100 and 3498. Since, in the present instance, the sensing carrier 3363 stands in a position corresponding to the highest significant multiplier digit, the sleeve 3518 and the lever 3513 (FIG. 18) will also stand in such position. It will be recalled that the step cams 3204, one of which is provided for each order of the multiplier, are set in various adjusted positions according to the value of the multipliers entered in those orders. A notch 3519 is formed between the main portion of the sensing member 3513 and a finger 3517 on the upper side of the member. A transverse bail 3512 engages notch 3519 and rocks the sensing member 3513 downward regardless of the shifted position of the latter. In the present case the sensing member 3513 is aligned with the highest multiplier order and as the sensing member is rocked clockwise, it engages a respective one of the steps 3514 on the cam which blocks further movement of the sensing lever. At this time the spring connection 3501 of the above-described assembly yields.

Meanwhile, a second arm 3515, fixed to arm 3508, is rocked counterclockwise a proportional amount in accordance with the value in the multiplier, and through link connection 3516 (FIG. 19) rocks a segment 320 in accordance with the value of the current multiplier. The segment 320 forms a portion of the automatic multiplying mechanism described in the Patent No. 2,400,244, in which patent the segment 320 carries the same reference numeral. Reference may be had to this patent for the exact description of a manner in which multiplying mechanisms are controlled by the adjusted position of the segment 320, it being sufficient to here point out that the selectively set position of the segment controls the main clutch for a number of cycles of actuation of the numeral wheels, in accordance with the value of the current multiplier which is sensed. Upon conclusion of the actuating operation, the setting clutch is re-engaged to perform its restore cycle, i.e., to complete the remaining 180° of its 360° of rotation. During this restore cycle, the setting clutch raises the carriage.

Reverting now to the previously described sleeve 3518 (FIG. 33), it will be recalled that this sleeve is keyed to shaft 3498 which is rocked counterclockwise by the setting clutch before the main clutch is engaged. A member 3520 is fixed to the sleeve and therefore is rocked counterclockwise with the sleeve. The member 3520 carries two ears 3521 and 3522. During counterclockwise movement, ear 3521 contacts the upstanding arm 3523 of the lock lever 3345 associated with the highest significant multiplier digit, and rocks the lever 3345 in a clockwise direction to thereby remove it from restraining engagement with ear 3346 of lever 3347. Meanwhile ear 3522 on member 3520 contacts a shoulder 3524 of the sensing carrier and rocks the same in a clockwise direction, thus lifting the sensing members 3575 and 3580 (FIG. 2) above their respective levers 3350 and 3347. This relieves frictional contact from the levers 3350 and 3347 and permits the spring 3354 (FIG. 33) to return the two levers in this order to their initial zero positions.

As soon as the levers 3347 and 3350 of the highest multiplier order are returned to their initial zero positions, the next lower order levers 3347, 3350 assume the role of highest (remaining) multiplier digit for controlling the shift of the carriage. Assuming that the next ordinal multiplier is a value other than zero, then since the lever 3347 is locked by latch lever 3345 in its counterclockwise position, its associated lever 3350 is held in midposition. This condition of levers 3347 and 3350 is maintained throughout multiplying operations in the first multiplier order, and at the end of such multiplication, the setting clutch is engaged for its second 180° of operation during which it raises the register carriage and initiates a shift of the carriage to the next lower order.

During the shift of the register carriage, the sensing carrier 3363 is also shifted but in the opposite direction to the carriage, and since the register carriage is shifted to the left during all multiplying operations, the sensing carriage will be shifted toward the right. During such shift the cam surface 3375 (FIG. 36A) rides over the lever 3350 (FIG. 33) which stands in mid-position and is cammed upwardly. The sensing carrier 3363 (FIG. 36) and the lever 3371 are therefore rocked in a clockwise direction and terminate the shift operation in the usual manner. Meanwhile, the ear 3527 on member 3371 (FIG. 48) contacts the upper end of the previously mentioned restart lever 3458 which it will be recalled, is at this time, standing in a counterclockwise direction from the position shown, where it underlies the ear 3527. The restart lever 3458 is therefore depressed and acts through the pivotal connection 3459 with the bail 3461 to rock the bail in a counterclockwise direction and thus remove the latching ear 3468 from restraining engagement with the lever 3469. It will be recalled that the lever 3469 rocks counterclockwise in response to the spring 3470 and initiates another setting clutch operation. In the present case, the setting clutch operation is initiated with the carriage standing in its second highest multiplier digit position, at which position a multiplication by the next multiplier digit is carried out.

If the next ordinal multiplier digit is a zero, the lock lever 3345 (FIG. 28) is held above the ear 3346 on lever 3347 of this order, and upon return of the higher order lever 3347 to its initial clockwise position, as previously explained, the levers 3347 and 3350 of the second order are permitted to also return to their initial clockwise positions. This transfers the termination of shift to the third order where a lever 3350 stands in mid-position, and therefore the shift operation in this case would be two continuous shift cycles before the shift is terminated and the next multiplying operation is initiated.

The above-described sequence of operations is repeated from order to order until the multiplier value has been exhausted at which time an automatic terminating mechanism is enabled.

*Termination of multiplication operations*

During a multiplying operation in the last order, the setting clutch acts through mechanism previously described to rock the shaft 3498 (FIG. 33) counterclockwise and through ear 3521 on member 3520, fixed to the shaft, to rock the locking lever 3345 in a clockwise direction. This releases the last ordinal member 3347 for return clockwise movement to its initial position. The release of this last lever 3347, permits the shaft 3348 to return to its initial clockwise position and this movement of shaft 3348 conditions mechanisms whereby the subsequent operation of the setting clutch (during the restore cycle) will terminate the operation of the multiplying mechanisms.

Shaft 3348 (FIG. 27) carries an arm 3530 which is rocked clockwise with the shaft. It will be recalled that the lever 3322 previously was rocked clockwise upon depression of the X-key and then was returned to the position shown. During the clockwise movement, a formed surface 3531 rocked a lever 3532 counterclockwise about its pivot 3533 and lever 3532 then remained in this position due to a detent lever 3534 holding the stud 3535 in its lower-most position, the stud being carried by the lever 3532. Therefore, the clockwise movement of arm 3530 during the last restore cycle moves stud 3535 and lever 3532 towards the right. The lever 3532 is pivotally mounted to a latch 3536 and therefore moves the latch in a counterclockwise direction about its pivot 3537 which is fixed in the machine framework. At such time member 3538, which is pivotally mounted within the framework of the machine at 3539 and urged by spring 3540 in a clockwise direction, is released and moves in a clockwise direction to effect the following conditioning functions whereby the last restore cycle returns the machine to its normal position. Ear 3541 (FIG. 47), on member 3538 is moved upwardly thus moving a link 3542 counterclockwise into engagement with a stud 3543 on the end of link 3432. The latter link is reciprocated during the restore cycle as previously explained, and now acts through the stud 3543 and the link 3542 to rock a lever 3544 in a counterclockwise direction. A link 3545 is connected to the upper end of the lever 3544 and has a nose 3546 which rocks the bail 3051 (FIG. 54) in a clockwise direction, thus clearing the keyboard in the manner previously described.

Meanwhile, the clockwise movement of member 3538 (FIG. 47) causes similar movement of a live-tip 3548 pivoted thereon at 3549. This causes ear 3550 on the live-tip to rock clockwise thus permitting the link 3551 to drop into the path of hook 3552 on the link 3432. This conditions the machine, so that during the ensuing restore cycle and reciprocation of link 3432, the ear 3552 will pick up the ear 3553 and pull the link 3551 toward the right. The leftmost end of link 3551 (FIG. 55) is fixed to arm 3294 (FIGS. 55 and 28) on shaft 3291. Thus, during the restore cycle the shaft 3291 will be rocked in a clockwise direction, at which time all of the arms 3290 (FIG. 28) will also be rocked in a clockwise direction to pick-up and lock the levers 3345 in their original clockwise positions. At such time, the lever 3294, is returned and locked in its clockwise position by the latch lever 3295. The movement of arms 3290 to their original clockwise positions, releases the selection links 3208 for return movement to their initial positions during the last restore cycle in multiplication thus returning the multiplier storage dials to zero indication. Meanwhile, the cam surface 3555 (FIG. 55) on the lever 3544 moves stud 3535 and the link 3532 back to their initial clockwise positions shown in FIG. 27 where they are held by the detent lever 3534. Lever 3544 (FIG. 47) also acts through the previously mentioned link 3545 to release the X and = keys. A stud 3557 fixed to the rightmost end of link 3545, lies adjacent the lower end of latch 3558 (FIG. 23A). Clockwise movement of the latch releases bail 3224 (FIG. 23) and therefore releases the X-key 3006. An ear 3452a (FIG. 47) of the = key latch 3452 lies adjacent the lower depending arm of the X-key latch 3558 and therefore when the latter is rocked in a clockwise direction, the = key latch 3452 (FIG. 49) is also rocked in a counterclockwise direction to release bail 3447, 3444 (FIG. 46) and the = key. When the = key is released, it acts through the previously described articulated linkage from the = key to lever 3456 (FIG. 48) to permit spring 3801 to pull lever 3456 counterclockwise thus moving the restart lever 3458 to its initial clockwise position and disabling the same with respect to the shift lever 3371.

Meanwhile, the clockwise movement of member 3538 (FIG. 47) causes a pin 3560 thereon to rock the latch 3427 (FIG. 41) clockwise and release lever 3336. The latter then rocks counterclockwise and returns to its initial counterclockwise position shown in FIG. 10. This removes the stud 3337 from the upper holding surface 3340 of the lever 3130.

*Return shift to home position*

When the stud 3337 moves from restraining engagement with the upper end of lever 3130 the latter is released to the urgency of spring 3131 (FIG. 17) and rocks in a counterclockwise direction. It will be recalled that during multiplying operations, the carriage is shifted to a position which is either to the right or the left of the home position depending upon the location of the last significant multiplier digit. Referring to FIG. 15, it will be observed that if the member 3116 is shifted in either direction from its home position during a multiplication operation (during which the positions of the balls 3115 remain fixed) then either the camming surfaces 3562 or 3563 on member 3116 will cause the member to be rocked upwardly or downwardly. This results in moving the roller 3128 (FIG. 17) to either the position 3128b or 3128a respectively. If the last multiplier value is a fractional value, for example, then the carriage will stand shifted to the left of its home position and member 3116 will stand shifted to the right of its home position. Assuming that this is the case, then the roller 3128 will stand in its clockwise position 3128a and in which position, the roller will stand spaced apart one increment from the lower cam surface on the lever 3130. Therefore, when the lever 3130 is released to the urgency of spring 3131, lever 3130 will rock counterclockwise into contact with the roller 3128a. This action of the lever 3130 occurs shortly before the link 3149 is returned to its initial clockwise position where the stud 3148 engages the V camming slot of lever 3130. Thus, if lever 3130 stands in any position other than its non-shift position, the stud 3148, in moving into engagement with the V slot of the lever 3130, will be moved upwardly to the left or to the right shift position shown in dotted lines in FIG. 17, as the case may be, due to the camming action of the V slot upon the stud. At such time, link 3149 is moved upwardly by this camming action, and through the member 3150 adjusts the shift mechanism either for a right shift or for a left shift as previously explained. Link 3149 is rocked into the slot in the following manner.

Link 3149 (FIG. 58) has link connection 3565 with a lever 3566 which is urged by spring 3567 in a clockwise direction about a fixed pivot 3568. Thus, spring 3567 tends to rock the pin 3148 into the slot 3569; however, the engagement of the pin with the slot is further insured by a booster mechanism which is driven by the setting clutch during the restore cycle. The cam 3570 (FIG. 56), fixed to the setting clutch shaft 431, has a cam follower 3571 connected by link 3572 to an arm 3573 fixed on shaft 3574. A second arm 3575 (FIG. 58) is also fixed to shaft 3574 and carries a roller 3576 on the upper end thereof. A lever 3577 is pivotally mounted on shaft 3568 and lies in the plane of movement of roller 3576. During the restore cycle, the above described cam and linkage rocks roller 3576 clockwise into contact with lever 3577, thus rocking the latter clockwise and stressing a booster spring 3578 connected between levers 3577 and 3566. In this manner lever 3566 is under additional spring pressure to move clockwise and through link 3565 to force the pin 3148 on link 3149 into the camming slot 3569; therefore the link 3149 is positively moved to its appropriate right or left shift position, as the case may be. When the carriage is raised, during the latter part of the restore cycle, an automatic shift operation is initiated in the usual manner, and therefore a shift of the carriage is initiated. As the carriage approaches the selected tab position, the tab terminating mechanism, previously described, comes into play and stops the machine with the carriage standing in a position corresponding to the value of the depressed decimal key. At such time the decimal marker 4000 (FIG. 1) correctly points off the decimal in the middle dials, and the machine is at rest in a condition where another factor may be entered around the keyboard decimal indicator 3180 and another calculation may be initiated without further attention on the part of the operator as to the alignment of the decimals.

The foregoing descripion of machine operations initiated by depression of the = key 3200 applies equally well to the negative = key 3201 except that in the latter case the product is entered in a substractive manner. For this purpose a roller 3580 (FIG. 46) on the negative = keystem overlies a cam surface 3581 (FIG. 56) on a lever 3582. The latter is pivotally mounted at 3737 and the lower end of the lever is pivotally connected to a reversing link 547 which is identical in function to a link 547 disclosed in the previously mentioned Patent No. 2,271,240. The rightmost shoulder 549 of link 547 normally underlies an ear 555 of an actuator reverse unit and the shoulder 549 is moved upwardly during the setting cycle to adjust the actuators for positive actuation; however, when the negative = key is depressed roller 3580 (FIG. 46) contacts cam surface 3581 (FIG. 56) and rocks lever 3582 clockwise against the tension of spring 3584, thus moving link 547 to the left to the extent that shoulder 549 underlies the negative setting ear 554. Thus, since the negative = key is locked in depressed position throughout multiplication operations, the actuators will be maintained in a negative actuation condition.

From the foregoing description of the X and = keys, it is seen that a multiplying operation is carried out in the following manner. The multiplier value is entered into a keyboard around a selected decimal location, and upon depression of the X key, the multiplier value is transferred to the front dials and is cleared from the keyboard. Concurrent with such transferring operations the carriage is shifted an appropriate number of orders either to the right or to the left to a position corresponding to the highest significant multiplier digit. The multiplicand is then entered into the keyboard and upon depression of the = key, automatic multiplying operations are carried out. At the end of the multiplying operation the multiplier value is cleared out of the front dials and the carriage is returned to its initial decimal position in which it stood before the multiplying operation was commenced. If the multiplier value standing in the front dials is to be used as a constant factor, then clearance of the front dials is prevented by depressing the front dial lock key at any time up to the termination of the multiplying operations in the last order of multiplication, as is now described.

*Front dial lock key*

A front dial lock key 3202 (FIGS. 1 and 53) is effective upon depression thereof to prevent the automatic clearance of the front dials at the end of a multiplying operation so that the multiplier factor may be retained as a constant. Since automatic clearance of the front dials occurs at the end of the multiplying operation the front dial lock key may be depressed at any time prior to the time the automatic clearance would occur, i.e., either before the depression of the X-key, before the depression of the = key, or at any time after depression of the = key but prior to the automatic clearance operation.

The keystem 3553 is mounted for up and down sliding movement upon a pair of fixed studs 3589 and is spring urged to its normal upward position. An extension 3590 of the keystem carries a pin 3591 which is embraced by a slot 3592 in one arm 3593 of a bail 3594. Upon depression of the key, the arm 3593 is rocked clockwise and a lock lever 3595 snaps over ear 3596 and locks the arm and the key in depressed position. The key 3202 is released from the lock lever 3595 by subsequent depression of the Front Dial Clear key 3610 (FIG. 1), as described hereinafter. A second arm 3597 of the bail 3594 has an ear 3598 which overlies a lever 3599 and rocks the lever counterclockwise about a fixed pivot 3600. The right end of lever 3599 has an ear 3601 (FIG. 55) which underlies link 3551. The depression of the key 3202 raises the link 3551 so that ear 3553 is out of the path of movement of hook 3552 on the restore link 3432. Thus, during the last cycle of multiplication the restore mechanism link 3551, arm 3294, shaft 3291, and the multiplier cams 3204

(FIG. 2) are disabled. In this manner the setting of the cams 3204 and the front dials 3000 is undisturbed.

Meanwhile, the depression of the front dial lock key and the resultant clockwise movement of bail 3594 (FIG. 45) causes an extension 3602 to contact a pin 3603 on a lever 3604 and rock the lever counterclockwise about shaft 3225. This lifts the surface 3605 from contact with an ear 3606 of a live-tip 3607 which is urged clockwise by a torsion spring (not shown).

If the front dial lock key is depressed prior to the depression of the X-key then the live-tip 3607 merely rocks clockwise into contact with an ear 3608 of the previously described live-tip 3227 (FIG. 59). Thus, when the X-key is depressed and arm 3226 is rocked clockwise to the position shown in FIGS. 60 and 61, and is followed by counter-clockwise movement of lever 3271 (FIG. 61), the live-tip 3227 is rocked clockwise and off of ears 3246 and 3230 which return to their initial positions, as shown in FIG. 61. Meanwhile, the live-tip 3607 rocks clockwise under ear 3608 of the live-tip 3227, and upon return counterclockwise movement of the live-tip 3227 (FIG. 62), the ear 3607 holds the live-tip in such position that the extension 3229 overlies only the ear 3246 and is held clear of ear 3230. Ear 3246 (FIG. 23) forms a portion of the mechanism whereby the X-key initiates a master clutch cycle and the shifting of the carriage to the highest multiplier digit position, whereas ear 3230 (FIGS. 24 and 62) initiates the entry of the value standing in the keyboard into the front dials. Therefore, with the live-tip 3227 being held in the position shown in FIG. 62, the X-key is thereafter disabled with respect to entry of a new factor in the keyboard, but is enabled to shift the carriage as above mentioned.

The foregoing description has been concerned with a sequence of key depressions where the front dial lock key is depressed before the X-key is depressed. It will be apparent however that the sequence of key depression is immaterial since the live-tip 3607 (FIG. 60) may be released by depression of the front dial lock key to underlie the ear 3608 at any time prior to the termination of multiplication at which time the live tip 3227 is released to come into contact with the live tip 3607. Thus the front dial lock key may be depressed at any time before or during a multiplying operation to condition for storage of the multiplier factor which stands in the front dials.

It will therefore be clear that subsequent multiplication operations by a constant multiplier is made possible merely by depressing the X-key, then entering the multiplicand in the keyboard, and depressing the = key in sequence.

In performing multiplication operations by a stored constant multiplier, however some operators may find it more convenient to enter the multiplicand before depressing the X-key. It will be recalled that depression of the X-key serves, amongst other functions, to clear the keyboard after the value standing therein has been transferred to the front dials. The following mechanism is therefore provided which is automatically rendered operable, after a constant multiplier has been entered in the front dials by depression of the X-key and the Front Dial Lock Key, to disable the X-key with respect to the keyboard clearance mechanism to thereby permit the operator to depress the X-key and shift the carriage to the highest multiplier digit position without clearing the multiplicand out of the keyboard.

A lever 3615 (FIG. 59) is pivotally mounted upon a fixed stud 3616 and the leftmost end of the lever overlies the ear 3611 (FIGS. 30 and 59) of the previously described live-tip 3612 which forms a portion of the mechanism whereby the depression of the X-key causes clearance of the keyboard. Normally, lever 3615 (FIG. 59) idly rides on ear 3611 and does not affect the clearance function; however, after the depression of the X-key and the Front Dial Lock Key, the resultant movement of the live-tip 3607 to the position shown in FIG. 62 moves ear 3606 over the extension 3617 of lever 3615. Thus, on any subsequent depression of the X-key, the resultant clockwise movement of lever 3226 and the live-tip 3607 carried thereby, causes ear 3606 to rock lever 3615 counterclockwise. At such time lever 3615 rocks ear 3611 and live-tip 3612 (FIG. 30) clockwise to disable the automatic keyboard clearance operation, as previously described.

From the foregoing description it is seen that depression of the Front Dial Lock key conditions the machine to hold any multiplier factor in the front dials as a constant and also to disable the X-key with respect to the keyboard clearance mechanism so that subsequent multiplication operations are carried out merely by entering the multiplicand in the keyboard and depressing the X and equal (=) keys in succession.

*Front dial clear key*

If the front dial clear key 3610 (FIG. 1) is depressed while the machine is in the process of carrying out a multiplication operation, then such depression merely releases the lock key 3202 so that the automatic restore mechanism is re-enabled to clear the front dials at the termination of multiplication. On the other hand, if the front dial clear key 3610 is depressed while the machine is at rest in its "home" position, then such depression not only releases the front dial lock key but also initiates a blank setting and restore cycle which clears the front dials.

The key 3610 (FIG. 65) is pivoted at its lower end to one arm 3620 of a double armed bail 3621, and is guided for up and down movement on a fixed pin 3622 by a slot 3623 in the keystem. A spring 3624, connected to bail 3621, urges the key to its normally raised position.

Depression of key 3610 rocks bail 3621 clockwise about shaft 3625 at which time a second arm 3626 acts through link 3627 to rock a latch lever 3628 in a clockwise direction. This releases a three armed lever 3629 (FIG. 66) for clockwise movement about shaft 3630 in response to spring 3631. The upper arm 3632 of lever is pivotally connected to a link 3633, supported at its left end by an arm 3634 of a bail 3635. The rightmost end of link 3633 lies adjacent a pin 3636 carried by the latch lever 3595 (FIG. 53) for the front dial lock key 3202. Clockwise movement of lever 3629 (FIG. 66) therefore rocks latch lever 3595 counterclockwise and releases the front dial lock key which returns to its normally raised position. At such time arm 3597 (FIG. 53) is rocked counterclockwise and away from lever 3599 which then rocks clockwise, thus returning ear 3601 on lever 3599 to its initial position shown in FIG. 55 and permitting link 3551 to return to the position shown. This re-enables the previously-described connection between link 3432 and ear 3553 whereby the multiplication terminating mechanism clear the front dials.

Meanwhile, the rightward movement of link 3633 (FIG. 66) rocks arm 3634 and bail 3635 clockwise. A second arm 3637 (FIG. 67) on bail 3635 has pivotal connection with a link 3638 and moves the latter toward the right. An ear 3639 on link 3638 stands adjacent the terminating interponent 3532 (see also FIG. 27). The interponent stands in the position shown at all times except when the X-key is depressed, at which time the interponent is rocked counterclockwise out of the path of ear 3639. Thus, if ear 3639 is to be moved to the right during a multiplication operation, for example, the ear moves idly over the terminating interponent and does not affect the multiplication operation; however, at all other times when the X-key is in its raised position, the interponent 3532 is moved to the right by ear 3639 and rocks the latch lever 3536 counterclockwise. This releases lever 3538 (FIG. 27) for clockwise movement, as previously explained, at which time ear 3640 rocks the bail 3147 (FIG. 21) clockwise and initiates a "blank" setting clutch cycle. During the restore portion of the blank cycle, cam 3430 (FIG. 45) acts through linkages previously described to clear the front dials, and cam 3570 (FIG. 56) acts through follower 3571, link 3572, arm 3573, pin 3642 (FIG. 66) and link 3643 to return the three armed lever 3629 to its initial position shown in FIG. 65 where it is relocked by the latch lever 3628, thus restoring all of the mechanisms operated by the front dial clear key to initial position.

Stop key

A stop key 3985 (FIGS. 1 and 27) is provided to terminate either division or multiplication in the current order of operations when the key is depressed. The function of this key with respect to the division mechanism is the same as that disclosed in connection with the stop key 985 shown in the previously mentioned Patent No. 2,271,240, to which reference is made for such functions, but in the present disclosure this key bears the reference numeral 3985 since the same key is also used to terminate multiplication operations.

The stop key 3985 (FIG. 27) is mounted in the usual manner for up and down movement and has a formed shelf 3645 which overlies a lever 3646. The left end of the lever is forked and engages a pin 3647 carried by an arm 3648 of a bail including a depending arm 3649. The bail is pivoted at 3650 and is rocked counterclockwise by depression of key 3985 at which time a stud 3651 on arm 3649 rocks the arm 3652 clockwise. Arm 3652 is freely mounted on shaft 3348 and is integral with an arm 3653 which is similar to the previously described arm 3530. When arms 3652 and 3653 are rocked clockwise, the latter arm contacts stud 3535 which stands in counterclockwise position in the path of arm 3653 during multiplication, and thus moves the terminating lever 3532 toward the right. This moves latch 3536 toward the right and permits lever 3538 to rock clockwise, which conditions for a terminating operation. Then, during the restore cycle of the setting clutch the terminating mechanisms stop the operation of the multiplication mechanism in the manner previously described.

The depression of the stop key may occur while the main actuating clutch or the shift clutch is engaged, and since the clockwise movement of lever 3538 tends through ear 3640 and bail 3147 to initiate a setting clutch cycle, the following interlocking means are provided to prevent the operation of the setting clutch while either the main clutch or the shift clutch is engaged.

Referring to FIGS. 21 and 22 it will be recalled that counterclockwise movement of lever 1950 normally causes power engagement of the setting clutch 430. A lever 3655 (FIG. 3) is freely pivoted at 386 and has an extension which overlies the pin 3172 on lever 1950. Normally lever 3655 is free to rock clockwise when lever 1950 is rocked counterclockwise; however, during all operations of the main clutch, a link 1713, described in U.S. Patent No. 2,271,240 is moved in the direction of the arrow, at which time a stud 3656 contacts surface 3657 of lever 3655 and blocks movement of the same. Thus, the engagement of the setting clutch by lever 1950 for a restore cycle of operations is prevented. Engagement of the setting clutch for the restore cycle is subsequently effected in the usual manner by lever 3477 (FIG. 51) when the main clutch dog 395 rocks to clutch disengaging position, as previously described.

If the stop key is depressed while the shift clutch is engaged, lever 1950 (FIG. 3) is prevented from rocking counterclockwise to engage the setting clutch in the following manner. During all shifting operations the previously described interlock member 397 is rocked in a counterclockwise direction, as described in the Patent No. 2,271,240, at which time ear 3660 moves into engagement with the nose 3661 on lever 3665 and prevents clockwise movement of the same. The termination of the shift operation causes interlock 397 to return to the position shown at which time lever 1950 is free to rock counterclockwise and engage the setting clutch. In this case the setting clutch operates through a "blank" cycle since the terminating mechanism has been enabled by the stop key. At the end of the terminating operation the carriage is returned to its initial home position in the usual manner.

If a value has been entered in the front dials by depression of the X-key and the operator notes an error in the front dials before the = key is depressed, then the front dials may be cleared and the carriage returned to the home position by depressing the stop key. It will be recalled that depression of the X-key moves the terminating interponent 3532 (FIG. 27) to a counterclockwise position where it is out of the path of the front dial clear link 3649; however, when in the counterclockwise position, the interponent 3532 stands in the path of the lever 3653 which is rocked clockwise by the stop key. Therefore, when the stop key is depressed the terminating interponent 3532 is moved toward the right, as previously described to initiate the front dial clearance operation and to shift to home position in the same manner as previously described.

Dividend key

The depression of the dividend key 3740 (FIGS. 1 and 4) causes clearance of the upper and middle dials, followed by entry of the value standing in the keyboard into the middle dials and clearance of the keyboard.

If it is desired to eliminate the upper dial clearance by the dividend entry key then the operator may do so by depressing the upper dial lock key 3042 (FIG. 1) prior to depressing the dividend key; however, depression of the middle dial lock key 3025 does not prevent a middle dial clearance. The dividend key is used as a dividend entry key or as a "plus" key at the beginning of a series of additions and automatically clears the middle dials, regardless of whether or not the middle dial lock key is depressed thus eliminating the need for the operator to effect such clearance by an extra manual operation.

The dividend key 3740 (FIG. 4) is mounted for up and down movement in the usual manner and is spring urged to its raised position. A roller 3741 on the key-stem normally blocks movement of a lever 3742 which is urged clockwise about shaft 3743 as shown. Depression of the key permits lever 3742 to rock clockwise at which time a pin 3744 pulls a link 3745 toward the left. The rightmost end of the link is pivotally connected to the upper end of a bail 3746 which is pivotally mounted at 600 and has an ear 3748 which stands adjacent the clutch control dog 381 for the middle dial clear clutch 360. Thus, the leftward movement of link 3745 initiates a cycle of operation of the clutch and clears the middle dials.

Meanwhile, the depression of the dividend key also initiates the operation of the master clutch, which, in turn, initiates the operation of the upper dial clear clutch. The clockwise movement of stud 3744 (FIGS. 4 and 23) pulls the previously described link 3253 toward the left to cause engagement of the master clutch 3245, as previously described, which clutch invariably causes engagement of the upper dial clear clutch unless the upper dial lock key 3042 (FIG. 1) has been depressed.

A cam 3304 (FIG. 31) driven by the restore clutch, returns the lever 3742 to its initial counterclockwise position as follows. It will be recalled that cam 3304 moves link 3306 toward the right and back, at which time ear 3749 rocks lever 3742 in a counterclockwise direction where it is blocked by roller 3741 (FIG. 4) on the dividend key stem.

The return counterclockwise movement of lever 3742 is used to release the add hatchet 3750 (FIG. 56) from the restraint of an ear 3751 and initiate a single cycle of numeral wheel actuation, as follows.

A link 3752 (FIG. 39) is connected at 3753 to lever 3742, and when the lever is in its initial counterclockwise position, the leftmost end of link 3752 is located above an ear 3754 as shown by the dotted line position 3752a.

When lever 3742 is rocked clockwise by depression of the dividend key, as previously explained, to the position shown in FIG. 39, the leftmost end of link 3752, is moved to the full line position shown, through the guidance of a fixed pin 3755 which resides within a slot in link 3752. In this position of the link the leftmost end stands adjacent the ear 3754, and upon the first portion of return counterclockwise movement of lever 3742, the link rocks ear 3754 and the lever 3756 clockwise about pivot 3757. This removes ear 3751 from restraining engagement with the add hatchet 3750 which then rocks counterclockwise under the urgency of spring 3758. During the latter portion of leftward movement of link 3752, the pin 3755 acts through a camming surface 3759 on the link to lift the left end of link 3752 over ear 3754.

The counterclockwise movement of the add hatchet 3750 (FIG. 56) initiates a single cycle of operation of the numeral wheel actuators as follows. The lower end of lever 3750 contacts an ear 3761 of lever 3762 and rocks the lever clockwise about pivot 3763. The lower end of lever 3762 has link connection 3764 with a lever 3765 pivoted at 3766. The rightmost depending arm 3776 of lever 3765 stands adjacent the bail 3146 and upon clockwise movement of lever 3762, lever 3765 is rocked clockwise, thus rocking the bail clockwise. Such movement of bail 3146 (FIG. 21) results in engagement of the setting clutch and the main clutch, in sequence, as previously described to cause a single cycle of actuation.

During the restore cycle, which follows the operation of the main clutch, the cam 3570 (FIG. 56) rocks follower 3571 counterclockwise and pulls link 3572 toward the right. At such time a hook 3768 on link 3572 contacts the large adjustment stud 3769 on lever 3762 and rocks the lever in a counterclockwise direction. This causes ear 3761 on lever 3762 to rock the add hatchet 3750 in a clockwise direction back to its initial position where it is locked by the ear 3751 on lever 3756.

The release and return of the add hatchet 3750 causes clearance of the keyboard by means of the following mechanism. The right end of a link 3771 is pivotally connected to the bottom end of the add hatchet and the leftmost end of the link overlies an ear 3772 of an arm 3773 which is integral with the previously described keyboard clear lever 3051 (FIG. 54). When the dividend key is depressed and lever 3750 (FIG. 56) is rocked counterclockwise, link 3771 is pulled to the left, guided by a stud 3775 on link 3572, which stud cooperates with an aperture in link 3771, and the leftmost end of link 3771 moves to the dotted line position shown. In this position the nose 3776 stands adjacent the ear 3772; therefore, when the add hatchet 3750 is returned to the initial position shown, link 3771 moves to the left and the nose 3776 rocks the integral levers 3773 and 3051 (FIG. 54) clockwise. Such movement of lever 3051 causes clearance of the keyboard in the manner previously described. Shortly thereafter, a cam surface 3777 (FIG. 56) in the aperture of link 3771 contacts stud 3775 and lifts 3771 link above ear 3772 to permit the clear lever to return to its initial position. Link 3771 then stands above ear 3772 as shown, and the dividend entry operation is completed.

Plus key

The plus key 3780 (FIGS. 1 and 56) initiates a single cycle of operation of the main clutch to enter the value standing in the keyboard into the middle dials and then clears the keyboard.

The key is mounted for up and down sliding movement in the usual manner and is urged to its raised position by a spring not shown. An extension 3781 of the keystem overlies a stud 3782 carried by the previously described lever 3756. Depression of the plus key therefore rocks lever 3756 in a clockwise direction to remove ear 3751 from restraining engagement with the add hatchet 3750 which then rocks counterclockwise and initiates a single cycle of actuation followed by keyboard clearance in exactly the same manner as described in connection with the dividend entry key.

Minus key

The minus key 3783 (FIG. 56) is mounted for up and down sliding movement as shown, and the keystem has an extension 3784 which overlies the previously mentioned stud 3782. Thus, depression of the minus key initiates a single cycle of actuation and clearance of the keyboard in the same manner as described for the plus key, however, actuation is in a negative direction. A roller 3785 on the minus keystem contacts a camming surface 3586 on the previously described bail 3582 and rocks the latter in a clockwise direction about its pivot 3787 to condition the machine for an actuation in a minus direction.

Division line-up control knob

The Patent No. 2,710,141, issued on June 7, 1955, to Harold T. Avery discloses a division line-up mechanism whereby the carriage is shifted a predetermined number of orders toward the right to align the highest order of the dividend with the highest order of the divisor, before initiating a division operation. In that patent, the number of orders of shift was determined by the "spread" in the number of orders between any two of a plurality of ordinally arranged tabulator buttons. According to that patent, two tabulator buttons had to be depressed for each new setting, care being taken to insure that the same desired spread was provided in depressing the two buttons. According to the present invention, the machine can be selectively adjusted for any predetermined spread regardless of which decimal key 3070 is depressed for determining the home position of the register. This is made possible by improved mechanisms including a line-up knob 3670 (FIGS. 1 and 63) which may be rotated to any one of six positions to indicate the digits zero, and one to five inclusive. With the knob set in a selected position, the simultaneous depression of the line-up key 2000 (FIG. 1) and the divide key 970 will automatically initiate a rightward shift of the carriage, a number of orders selected by the knob before initiating the division operation.

Before describing the operation of the line-up knob, a brief review will first be made of the division and line-up keys. Depression of the divide key 970 (FIG. 57) is effective through an ear 3672 thereon overlying a bail 3673 to depress the bail and through a link 3674 to rock a lever 973 clockwise. The later has link connection 965 with a lever 1026 fixed to the shaft 976, the clockwise movement of which upon depression of the divide key initiates the division operation as mentioned in the above-mentioned patent.

The line-up key 2000 is mounted for up and down sliding movement by means of pin and slot connections in the usual manner and is spring urged upwardly to the position shown by the means not shown. The extreme lower-most end of the line-up key carries a pin 2005 which resides within a slot 2006 in a lever 2007, pivotally mounted at 2008 upon the previously mentioned lever 1026. The rightmost end of lever 2007 is formed with a hook 2009 which overlies a shelf 2010 formed in an interponent 2011. The arrangement is such that the depression of the line-up key acts through the pin 2005 in the lower-most end thereof to rock the lever 2007 counterclockwise and thus remove the hook 2009 from the shelf 2010 of interponent 2011. The latter therefore remains in the position shown and since the depression of the divide key causes lever 1026 to rock clockwise, ear 2015 on lever 1026 almost immediately contacts the upper end of interponent 2011. The latter is pivotally mounted at 2012 upon a shift initiating lever 3674 which is pivotally mounted at 2017 within the framework of the machine. The lever carries a pin 3675 to which a spring 3676 is fixed. The opposite end of the spring is connected to the previously mentioned "blank" cycle bail 3147 and within the spring resides a rigid pin 3677. This forms a one-way solid connection between the arm 3674 and the bail 3147 and upon clockwise movement of the arm 3674 to initiate a blank setting cycle followed by a shifting operation; meanwhile, the contact of ear 2015 on lever 1026 with the interponent 2011 delays the initiation of the division operation until the shifting operation is complete as is described in said patent. Also, a link 4001 pivotally mounted at 4002 to lever 3674 has pin and slot connection 4003 with the shift direction interponent 1383 and pulls the latter downward into engagement with ear 1217 to condition for a right shift during line-up operations. A right shift is therefore initiated by the clockwise movement of bail 3147 which shift is continuous until the carriage is shifted a predetermined number of orders indicated upon the line-up knob 3670 (FIG. 63). The knob is mounted for rotation upon a fixed stud 3679 within the framework of the machine, and integral therewith is a cam 3680 having two sets of stepped cam surfaces 3681, 3682 for cooperation with a corresponding pair of followers 3683, 3684. The line-up knob is shown in its No. 5 position in which the rollers on the two cam followers lie on respective cam surfaces which are progressively spaced for moving the two levers away from the pivot point of the cam as the knob is rotated from its No. 5 to 0 position. Lever 3684 is pivotally mounted at 3685 and the lower end thereof has a slot 3686 which embraces a stud 3687 carried by a segment 3688 freely mounted upon the frame of the machine at 3689. Cooperating with the segment is a feed-back pawl 3690, freely mounted at 3691 upon a lever 3692. Lever 3692 is freely mounted at 3693 with the framework of the machine and has link connection 3694 with a cam follower 3695. The follower is pivoted at 3696 and a spring 3697 holds the follower in the clockwise position shown with the roller 3698 on the follower in contact with a cam 3699. The latter is keyed to shaft 1331 which is rotated 360° for each cycle of operation of the shift clutch. Normally the feed-back pawl 3690 is held in a clockwise position above the segment 3688, but upon depression of the divide and line-up keys, and consequent clockwise movement of lever 1026, FIG. 57, a ear 3700 (FIGS. 57 and 63) on the lower depending arm of the lever moves downwardly away from a pin 3701 carried by a hold lever 3702. The upper surface of the lever underlies the upper terminating ear on the feed-pawl 3690 and normally holds the pawl in the position shown. Upon clockwise movement of the lever 1026 (FIG. 57) the ear 3700 (FIG. 63) is moved away from the hold lever, and therefore the feed-pawl is permitted to rock counterclockwise in response to spring 3703 until it engages notches 3704 of the segment 3688.

This is the condition of the parts at the beginning of a shift operation, and as the shift clutch cam 3699 rotates, the follower 3695 acts through link 3694 to rock the lever 3692 in a counterclockwise direction thus pulling the feed-pawl 3690 toward the right, one increment for each cycle of operation of the shift clutch. This moves segment 3688 one notch in a clockwise direction whereupon the ear 3705 of hold-pawl 3702 engages successive teeth of the segment and holds it in successive positions. The shifting operation continues until the segment 3688 reaches its extreme clockwise or zero position, shown in FIG. 64, at which time an ear 3707 formed on the segment, contacts a shoulder 3708 of lever 3709 and rocks the lever clockwise about pivot 3689. The lever 3707 overlies the stud on the rightmost end of the previously described shift latch 3160. It will be recalled that the clockwise movement of the latch is effective to terminate the shift operations, and therefore such shift termination occurs in a prescribed manner during line-up operations.

As disclosed in the above-mentioned Patent No. 2,710,141, the interponent 2011 (FIG. 57) is rocked counterclockwise out from under the lever 1026 during the first shift cycle, thus tending to permit the lever 1026 to rock to a full clockwise position and initiate a division operation. However, other interlocks are provided as described in said patent, which are rendered effective immediately upon the operation of the shift clutch to delay the initiation of the division operations until the shift operation is terminated. The same interlocks are provided in the present machine, and therefore division operations are delayed until the shift operation is terminated as described above. At such time, the division operation is initiated and is carried to completion in the usual manner.

The previously mentioned follower 3683 (FIG. 63) is constantly urged in a counterclockwise direction about its pivot 3712 against the cam 3681 thus tending to centralize the line-up cam in any selected position thereof. When the knob stands in its zero position however, a high point 3713 on the cam rocks the follower 3683 in a clockwise direction at which time the lowermost end of the follower contacts a stud on a lever 3714 and rocks the latter in a counterclockwise direction about its pivot 3715. The lower depending arm 3716 of lever 3714 lies adjacent a stud 3717 (FIGS. 57 and 63) on the interponent 2011, and therefore rocks the interponent counterclockwise out from under the ear 2015 on the lever 1026. Thus, when the line-up knob stands at "0," the line-up operation is disabled even though the line-up key should be depressed simultaneously with the divide key; therefore division operations will be initiated directly by the clockwise movement of the lever 1026.

It will also be observed that if carriage is standing in its rightmost position, and therefore incapable of partaking of a further rightward shift, means are provided for disabling the line-up mechanism even though the line-up key should be depressed. For this purpose, a lug 3718 (FIG. 63) depends from the carriage and cooperates with a camming surface 3719 on a lever 3720. An ear 3721 on the lower end of the lever contacts an upstanding arm 3722 of the previously described bellcrank 3714, the lower end 3716 of the bellcrank contacts stud 3717 and moves the interponent 2011 to disabled position.

The mechanism controlled by the setting of knob 3670 for determining the number of ordinal shifting operations of carriage 250 during a line-up operation forms the subject matter of a divisional patent application Serial No. 714,193, filed February 10, 1958 in the name of Harold T. Avery as sole inventor.

The invention claimed is:

1. A calculating machine having a register comprising a plurality of ordinally arranged numeral wheels; a plural order keyboard; actuators for the numeral wheels controlled by the keyboard; means for shifting the register relative to the actuators; respective decimal indicators for each order of the keyboard and a plurality of decimal indicators for the register, said decimal indicators each being mounted for movement from a normally hidden position to a position of display; a plurality of ordinally arranged control keys; means responsive to depression of a control key to move a respective keyboard decimal indicator and a respective register decimal indicator to positions of display; and mechanism responsive to depression of said key to shift the register to a position determined by the order of the depressed control key.

2. A calculating machine having a register comprising a plurality of ordinally arranged numeral wheels, cyclically operable actuators for the numeral wheels, a plural order selectively settable value entry mechanism for adjusting the actuators in accordance with a selected value, a factor indicator comprising a plurality of ordinally arranged dials, means for entering a value into the factor indicator, mechanism operable under the control of the factor indicator for determining the number of cyclic operations of the actuators, means for shifting the numeral wheels relative to the actuator control mechanism, a plurality of decimal indicators for the register and for the factor dials, said decimal indicators each being mounted for movement from a normally hidden position to a position of display, a plurality of ordinally arranged control keys, means responsive to depression of a control key for moving a respective register decimal indicator and a respective factor decimal indicator to positions of display, and mechanism operable by said depressed control key for causing the shifting means to shift the register to a position determined by the order of the depressed control key.

3. A calculating machine having a register comprising a plurality of ordinally arranged numeral wheels; actuating means for the numeral wheels, a plural order keyboard; a plural order factor receiving device; mechanism for transferring a value from the keyboard into the factor receiving device; mechanism operable under the control of the factor receiving device for determining the number of cyclic operations of the actuators; means for shifting the numeral wheels relative to the actuators; respective plural order decimal indicators for the keyboard, the factor receiving device, and the register, each of said decimal indicators being mounted for movement from a normally hidden position to a position of display; a plurality of ordinally arranged control keys; means responsive to depression of a control key for moving a respective keyboard decimal indicator, a respective register decimal indicator, and a respective factor decimal indicator to positions of display; and mechanism operable by said depressed control key for causing the shifting means to shift the register to a position determined by the order of the depressed control key.

4. A calculating machine having a product register comprising a plurality of ordinally arranged numeral wheels, cyclically operable actuators for the numeral wheels, and mechanism for shifting the numeral wheels relative to the actuators, a selectively settable value entry mechanism for adjusting the actuators in accordance with a selected value, a plural order factor storing mechanism, means for entering a value in the factor storing mechanism, means operable under control of the factor storing mechanism for determining the number of cycles of operation of the actuators, a plurality of ordinally arranged decimal indicators for the register, the value entry mechanism, and the factor storing mechanism, each of which indicators is mounted for movement from a normally hidden position to a position of display, a plurality of decimal keys, mechanism responsive to depression of each key to move a respective decimal indicator for the register, the value entry mechanism and the factor storing mechanism to positions of display, a multiplication mechanism including a multiplication key for initiating cyclic operation of the actuators, the number of cycles of operation in the respective orders being under the control of the values standing in the factor storing mechanism, a terminating mechanism operable by the multiplication mechanism, means initiated by the terminating mechanism and operable under the control of a depressed decimal key to shift the register to a position in which the product in the register is aligned in correct decimal relationship with the register decimal indicator.

5. A calculating machine having a first factor receiving device, a second factor receiving device, a register comprising a plurality of ordinally arranged numeral wheels, means for shifting the register relative to the first factor receiving device, a plurality of decimal indicators for the first and second factor receiving devices and the register, said indicators each being mounted for movement from a normally hidden position to a position of display, a plurality of ordinally arranged decimal keys, mechanism responsive to depression of a decimal key to move a respective decimal indicator for each of the two factor indicators and the register to positions of display and to shift the register to a pre-determined ordinal position relative to said register decimal indicator, a first control key for entering a value from the first factor receiving device to the second factor receiving device and for shifting the register under the control of the location of the highest significant digit entered in the second factor receiving device, a second control key for initiating a multiplication of the factor standing in one of the factor receiving devices by the factor standing in the other of the factor receiving devices, a mechanism operable to terminate multiplication operations, and means responsive to the terminating mechanism for shifting the register to said pre-determined position.

6. A calculating machine having a register comprising a plurality of ordinally arranged numeral wheels, ordinally arranged actuators therefor, a plural order keyboard for adjusting the ordinal actuators in accordance with a selected value, means for ordinally shifting the register relative to the actuators, a value factor receiving device, a plurality of radical point indicators for the keyboard, the factor receiving device and the register, said indicators being mounted for movement from a normally hidden position to a position of display, a plurality of radical point keys, mechanism responsive to depression of each key to move a respective radical point for the keyboard, the factor receiving device and the register to positions of display, means responsive to depression of each radical point key to shift the register to a predetermined position of alignment with the register radical point indicator, mechanism for entering the value in the factor receiving device in correct relation to the radical point indicator thereof, a control key, and means responsive to depression of the control key to shift the register from its pre-determined radical point position by a number of orders pre-determined by the value of the factor entered in the factor indicator.

7. A calculating machine according to claim 6 in which the control key enters the value into the factor receiving device prior to initiating the shifting operation.

8. A calculating machine according to claim 6 in which the control key enters a value from the keyboard into the factor receiving device prior to initiating the shifting operation, and mechanism operable by the control key for clearing the keyboard.

9. A calculating machine comprising a numeral wheel register and actuators therefor, means for shifting the register in either one of two directions relative to the actuators, a factor receiving device comprising a plurality of ordinally arranged dials, a plurality of ordinally arranged decimal indicators for the dials, which decimal indicators are mounted for movement from a normally hidden position to a position of display, a respective decimal key for each decimal indicator, mechanism responsive to depression of each key to move a respective decimal indicator to a position of display and to initiate the operation of and control the extent of operation of the shift means to shift the register to a pre-determined ordinal position, a control key, and mechanism responsive to depression of the control key to initiate the operation of the shift mechanism in one of said two directions away from said pre-determined position under the control of the location of an endmost ordinal digit entered in said dials.

10. A calculating machine having a register comprising a plurality of ordinally arranged numeral wheels; numeral wheel actuators; a plural order keyboard; a factor storing mechanism; means for shifting the register to the right or left relative to the actuators; a selectively adjustable shift control mechanism for causing the shift means to shift the register in either direction to a pre-determined position relative to the actuators; mechanism responsive to depression of the control key to enter a keyboard value into the factor storing mechanism, to adjust the shift control mechanism in accordance with the location of an endmost digit of a value entered in the factor storing mechanism, and to initiate the operation of the shift mechanism.

11. A calculating machine including a numeral wheel register; numeral wheel actuators, means for shifting the numeral wheel register from an initial position to another position relative to the actuators; a mechanism for initiating the operation of the shifting means; a mechanism for controlling the direction of operation of the shifting means; a plural order keyboard; a factor receiving device for receiving digital values; a normally disabled means for entering a value previously entered in the keyboard into the factor receiving device; a normally disabled mechanism for establishing a representation of the highest significant digit in said factor receiving device; a control key; mechanism operable in sequence upon depression of the control key to enable the factor entering means, the significant digit representing mechanism, and the shifting initiating mechanism; and means operated by the significant digit representing mechanism to control the shift direction control mechanism.

12. A calculating machine according to claim 11 including a key for initiating the operation of a mechanism to multiply a value standing in the keyboard by a value standing in the factor receiving device; a stop key; and mechanism responsive to the stop key to terminate the operation of the multiplication mechanism, and to shift the register back to its initial position.

13. A calculating machine having a register comprising a plurality of ordinally arranged numeral wheels, actuators therefor, means for shifting the numeral wheels to a pre-determined position relative to the actuators, a keyboard for controlling the adjustment of the actuators in accordance with a selected value, a receiving device for storing the ordinal digits of a factor, a first control key, mechanism responsive to depression of the first control key to enter a value into the factor receiving device and to shift the register to a second position determined by the location of a predetermined significant ordinal digit entered in the factor receiving device, a second control key, mechanism responsive to depression of the second control key to initiate a multiplication of a value standing in the keyboard by ordinal values entered in the factor receiving device, a mechanism for terminating multiplying operations upon completion of the last ordinal multiplication, and means responsive to the operation of the terminating mechanism for shifting the register to said pre-determined position.

14. A calculating machine having a register comprising a plurality of ordinally arranged numeral wheels, a plural order keyboard, a plural order factor receiving device, means for shifting the register to a pre-determined position relative to the keyboard, a control key, means responsive to depression of the control key to enter a value previously entered in the keyboard into the factor receiving device and then to initiate the operation of the shift means, a shift terminating mechanism operable under the control of the location of a predetermined significant digit entered in the factor receiving device, a correction key, means responsive to the depression of the correction key for clearing the value out of the factor receiving device and for initiating the operation of the shift means to shift the register to said pre-determined position.

15. A calculating machine having a register comprising a plurality of ordinally arranged numeral wheels and actuators therefor, means for shifting the register relative to the actuators, a factor receiving device, a plurality of ordinally arranged decimal indicators for the numeral wheels, said decimal indicators being mounted for movement from a normally hidden position to a position of display, a plurality of ordinally arranged decimal keys, mechanism responsive to depression of a decimal key to move a respective numeral wheel decimal indicator to a position of display and to initiate the operation of the shift means to shift the register to a pre-determined ordinal position, a control key, means responsive to depression of the control key to enter a value in the factor receiving device and to initiate the operation of the shift means to shift the register to a second position under the control of an extreme endmost significant digit of the value entered in the factor receiving device, a zero resetting mechanism for the factor receiving device, a correction key, means responsive to the correction key to initiate the operation of the resetting mechanism and to initiate the operation of the shift means to shift the register to said pre-determined position.

16. A calculating machine having a register comprising a plurality of numeral wheels, actuators for the numeral wheels, a value entry mechanism adapted to be set in accordance with a selected value, a multiplier factor storing mechanism comprising a plurality of ordinally arranged and differentially settable multiplier digit representing devices, means for setting the ordinal devices each to a selected digital value, a multiplication mechanism, a key for initiating multiplication of a value entered in the value entry mechanism by the digital values in the storing mechanism, means for sequentially sensing the differentially set devices during the multiplication operation to control the multiplication operation in accordance with the sensed differentially set devices, a normally enabled means operable in response to completion of the multiplication operation to reset the differentially settable devices to zero, and means manually settable from a first position to a second position to disable the resetting means.

17. A calculating machine having a numeral wheel register, actuators therefor, a keyboard for adjusting the actuators in accordance with a selected value, means for clearing a value from the keyboard, a plural order factor storing mechanism, mechanism for clearing a value from the factor storing mechanism, an operation key, means responsive to depression of the key for transferring a value from the keyboard into the factor storing mechanism, a normally enabled means operable in response to said operating key for causing the operation of the keyboard clearing means, a calculation initiating key, mechanism responsive to depression of the initiating key for causing a plural order operation of the actuators under the control of the values standing in the factor storing mechanism, a normally enabled mechanism operable in response to depression of said initiating key for causing the operation of the factor clearing mechanism, a locking key, and means responsive to said locking key for disabling the normally enabled means and the normally enabled mechanism.

18. A calculating machine including a register, cyclically operable actuators therefor, and a factor storing mechanism comprising a plurality of ordinally arranged value receiving devices, means for entering a value in the receiving devices, mechanism for representing the ordinal location of the highest significant digit of said value comprising a respective first and second member in each order, a lost motion connection between each ordinal pair of first and second members, a normally disabled latch lever for each first member, means for moving all first and second members from an initial position to a second position, mechanism controlled by the receiving devices for enabling the latch levers in all orders where a digital value other than zero has been entered to thereby lock in their second position all first members which have been moved to said second position, means responsive to the locking of each first member in its second position for holding all first and second members of lower orders than said highest significant digit in their respective second positions, mechanism for returning all first and second members of higher orders than the highest significant digit to their initial positions, and means for moving the second member in said significant highest order toward its initial position to a discrete position as permitted by the lost moton connection with its locked first member.

19. A calculating machine according to claim 18 including means for shifting the register relative to the actuators, a sensing mechanism shiftable relative to the first and second members in timed relationship with the shifting of the register, a control key for initiating operation of the shifting means, and means responsive to shifting of the sensing mechanism into contact with said second member standing in a discrete position for terminating the operation of the shifting means.

20. A calculating machine according to claim 18 including means for shifting the register relative to the actuators, a sensing mechanism shiftable relative to the first and second members in timed relationship with the shifting of the register, said sensing mechanism being mounted for movement for release from an initial position to a sensing position where it contacts a first member, a second member, or neither of said members depending on the ordinal location of the highest significant digit and the shifted position of the sensing mechanism, a three position control device movable under control of the sensing mechanism to determine a right, a left, or a non-shift operation of the shifting means, an operation initiating key, and means responsive to depression of said key to release said sensing mechanism and concurrently to enable the sensing mechanism to move said control device in accordance with the condition sensed.

21. A calculating machine according to claim 18 including normally disabled means controlled by the respective value receiving devices for operating the actuators a number of cycles corresponding to the value of the highest significant digit, a control key for initiating the operation of the normally disabled means, and mechanism responsive to the termination of the actuating operation for releasing the first member associated with the highest significant digit from said latch lever to thereby permit the returning mechanism to move the first and second members of said significant order to their initial positions, and means including the lost motion connection for permitting the movement of the next lower order second member to said discrete position.

22. A calculating machine including a numeral wheel register; numeral wheel actuators; a keyboard for adjusting the actuators in accordance with a selected value entered in the keyboard; means for shifting the register relative to the numeral wheel actuators comprising a shift initiating mechanism and a direction control means; a plurality of ordinally arranged keys; a normally enabled connection between each of said keys, the shift initiating mechanism, and the direction control means; a plural order factor value storing mechanism; means for entering a value in the factor storing mechanism; a control key; and means responsive to depression of the control key to disable said normally enabled connection, initiate the operation of the factor entry means, and shift the carriage from an initial position to a pre-determined position under the control of a predetermined significant digit of the value entered in the factor storage mechanism.

23. A calculating machine according to claim 22 including a multiplication initiating key for initiating multiplication of a value in the keyboard by ordinal values in the factor storage mechanism, and means responsive to termination of the multiplication operation for re-enabling the connecton between the ordinally arranged keys and the shift and direction control means.

24. A calculating machine according to claim 23 including mechanism responsive to said re-enabling means for shifting the register to said initial position.

25. A calculating machine having a register comprising a plurality of ordinally arranged numeral wheels; actuators for the numeral wheels; means for shifting the numeral wheels relative to the actuators; a keyboard for adjusting the actuators in accordance with a selected multiplicand value; a multiplier factor storing mechanism; means for entering a value in the multiplier factor storing mechanism; a plurality of ordinally arranged decimal keys; means responsive to the depression of a respective decimal key to move respective ones of each of a plurality of decimal indicators for the keyboard, the register, and the factor storing mechanism from normally hidden positions to positions of display, and also to shift the register to a respective decimal position; an operation key; means responsive to depression of the operation key to shift the register a number of orders under the control of a predetermined significant digit of the value entered in said factor storing mechanism; a key for initiating multiplication of a value standing in the keyboard by the value standing in the factor storing mechanism; and means responsive to the termination of multiplication operations for shifting the register under the control of said decimal key to said respective decimal position.

26. A calculating machine including a numeral wheel register, numeral wheel actuators, means for shifting the register relative to the actuators, a plural order keyboard for adjusting the actuators in accordance with a selected value, a plurality of ordinally arranged decimal indicators for the keyboard which indicators are each mounted for movement from a normally hidden position to a position of display, a plurality of ordinally arranged decimal keys, means responsive to depression of each key to move a respective decimal indicator to a position of display and to initiate the operation of the shift means, and mechanism operable by said depressed key for terminating the operation of the shift means when the register is shifted to a position determined by the order of the depressed decimal key.

27. A calculating machine including a numeral wheel register, numeral wheel actuators, means for shifting the register relative to the actuators, a plural order keyboard for adjusting the actuators in accordance with a selected value, a plurality of ordinally arranged decimal indicators for the numeral wheels which indicators are each mounted for movement from a normally hidden position to a position of display, a plurality of ordinally arranged decimal keys, means responsive to depression of each key to move a respective decimal indicator to a position of display and to initiate the operation of the shift means, and mechanism operable by said depressed key for terminating the operation of the shift means the register is shifted to a position determined by the order of the depressed decimal key.

28. A calculating machine including a numeral wheel register, numeral wheel actuators, means for shifting the register relative to the actuators, a plural order keyboard for adjusting the actuators in accordance with a selected value, a plural order factor indicator, means for entering a value in the factor indicator, mechanism controlled by said factor indicator for determining the number of cycles of operation of the actuators, a plurality of ordinally arranged decimal indicators for the factor indicator which indicators are each mounted for movement for a normally hidden position to a position of display, a plurality of ordinally arranged decimal keys, means responsive to depression of each key to move a respective decimal indicator to a position of display and to initiate the operation of the shift means, and mechanism operable by said depressed key for terminating the operation of the shift means when the register is shifted to a position determined by the order of the depressed decimal key.

29. A calculating machine including a frame, a plurality of ordinally grouped numeral entry keys arranged on said frame, a number of actuators arranged in said frame, one actuator for each order of said keys and controlled thereby, a register comprising a plurality of ordinally arranged numeral wheels mounted for translatable relationship to said frame, a multiplier factor mechanism, a number of radical point indicators arranged on said frame between adjacent orders of said keys and of said numeral wheels and normally hidden from view, a number of radical pointing keys coupled to said indicators, said indicators and said pointing keys being arranged to move a respective indicator to a condition of display upon actuation of an associated radical pointing key, register shifting means coupled to said register and said radical pointing keys for positioning said register in a predetermined position with respect to said actuators upon depression of said respective radical pointing key, a control key coupled to said shifting means for shifting said register a number of orders from the position determined by said one radical pointing key in accordance with the location of a predetermined significant digit of a multiplier value standing in said multiplier factor mechanism, and a controlling key coupled to said shifting means, said respective radical pointing key and said actuators for initiating cyclic operation of said actuators in accordance with the value of the multiplier to register a product in said numerals and for shifting said register back to said position determined by said one radical pointing key.

30. A calculating machine including a frame, a plurality of ordinally grouped numeral entry keys arranged on said frame, a number of actuators arranged in said frame, one actuator for each order of said keys and controlled thereby, a register comprising a plurality of ordinally arranged numeral wheels mounted for translatable relationship to said frame, a multiplier factor mechanism, a number of decimal point indicators arranged on said frame between adjacent orders of said keys and of said numeral wheels and normally hidden from view, a number of decimal keys coupled to said indicators, said decimal indicators and said decimal keys being arranged to move a respective indicator to a condition of display upon actuation of an associated decimal key, and register shifting means coupled to said register and said decimal keys for positioning said register with respect to said actuators, a multiplication control key coupled to said shifting means for shifting said register a number of orders from the position determined by said one decimal key in accordance with the location of a predetermined significant digit of a multiplier value standing in said multiplier factor mechanism, a product controlling key coupled to said shifting means, said decimal key and said actuators for initiating cyclic operation of said actuators in accordance with the value of the multiplier to register a product in said numerals and for shifting said register back to said position determined by said one decimal key.

31. A calculating machine including a register comprising a plurality of ordinally arranged numeral wheels, numeral wheel actuators, means for shifting the numeral wheels in either one of two directions relative to the actuators, an ordinally arranged factor value receiving device, a control key, mechanism responsive to depression of the key to adjust and initiate the operation of the shifting means for a shift in one or the other of two directions under the control of a location of an extreme endmost digit of a value entered in the factor receiving device, a shift terminating mechanism, and means operable under the control of the value entered in the factor receiving device for causing the operation of the shift terminating mechanism.

References Cited in the file of this patent

UNITED STATES PATENTS

| | | |
|---|---|---|
| 1,292,513 | Rechnitzer | Jan. 28, 1919 |
| 1,432,616 | Phinney | Oct. 17, 1922 |
| 1,750,565 | Britten | Mar. 11, 1930 |
| 1,974,494 | Kottmann | Sept. 25, 1934 |
| 2,039,795 | Henzelmann | May 5, 1936 |
| 2,201,713 | Britten | May 21, 1940 |
| 2,365,324 | Avery | Dec. 19, 1944 |
| 2,365,507 | Allen | Dec. 19, 1944 |
| 2,615,632 | Machado | Oct. 28, 1952 |
| 2,617,594 | Gang | Nov. 11, 1952 |
| 2,628,031 | Ellerbeck | Feb. 10, 1953 |
| 2,673,684 | Reppert | Mar. 30, 1954 |
| 2,702,159 | Reppert | Feb. 15, 1955 |
| 2,710,141 | Avery | June 7, 1955 |
| 2,722,377 | Davis | Nov. 1, 1955 |
| 2,733,011 | Davis | Jan. 31, 1956 |
| 2,736,494 | Ellerbeck et al. | Feb. 28, 1956 |
| 2,773,646 | Mathi | Dec. 11, 1956 |
| 2,922,573 | Reppert | Jan. 26, 1960 |
| 2,928,597 | Ellerbeck | Mar. 15, 1960 |
| 2,935,254 | Plunkett | May 3, 1960 |